United States Patent
Takao

(10) Patent No.: US 7,000,246 B1
(45) Date of Patent: Feb. 14, 2006

(54) DIGITAL BROADCASTING SYSTEM AND DIGITAL VIDEO RECORDING/REPRODUCING APPARATUS

(75) Inventor: Naoya Takao, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 787 days.

(21) Appl. No.: 09/593,368

(22) Filed: Jun. 14, 2000

(30) Foreign Application Priority Data

Jun. 14, 1999 (JP) .................................. 11-167495

(51) Int. Cl.
*H04N 7/16* (2006.01)
*H04N 5/91* (2006.01)

(52) U.S. Cl. .......................... 725/141; 386/68; 386/83; 386/95

(58) Field of Classification Search ................. 725/36, 725/42, 37, 131, 139, 140, 141, 142, 151, 725/152, 153; 386/83, 95, 68
See application file for complete search history.

(56) References Cited

U.S. PATENT DOCUMENTS

| | | | |
|---|---|---|---|
| 5,583,650 A | 12/1996 | Lane et al. | |
| 5,623,344 A | 4/1997 | Lane et al. | |
| 5,687,275 A | 11/1997 | Lane et al. | .................... 386/68 |
| 5,729,649 A | 3/1998 | Lane et al. | |
| 5,778,143 A | 7/1998 | Boyce | |
| 5,933,567 A | 8/1999 | Lane et al. | |
| 6,141,486 A | 10/2000 | Lane et al. | |
| 6,240,555 B1 * | 5/2001 | Shoff et al. | .................. 725/110 |
| 6,282,713 B1 * | 8/2001 | Kitsukawa et al. | ............ 725/36 |
| 6,304,714 B1 | 10/2001 | Krause et al. | |
| 6,466,733 B1 | 10/2002 | Kim | |
| 6,628,302 B1 * | 9/2003 | White et al. | ................... 725/46 |
| 6,732,366 B1 * | 5/2004 | Russo | ............................ 725/5 |
| 6,931,198 B1 * | 8/2005 | Hamada et al. | ............. 725/141 |
| 2001/0002224 A1 | 5/2001 | Sasaki et al. | |
| 2002/0150382 A1 | 10/2002 | Sasaki et al. | |
| 2004/0071444 A1 * | 4/2004 | Yoshio et al. | .................. 386/95 |
| 2005/0144641 A1 * | 6/2005 | Lewis | ......................... 725/60 |

FOREIGN PATENT DOCUMENTS

CN 1188373 A 7/1998

(Continued)

OTHER PUBLICATIONS

English Language Abstract of JP 6-284378.
English Language Abstract of JP 8-214261.
English Language Abstract of JP2000-243029.

*Primary Examiner*—Vincent Boccio
(74) *Attorney, Agent, or Firm*—Greenblum & Bernstein, P.L.C.

(57) ABSTRACT

It is an object of the present invention to provide an apparatus not causing inconsistency between the original picture and the image for performing the operations even under the special playback mode. A transport stream from a receiver 34 is supplied to a converter 36. The converter 36 generates a data stream for normal playback. If a desired service contains control data for interactive operations, a data stream for normal playback containing the control data is generated. Also, selecting packets required for performing special playback generate a data stream for special playback. None of the control data is contained in the stream for special playback. Both the stream for normal playback and the stream for special playback are recorded on a recording medium44. In the normal playback mode, reproduction under interactive manner is performed in accordance with the control data for interactive operation. No inconsistency is produced between the original picture and the image for performing the operations because none of the image for interactive operations is displayed.

49 Claims, 41 Drawing Sheets

BLOCK DIAGRAM OF RECORDING/REPRODUCTION APPARATUS

FOREIGN PATENT DOCUMENTS

| | | |
|---|---|---|
| EP | 0 762 756 A2 | 3/1997 |
| EP | 0 827 336 A2 | 3/1998 |
| EP | 0 876 062 A2 | 11/1998 |
| JP | 6-284378 | 10/1994 |
| JP | 8-214261 | 8/1996 |
| JP | 9-251761 | 9/1997 |
| JP | 2000-243029 | 9/2000 |
| WO | WO 96/33579 | 10/1996 |

\* cited by examiner

STRUCTURE OF PACKETIZED DATA

FIG.6

NIT

| TS | TRANSMISSION PARAMETERS | LIST OF SERVICES |
|---|---|---|
| TS1 | f1···· | SV11, SV12, SV13, SV14 |
| TS2 | f2···· | SV21, SV22, SV23, SV24 |
| ⋮ | ⋮ | ⋮ |

LAYOUT OF RECEIVER

FIG.9

PMT1 (PID=0X0011)

PACKET ID CORRESPODENCE:

|  | PIDs OF ES | PIDs OF ECM |  |
|---|---|---|---|
| VIDEO | 0X0096 | 0X0082 | ES (V) 1 1 |
| VIDEO | 0X0097 | 0X0082 | ES (V) 1 2 |
| AUDIO | 0X0098 | 0X0082 | ES (A) 1 1 |
| AUDIO | 0X0099 | 0X0082 | ES (A) 1 2 |
| NAVIGATION DATA | 0X0092 | 0X0082 | NVT1 |
| NAVIGATION DATA | 0X0093 | 0X0082 | NVT2 |

ENTRY CONTENT:

| VIDEO | AUDIO | NAVIGATION DATA |
|---|---|---|
| 0X0096 | 0X0098 | 0X0092 |
| ES (V) 1 1 | ES (A) 1 1 | NVT1 |

FIG.10

PAT (PID=0X0000)

| SERVICES | PID OF PMT |
|---|---|
| SV1 1 | 0X0011 |
| SV1 2 | 0X0012 |
| SV1 3 | 0X0013 |
| SV1 4 | 0X0014 |

FIG.11  NAVIGATION DATA NTV1

OBJECT TABLE

| INDEX | TYPE | X | Y | HANDLER | NORMAL CONDITION | FOCUS CONDITION |
|---|---|---|---|---|---|---|
| 0 | BUTTON | 500 | 200 | 0 | 0 | 1 |
| 1 | BUTTON | 500 | 400 | 1 | 2 | 3 |
| 2 | BUTTON | 500 | 600 | 2 | 4 | 5 |

HYPER LINK TABLE

| INDEX | VIDEO | AUDIO | NAVIGATION DATA |
|---|---|---|---|
| 0 | 0X0096 | 0X0098 | 0X0092 |
| 1 | 0X0097 | 0X0099 | 0X0093 |

HANDLER DEFINITION TABLE

| INDEX | INSTRUCTION (SCRIPT) |
|---|---|
| 0 | send_string(index0, index2) |
| 1 | send_string(index1, index2) |
| 2 | goto_contents(index1) |

BITMAP TABLE

| INDEX | DATA (BITMAP DATA) |
|---|---|
| 0 | ORDER TO OSAKA CENTER |
| 1 | ORDER TO OSAKA CENTER |
| 2 | ORDER TO TOKYO CENTER |
| 3 | ORDER TO TOKYO CENTER |
| 4 | GO TO CLOTHING STORE |
| 5 | GO TO CLOTHING STORE |

CHARACTER SEQUENCE TABLE

| INDEX | CHARACTER SEQUENCE |
|---|---|
| 0 | 06-6368-XXXX |
| 1 | 03-1234-XXXX |
| 2 | PRODUCT CODE : A-395 |

FIG.12  NAVIGATION DATA NTV2

OBJECT TABLE

| INDEX | TYPE | X | Y | HANDLER | NORMAL CONDITION | FOCUS CONDITION |
|---|---|---|---|---|---|---|
| 0 | BUTTON | 500 | 200 | 0 | 0 | 1 |
| 1 | BUTTON | 500 | 400 | 1 | 2 | 3 |
| 2 | BUTTON | 500 | 600 | 2 | 4 | 5 |

HYPER LINK TABLE

| INDEX | VIDEO | AUDIO | NAVIGATION DATA |
|---|---|---|---|
| 0 | 0X0096 | 0X0098 | 0X0092 |
| 1 | 0X0097 | 0X0099 | 0X0093 |

BITMAP TABLE

| INDEX | DATA (BITMAP DATA) |
|---|---|
| 0 | ORDER TO OSAKA CENTER |
| 1 | ORDER TO OSAKA CENTER |
| 2 | ORDER TO TOKYO CENTER |
| 3 | ORDER TO TOKYO CENTER |
| 4 | GO TO CLOTHING STORE |
| 5 | GO TO CLOTHING STORE |

HANDLER DEFINITION TABLE

| INDEX | INSTRUCTION (SCRIPT) |
|---|---|
| 0 | send_string(index0, index2) |
| 1 | send_string(index1, index2) |
| 2 | goto_contents(index0) |

CHARACTER SEQUENCE TABLE

| INDEX | CHARACTER SEQUENCE |
|---|---|
| 0 | 06-6368-XXXX |
| 1 | 03-1234-XXXX |
| 2 | PRODUCT CODE : B-133 |

FIG.17 AN EXAMPLE OF A SERVICE IN WHICH DISPLAYED IMAGES ARE CHANGED BY PASSAGE OF TIME

FIG.19  OVERALL LAYOUT OF RECORDING/REPRODUCTION APPARATUS

FIG. 20 BLOCK DIAGRAM OF RECORDING/REPRODUCTION APPARATUS

FLOW CHART OF PROGRAM THAT INTERPRETS AND EXECUTES THE NAVIGATION DATA

FIG.25

| | DATE AND TIME | TELEPHONE NUMBER | RESULT | MODE |
|---|---|---|---|---|
| 1 | 1998/8/1 | 06-123-XXXX | ○ | RECEPTION SUCCESS |
| 2 | 1998/8/10 | 03-9876-XXXX | ○ | RECEPTION SUCCESS |
| 3 | 1998/8/25 | 052-111-XXXX | × | RECEPTION FAIL |
| | | --------- | | |

ONLINE LOG

FIG.27

CONVERTED PMT
(PID=0×0011)

PACKET ID CORRESPODENCE:

|  | PIDs OF ES |  |
|---|---|---|
| VIDEO | 0×0096 | ES (V) 1 1 |
|  | 0×0097 | ES (V) 1 2 |
| AUDIO | 0×0098 | ES (A) 1 1 |
|  | 0×0099 | ES (A) 1 2 |
| NAVIGATION DATA | 0×0092 | NVT1 |
|  | 0×0093 | NVT2 |

ENTRY CONTENT:

| VIDEO | AUDIO | NAVIGATION DATA |
|---|---|---|
| 0×0096 | 0×0098 | 0×0092 |
| ES (V) 1 1 | ES (A) 1 1 | NVT1 |

FIG.28

CONVERTED PAT
(PID=0×0000)

| SERVICE | PID OF CONVERTED PMT | PID OF SIT |
|---|---|---|
| SV11 | 0×0011 | 0×0018 |

CONVERTED PMT FOR SPECIAL PLAYBACK
(PID=0×0011)

|  | PIDs OF ES |  |
|---|---|---|
| VIDEO | 0×0096 | ES (V) 1 1 |
|  | 0×0097 | ES (V) 1 2 |

DATA STREAM FOR SPECIAL PLAYBACK RECORDED ON

FIG.34 NORMAL PLAYBACK MODE

CONVERTED PMT FOR SPECIAL PLAYBACK (PID=0×0011)

|  | PIDs OF ES |
|---|---|
| VIDEO | 0×0096 |
|  | 0×0097 |
| IMAGE FOR OPERATION | 0×0092 |
|  | 0×0093 |

DATA STREAM FOR SPECIAL PLAYBACK

FIG.39

PMT1 (PID=0X0011)

PACKET ID CORRESPODENCE:

| | PIDs OF ES | PIDs OF ECM | PIDs OF ES FOR SPECIAL PLAYBACK | |
|---|---|---|---|---|
| VIDEO | 0X0096 | 0X0082 | 0X0106 | ES (V) 11 |
| | 0X0097 | 0X0082 | 0X0107 | ES (V) 12 |
| AUDIO | 0X0098 | 0X0082 | — | ES (A) 11 |
| | 0X0099 | 0X0082 | — | ES (A) 12 |
| NAVIGATION DATA | 0X0092 | 0X0082 | 0X0102 | NVT1 |
| | 0X0093 | 0X0082 | 0X0103 | NVT2 |

ENTRY CONTENT:

| VIDEO | AUDIO | NAVIGATION DATA |
|---|---|---|
| 0X0096 | 0X0098 | 0X0092 |

ES (V) 11   ES (A) 11   NVT1

CONVERTED PMT FOR SPECIAL PLAYBACK (PID=0×0011)

|  | PIDs OF ES |
|---|---|
| VIDEO | 0×0096 |
|  | 0×0097 |
| NAVIGATION DATA | 0×0092 |
|  | 0×0093 |

DATA STREAM FOR SPECIAL PLAYBACK

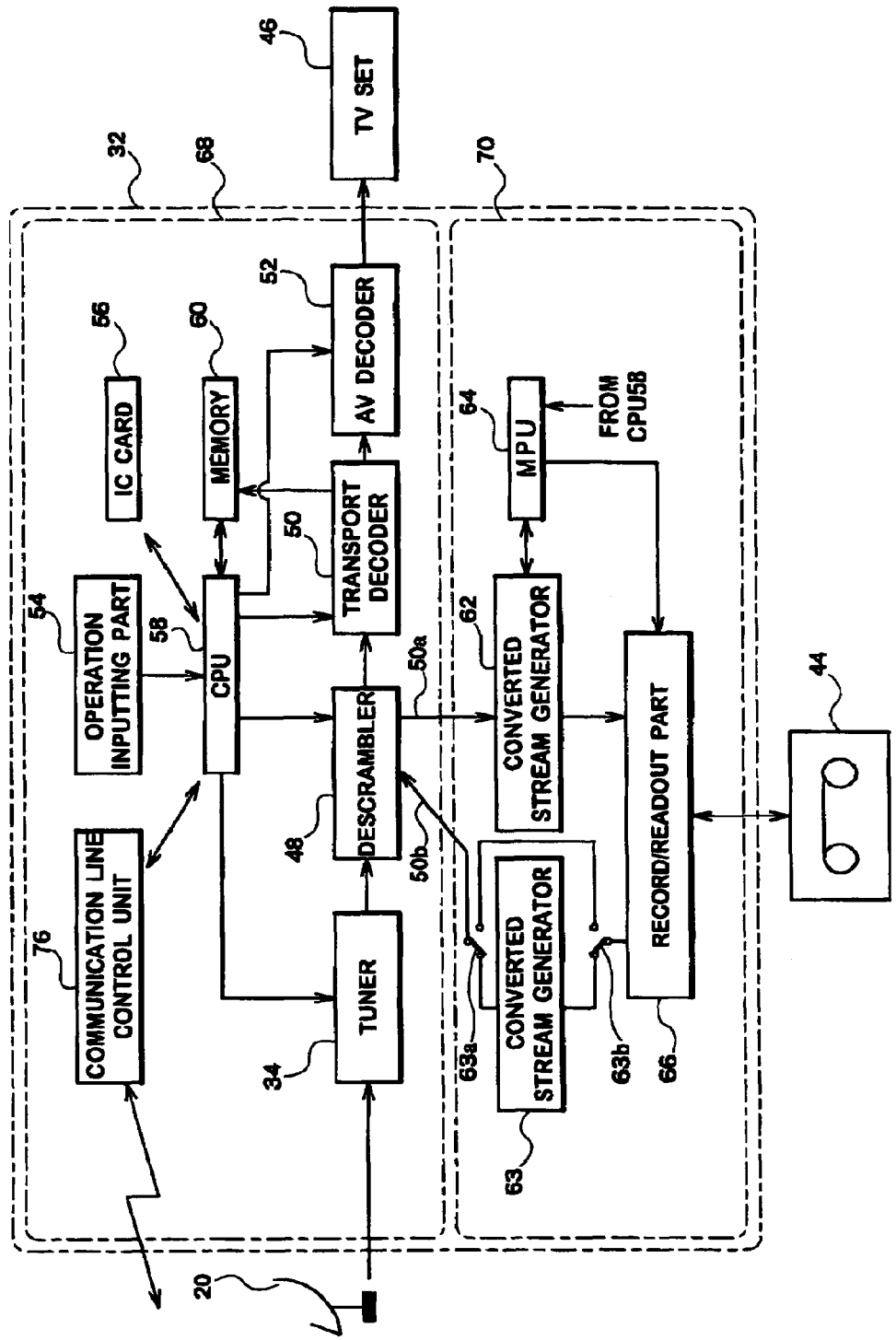
FIG.43 BLOCK DIAGRAM OF RECORDING/REPRODUCTION APPARATUS

DIGITAL BROADCASTING SYSTEM AND DIGITAL VIDEO RECORDING/REPRODUCING APPARATUS

CROSS REFERENCE TO RELATED APPLICATIONS

All the content disclosed in Japanese Patent Application No. H11-167495 (filed on Jun. 14, 1999, including specification, claims, drawings and abstract and summary is incorporated herein by reference in its entirety.

BACKGROUND OF THE INVENTION

1. Field of the Invention

The present invention relates digital video recording/reproducing apparatuses capable of performing playback in cue, review and other operations as well as handling digital broadcasting realizing interactive communications.

2. Description of the Related Art

1. Outline of Satellite Broadcasting System 1.1. State of Sending Radio Waves in Satellite Broadcasting FIG. 1 is a simplified conceptual view showing a state of sending radio waves in satellite broadcasting. Radio waves from a ground station 2 are sent to a plurality of ground receivers (not shown) via a broadcasting satellite 4. The broadcasting satellite 4 sends out a plural numbers of transport streams TS1, TS2, TS3 and TS4. Each transport stream is distinguished from the others by its frequency, plane of polarization and other factors.

A plurality of services analogous to channels in terrestrial broadcasting SV11, SV12, SV13 and SV14 being packetized are multiplexed in the transport stream TS1 under a time sharing manner. Similarly, services SV21, SV22, SV23 and SV24, and services SV31, SV32, SV33 and SV34 are multiplexed respectively in the transport streams TS2 and TS3. Various control data representing indicative of program information, that of current time, control data needed for packetization and the like in addition to video data and audio data of each of the services are sent out to each of the transport streams. While, FIG. 1 shows only three transport streams, mamma more transport streams may be sent out. Furthermore, while FIG. 1 shows a total of four services multiplexed in each transport stream, in actuality many more services may be multiplexed therein.

1.2. Configuration of the Transmitter

FIG. 2 is a schematic illustration of a transmitter for generating and transmitting the transport streams described above. While, FIG. 2 shows only the transport stream TS 1 for simplicity, other transport streams TS2 and TS3 are generated thereby in the same manner.

Video/audio data ES1, ES12, ES13 and ES14 of the services SV11, SV12, SV13 and SV14 are provided to a video/audio data management part 7. The Video/audio data Es1, ES12, ES13 and ES14 are compressed by the video/audio data management part 7, and the resulting data are provided to a multiplex control part 9.

A multiplexing data management part 15 manages multiplexing of services such that which service should be multiplexed to other. The multiplex control part 9 provides services to be multiplexed to a multiplexing part 11 under the control of the multiplexing data management part 15. A control data generating part 6 generates a plurality of control data such as control data for multiplexing packets, that indicative of program information, that indicative of current time. The control data for multiplexing packets are assigned for correctly identifying a video/audio data of a plurality of services being packetized under a time-sharing manner and other purposes.

The multiplexing part 11 outputs the control data and the video/audio data ES11, ES12, ES13, and ES14 under a time-sharing manner, each consisting of packetized data having a fixed length.

A scrambler 12 scrambles the outputted packets using a scramble-key provided by a scramble-key control part 16. The transport stream TS1 being scrambled is modulated with a modulating part 14 and sent out to audiences via the broadcasting satellite 4.

The scramble-key used at the scrambler 12 is encrypted with the control data generating part and made to be Entitlement Control (hereinafter referred to as ECM) data. In other words, ECM data further encrypting the key used for descrambling is generated. The multiplexing part 11 carries out packetization including the ECM data.

1.3. Structure of the Transport Streams

As shown in FIG. 3, video data ES (V) 1 and audio data ES (A) 1 of the service SV11, video data ES (V) 2 and audio data ES (A) 1 of the service SV12, video data ES (V) 3 and audio data ES (A) 3 of the service SV13, and video data ES (V) 4 and audio data ES (A) 4 of the service SV14 are multiplexed in the transport stream TS1 generated by the transmitter depicted in FIG. 2.

In addition, control data NIT, PAT, PMT1, PMT2, PMT3 and PMT4 are further multiplexed therein. Audio data and video data of the service SV11, SV12, SV13 and SV14 can be separated respectively by using these control data.

Further, control data for the scramble-key CCM1, ECM2, ECM3 and ECM4, control data indicative of program information EIT1, EIT2, EIT3 and EIT4, and control data for current time TDT and the like are multiplexed therein. Although, none of them are shown in the drawing, more control data are multiplexed in the transport stream.

Packetization of the control data, is carried out in the sequence of a line 18*a* depicted in FIG. 3. In other words, packetization of these control data is carried out by the following sequence: the control data NIT, PIT, PMTs EITs, ECMs, video data ESs (V) and audio data ESs (A). Upon completing the first round ends at the audio data ES (A) 4, further rounds of packetization are carried out repeatedly (see a line 18*b*).

A basic structure of the packetized data is depicted in FIG. 4. Both the control data and the video/audio data being packetized have the structure as depicted in FIG. 4. PIDs are assigned to the forefront of each packetized data. PIDs are the references, which are uniquely assigned to each of the packetized data to distinguish each packetized data from other packetized data. The data representing contents are object data being packetized (e.g. the control data, video/audio data and the like).

A relationship among the control data PAT, PMT1, PMT2, PMT3, PMT4 and video/audio data ESs in each of the services is depicted in FIG. 5. For example, a PID 502 is assigned to video/audio data 500 being packetized, and the video/audio data 50 in the service SV12 being encrypted. Although, Just one packet is illustrated in the drawing as a typical illustration thereof, the video/audio data 500 is sent in a plurality of packets as a result of carrying out time sharing processing. Similarly, a PID 506 is assigned to ECM data 504 being packetized for generating a descramble-key, which descrambles the scramble on the video/audio data 500.

The packet ID of the video/audio data 500 in the service SV12 and that of the ECM data 504 are recorded in the control data PMT2. In view of this, the packet IDs of the video/audio data 500 in the service SV12 and the ECM data 504 can be identified by obtaining the contents of the control data PMT2. A PID 512 is assigned to the control data PMT2 being packetized as well. Although, just one packet is illustrated in the drawing as a typical illustration thereof, the control data PMT2 is also sent in a plurality of packets as a result of carrying out time sharing processing.

A packet ID of the control data PMT2 is recorded in the control data PAT. In this way, the packet ID of the control data PMT2 in the service SV12 can be identified by obtaining the contents of the control data PAT. A PID 522 is assigned to the control data PAT being packetized as well. Packet IDs of the control data PMT1, PMT2, PMT3 and PMT4 in the services SV11, SV12, SV13 and SV14 multiplexed in the transport stream TS1 are recorded in the control data PAT.

Control data, video/audio data, each packetized and related one another are sent through transport streams. It is therefore, necessary to obtain the control data PAT in order to identify the services multiplexed in the transport streams. In this way, the packet ID of the control data PAT is previously set at a fixed value such as (0X0000).

Information such as transmission parameters of the transport streams TS1, TS2 and TS3 (their frequencies or the like) and which of the services being multiplexed into which of the transport stream is recorded in the control data NIT (see FIG. 6). In this way, it is possible to identify a specific service is multiplexed into which of the service(s). Packet ID of the control data NIT is recorded in the control data PAT.

1.4. Configuration of the Receiver

FIG. 8 outlines configuration of a receiver. In the receiver, a desired transport stream is selected by a tuner 22 and scrambled transport stream is descrambled with a descrambler 24, then data concerned with the desired service contained in the descrambled transport stream is separated therefrom with a transport decoder 26. The microprocessor (hereinafter referred to as MPU) 28 sends an ECM obtained to an IC card 30 and receives the a scramble-key restored by the IC card30. The MPU 28 then sets the scramble-key in the descrambler 24 The video/audio data ES can thereby de descrambled.

The MPU 28 sets the packet ID of the video/audio data ES in the desired service into the transport decoder 26. The transport decoder 26 thereby outputs the video/audio data ES of the service. When the packet ID of the control data is set in the transport decoder 26, the control data thus separated is supplied to the MPU 28.

An operation of the receiver, which currently receives the service SV33, contained in the transport stream TS3, and receives a command to switch it to the service SV12 included in the transport stream TS1 will be described herein. The MPU 28 controls the transport decoder 26 to obtain the control data NIT (i.e., by setting a PID of the control data NIT into the transport decoder 26). The description in the control data tells that the service SV12 is multiplexed in the transport streamTS1 (see Fig. G).

In response to the description, the MPU 28 controls the tuner 22 to receive the transport stream TS1. Further, the receiver acquires the PAT and PMT 2 by controlling the transport decoder 26, and the packet IDs of both the video data ES (V) 2 and the audio data ES (A) 2 in the desired service SV12, and packet IDs of their ECMs (see an arrows α and β in FIG. 5).

Next, the video data ES (V) 2 and the audio data ES (A) 2 of the desired service SV12 are outputted from the transport decoder 26 by setting these packet IDs in the transport decoder 26. In parallel with this, the MPU 28 acquires the scramble-key by sending the ECM obtained from the transport decoder 26 to the IC card 30 and sets this in the descrambler 24. Descrambled video data ES (V) 2 and audio data ES (A) 2 can thereby be obtained. Changeover of the received service is performed as described above.

2. Outline of Satellite Broadcasting System Realizing Interactive Operations 2.1. Outline of the System Next, the outline of the satellite broadcasting system realizing interactive operations will be described. Here, a system, which is realized and is proposed by the applicant, is described as an example.

The layout of the transmitter is the same as that of shown in FIG. 2. However, it differs in that control data generating part 6 also generates navigation data, to be described.

FIG. 8 shows the data structure of a transport stream that is sent from the transmitter in the broadcasting system realizing interactive operations. In the drawing depicts the video data ES (V) 11, ES (V) 12 and ES (A) 11, ES (A) 12 in the service 11, the video data of other services and audio elementary streams for audio data are omitted. The difference from the data structure of FIG. 3 is that two (2) video/audio ESs are contained in a single service SV11. Interactive changeover of these two (2) video/audio ESs can be performed by operation of the operator in accordance with the navigation data NVT1 and NVT 2 both forming control data for realizing interactive operations. The receiver is designed so as to alter the auxiliary display in an interactive manner by using the navigation data NVT1 and NVT2.

FIG. 9 shows the contents of control data PMT1 in the service SV11. The control data PMT1 describes the packet ID of each content (vide, audio, navigation data) and the packet ID of the ECM data for obtaining the key for descrambling the contents. Furthermore, since all of the video, audio, and navigation data have a plurality of contents, the content that is to be initially outputted is given as entry-contents. The packet ID of this control data PMT itself is in "0X0011".

FIG. 10 shows contents of the control data PAT. In the control data PAT, there are given the packet IDs of the PMTs relating to the services SV11, SV12, SV13 and SV14 these are multiplexed on the transport stream TS1. In this way, it is possible to identify the packet ID of the service SV11 is in "0X0011". It should be noted that the packet ID of the control data PAT itself is fixed as "0X0000".

FIGS. 11, and 12 show contents that are recorded in the navigation data NVT1 and NVT2. The same contents of this set of navigation data NVT1 and NVT2 are repeatedly sent at predetermined intervals. Interactive alteration of the service contents is performed as shown in FIGS. 13 through 16 in response to the operation of operator using the navigation data NVT1 and NVT2.

An image depicted in FIG. 14 is displayed when the operator presses a key to move the cursor downward under the display shown in FIG. 13. In other words, the reference part on the display "Order to Osaka center" shifts to the display "Tokyo center". Further depress of the downward key will shift the reference part on the display to "Go to the clothing store" as depicted in FIG. 15. The contents of the service is changed into a Tele-shopping offering clothing items as depicted in FIG. 16 when the operator presses a selection button under the condition.

Such interactive operations described above are realized in accordance with the navigation data forming control data for interactive operations.

Although, the services in moving pictures are selected in accordance with the navigation data in the above-described operations, services in still images can also be selected. In that case, a desired still image is displayed as a result of selection performed in accidence with the control of the navigation data so as to select the desired still image out of a plurality of still images being sent repeatedly as one complete service.

3. Outline of Digital Video Recording/Reproduction Apparatus

In the contrary, digital video recording/reproduction apparatuses recording satellite broadcasting as digital data have been proposed (in Japanese patent application No. H10-367155 and related applications filed invented by the applicant of this application). Other recording/reproduction apparatuses capable of performing cue and review in accordance with data for special playback stored separately from data for normal playback have also been proposed (disclosed in Japanese Laid Open Publication No. H06-284378 and H08-214261).

However, the prior art even not aware problems laid between the interactive operations performed in digital broadcasting and the digital video recording/reproduction apparatus for recording thereof.

The applicant has already proposed a technique by which recording and reproduction are performed while maintaining interactive capability thereof. The technique is superior in a view of solving the problems occur when the interactive operations performed in receiving digital broadcasting are also carried out during the recording and reproduction. The technique, however, neither pointing out the problems in the interactive operations occurred by confusion therein nor solving the problems.

Generally, bandwidth for recording data for special playback is limited, therefore, it is expected that one of no data for interactive operations are recorded as the data for special playback and only a small amount of data are recorded even data recording is allowed. Under the circumstances, the following problems are observed when digital data for realizing interactive operations are recorded and reproduced.

For example, the problems will be described using a service having an interactive capability depicted in FIG. 17. In the drawing, time travels on the left to the right hand side thereof. A display of "Quiz regarding to lions" forming an image for performing operations is displayed when an image of a lion is displayed on the screen. A quiz on lions is displayed on the screen in accordance with the navigation data (the control data for interactive operations) when the operator selects the display of "Quiz regarding to lions" with buttons on the remote controller or the like.

Similar operations can be carried out upon displaying a display of "Quiz regarding to elephants" forming an image for performing operations as a result of revising its version of the navigation data so as to display an image of an elephant. Such operations can be realized not only when the apparatus receives data but also at the time of performing normal playback. Carrying out recording so as to contain the navigation data does this.

However, the display of "Quiz regarding to lions" forming the image for performing operations undesirably remains on the screen regardless of sudden change of images when playback is performed in cue because no control data for realizing interactive operations are obtained. In other words, countermeasures for preventing such undesirable display need to be taken in consideration of performing playback in cue. Similar problems occur during the special playback such as review or the like.

Other problems described below arise when a service capable of selectively displaying a plurality of still images under interactive basis. In such service, the creator of the service may control still images in accordance with the control data for performing interactive operations, the still images being displayed on the screen responding to inputs of the operator. For example, in a service by which provide quiz, a control in which a certain still image is displayed can be carried out only when correct answers to the quiz are inputted.

Images containing still images indicative of the correct answer, however, are unexpectedly displayed when special playback such as cue and the like is performed because no interactive control (or insufficient interactive operation) is carried out. These problems need to be solved in order to record and reproduce services for performing interactive operations in view of considering special playback.

Further, there is a high probability of causing the undesirable display as a result of performing only control commands in the interactive command regardless of suspension of the image for performing operations when playback is in pause during the reproduction of a service for performing interactive operations. This happens especially on commands performed depending on the time. On the contrary, there are some commands preferably continuing even in pause such as communication command between the apparatus and external apparatus(es). In such a view, problems described above for recording/reproduction of the services for performing interactive operations need to be solved in view of considering pause of the playback.

SUMMARY OF THE INVENTION

It is an object of the present invention to overcome the above mentioned problems and to provide a technique not causing the problems described above even in the special playback mode such as performing playback in cue and the like when data for performing interactive operations are recorded and reproduced.

In order to overcome the problems described above, the object of the present invention is to provide the means for solving the above problems with considerations of not only a process in the playback but also processes in the recording and receiving as well as the process in the transmitting side.

(1) A recording/reproducing apparatus of the present invention outputs an image for performing operations in accordance with control data for interactive operation in the stream when the apparatus is in receiving and normal playback modes, carries out the interactive operation changing a signal representing contents of the services being outputted in accordance with an input of the operator, and not carries out the interactive operation when the apparatus is in a special playback mode.

Therefore, no inconsistency can be produced between the original image and the image for performing the operations in accordance with control data for performing interactive operations under the special playback mode.

(2) A recording/reproducing apparatus of the present invention records a data stream for playback including the normal and special playback stream, reproduces the signals representing contents of the services reproduced under the normal playback mode in accordance with the data stream for normal playback when the apparatus is in the normal playback mode, and reproduces the signals representing contents of the services reproduced under the special playback mode in accordance with the data stream for the special playback when the apparatus is in the special playback mode.

Therefore, the process load can be reduced during the special playback mode.

(4) A recording/reproducing apparatus of the present invention generates a data stream for special playback containing the image for performing operations and not contains a control command, both of the image and the command being used for performing interactive operations, and displays the image for performing operations when the apparatus is in the special playback mode.

Thus, any inconsistencies with the picture are avoidable while displaying the image for performing operations when the apparatus is in a special playback mode. During the service without any pictures, it can be avoided any possibility to black out the picture in the special playback and give the viewers the feeling of insecurity caused by the blackouts.

(5) A recording/reproducing apparatus of the present invention is characterized by further including data for detecting whether or not a version of control data for performing the interactive operations is upgraded into the data stream for special playback and suspending display of the image for performing operations when upgrade of the control data is detected according to the detecting data during the special playback mode.

Therefore, inconsistency between the picture and the image for performing the operations produced by the change of the version can be avoided.

(6) A recording/reproducing apparatus of the present invention is characterized by outputting a signal for notifying the suspension to the operator when display of the image is suspended thereby.

Therefore, it can be apparent to the operator that the suspension of the display of the image for performing operations is caused by the operation of the apparatus.

(7) A recording/reproducing apparatus of the present invention is characterized by switching whether or not displaying the image for performing operations in accordance with input of the operator when the apparatus is in the special playback mode.

Thus, the display conditions during the special playback mode can be selected by operator's desire.

(12) A recording/reproducing apparatus of the present invention is characterized in that the apparatus generates a data stream for reproduction containing a data stream for the normal playback and not containing a data stream for the special playback, reproduces signals representing contents of services reproduced under the normal playback mode in accordance with the data stream for the normal playback when the apparatus is in the normal playback mode, and reproduces signals representing contents of services reproduced under the special playback mode in accordance with the data stream for the special playback when the apparatus is in the special playback mode.

Thus, since the data stream for the special playback does not need to be generated during the recording, the process load can be reduced during the recording.

(13) A recording/reproducing apparatus of the present invention is characterized in that the apparatus generates a service contents signal for special playback not containing an image and a control command when the apparatus is in a special playback mode, both of the image and the command being used for performing interactive operations, and not displays the image for performing the interactive operations.

Therefore, no inconsistency can be produced between the original picture and the image for performing the operations in accordance with control data for performing interactive operations under the special playback mode.

(14) A recording/reproducing apparatus of the present invention is characterized in that the apparatus generates a service contents signal for special playback containing an image for interactive operations and not containing a control command for interactive operations when the apparatus is in the special playback mode and displays the image.

Thus, any inconsistencies with the picture are avoidable while displaying the image for performing operations when the apparatus is in a special playback mode. During the service without any pictures, it can be avoided any possibility to black out the picture in the special playback and give the viewers the feeling of insecurity caused by the blackouts.

(15) A recording/reproducing apparatus of the present invention is characterized in that the apparatus detects whether or not control data for performing interactive operations is upgraded in the data stream for special playback, and suspends display of the image for performing the interactive operations when upgrade of the control data is detected.

Therefore, inconsistency between the picture and the image for performing the operations produced by the change of the version can be avoided.

(16) A recording/reproducing apparatus of the present invention is characterized in that the apparatus outputs a signal for notifying the suspension to the operator when display of the image is suspended thereby.

Therefore, it can be apparent to the operator that the suspension of the display of the image for performing operations is caused by the operation of the apparatus.

(17)–(19) A digital transmitting apparatus and a recording/reproducing apparatus of the present invention transmits the transport stream so as to contain a special stream for special playback, generates and records a data stream for special playback in accordance with the special stream.

Therefore, the process load to generate a data stream for special playback on the receiving apparatus can be reduced.

(27) A digital video reproduction apparatus of the present invention outputs an image for performing operations in accordance with control data for performing interactive operations contained in the stream for reproduction; performs interactive operations so as to change a signal representing contents of the services responding to an input of the operator when the apparatus is in a normal playback mode; and not performs the interactive operations when the apparatus is in a special playback mode.

Therefore, no inconsistency can be produced between the original picture and the image for performing the operations in accordance with control data for performing interactive operations under the special playback mode.

(29) A digital video reproduction apparatus of the present invention is characterized by displaying the image for performing operations when the apparatus is in the special playback mode.

Thus, during the service without any pictures, it can be avoided any possibility to black out the picture in the special playback and give the viewers the feeling of insecurity caused by the blackouts.

(30) A digital video reproduction apparatus of the present invention is characterized by suspending display of the image for performing operations when upgrade of the control data is detected during the special playback mode.

Therefore, inconsistency between the picture and the image for performing the operations produced by the change of the version can be avoided.

(31) A digital video reproduction apparatus of the present invention is characterized by outputting a signal for notifying the suspension to the operator when display of the image is suspended thereby.

Therefore, it can be apparent to the operator that the suspension of the display of the image for performing operations is caused by the operation of the apparatus.

(33) A recording/reproducing apparatus of the present invention carries out an interactive operation in which the reproducing means outputs an image for performing operations in accordance with control data contained in the transport stream being received and changes the signal representing contents of the services being outputted in accordance with input of the operator when the apparatus is in the receive mode, the normal and the special playback modes.

Therefore, the present invention is arranged to carry out the interactive operation actively to make no inconsistency between the original picture and the image for performing the operations in accordance with control data for performing interactive operations, even though it is in the special playback mode.

(34) A recording/reproducing apparatus of the present invention records a data stream for reproduction containing a data stream for the normal and the special playback; reproduces signals representing contents of services reproduced under the normal playback mode in accordance with the data stream for the normal playback when the apparatus is in the normal playback mode; and reproduces signals representing contents of services reproduced under the special playback mode in accordance with the data stream for the special playback when the apparatus is in the special playback mode.

Therefore, the process load in the special playback can be reduced.

(35) A recording/reproducing apparatus of the present invention records control data for performing interactive operations equivalent to the data stream for the normal playback so as to include into the data stream for the special playback.

Thus, the interactive operations equivalent to the normal playback mode can be carried out under the special playback mode.

(36) A recording/reproducing apparatus of the present invention generates and records the data stream for the special playback by omitting a part of the control data for performing interactive operations.

Thus, the interactive operations different from the normal playback mode can be carried out under the special playback mode.

(41) A recording/reproducing apparatus of the present invention is characterized by generating and recording a data stream for reproduction containing a data stream for the normal playback and not containing a data stream for the special playback; and reproducing signals representing contents of services reproduced under the special playback mode in accordance with the data stream for the normal playback when the apparatus is in the special playback mode.

Therefore, since the process load in the recording is reduced, and the data stream for the special playback is not recorded, the recording volume of the medium can be effectively used.

(42) A recording/reproducing apparatus of the present invention carries out an interactive operation equivalent to that carried out in the normal playback mode.

Therefore, no inconsistency can be produced between the original picture and the image for performing the operations in the special and normal playback modes.

(43) A recording/reproducing apparatus of the present invention carries out an interactive operation different from that carried out in the normal playback mode when the apparatus is in the special playback mode.

Thus, only the interactive operation having appropriate contents for the special playback mode can be carried out.

(44)–(46) A recording/reproducing apparatus of the present invention transmits the transport stream so as to contain a special stream for special playback, generates and records a data stream for special playback in accordance with the special stream. In addition, the special stream contains control data for performing interactive operations.

Therefore, the process load to generate a data stream for special playback on the receiving apparatus can be reduced.

(47)(48) A recording/reproducing apparatus of the present invention is characterized in that the special stream contains control data for performing interactive operations equivalent to that of the normal stream.

Thus, the interactive operations equivalent to that in the normal playback can be performed in the special playback on the receiving side by recording as it is. When the data stream for special playback is generated, the contents of interactive operations in the special playback can be different from that in the normal playback by omitting a part of control data for performing the interactive operations. In either case, since the special stream is provided, the data stream for special playback can be generated easily.

(49) A recording/reproducing apparatus of the present invention is characterized in that the special stream contains control data in which a part of the control data included in the normal stream is omitted.

Thus, the interactive operations equivalent to that in the normal playback can be performed in the special playback on the receiving side by recording as it is. Since the special stream is provided, the data stream for special playback can be generated easily.

(53) A recording/reproducing apparatus of the present invention is characterized in that the apparatus not uses control data for interactive operations obtained at beginning of a special playback mode in a normal playback mode after carrying out the special playback mode if a service identifier at beginning of the special playback mode and a service identifier at end of the special playback mode are not coincide with each other when playback modes are switched to in a sequence of the normal playback mode, the special playback mode and the normal playback mode.

Thus, disorders of the interactive operation are avoidable when the playback mode is switched back to the normal playback mode from the special playback mode.

(54) A recording/reproducing apparatus of the present invention is characterized in that the apparatus does not use control data for interactive operations obtained at beginning of a special playback mode in a normal playback mode after carrying out the special playback mode if a version of the control data at beginning of the special playback mode and a version of the control data at end of the special playback mode are not coincide with each other when playback modes are switched to in a sequence of the normal playback mode, the special playback mode and the normal playback mode.

Thus, disorders of the interactive operation can be prevented when the playback mode is switched back to the normal playback mode from the special playback mode.

(55)(56) A digital transmitting apparatus and a recording/reproducing apparatus of the present invention is characterized in that the apparatus transmits the transport stream from the transmitting side so as to contain special playback advisability information indicating whether or not allowing special playback, and when the special playback advisability information bans to carry out special playback, the data stream for special playback may not be generated on the receiving side and may be banned to record on the recording medium even the data stream being generated.

Therefore, the transmitting side can decide whether the special playback is allowed or not, in reference to its contents. By means set forth, in the broadcasting that transmits static images and control data for interactive operation repeatedly, the static image that cannot be viewed when predetermined operation is not given can be prevented from being played in the special playback.

(57)(61) A recording/reproducing apparatus of the present invention is characterized in that the apparatus do not carry out special playback of a part of the service where the special playback advisability information indicates not allowing special playback.

Therefore, same effect as described above can be obtained.

(64) A recording/reproducing apparatus of the present invention is characterized in that the apparatus stop carrying out the interactive operation when the apparatus is in the pause mode.

Thus, any chance to raise the disorders of the interactive operation is avoidable during the pausing.

(66) A recording/reproducing apparatus of the present invention is characterized in that the apparatus suspends display of the image when the apparatus is in the pause mode.

Thus, any chance of operator making operational inputs can be prevented during the pausing.

(67) A recording/reproducing apparatus of the present invention is characterized in that the apparatus keeps displaying the image when the apparatus is in the pause mode.

Thus, confirmation of the image for operation can be made during the pausing.

(68) A recording/reproducing apparatus of the present invention is characterized in that the apparatus restarts the interactive operations when the pause mode is released.

Thus, the interactive operation can be continued after the release of the pausing without any disorders.

(69)(71) A recording/reproducing apparatus of the present invention is characterized in that the apparatus carries out the interactive operation even when the apparatus is in the pause mode.

Therefore, the change of the image can be achieved in response to the inputs of the operator even when the apparatus is in the pause mode.

(72) A recording/reproducing apparatus of the present invention is characterized in that the apparatus completes the operations under the control data being carried out at beginning of the pause mode and not accepts further inputs when the apparatus is in the pause mode.

Thus, disorders raised from the accepting of new inputs can be prevented.

(73) A recording/reproducing apparatus of the present invention is characterized in that the apparatus does not carry out the operation under the control data depending on time when the apparatus is in the pause mode.

Thus, disorders of the interactive operation from the pausing can be prevented.

(74) A recording/reproducing apparatus of the present invention is characterized in that the apparatus carries out processes for external communications when the apparatus is in the pause mode.

Therefore, external communication processes can be implemented without raising any disorders to the interactive operation.

A term of "receiving means" is referred to as the means having a functionality of receiving the transport stream and is a concept of things receiving transmissions applied to not only to a radio transmission but also a wired transmission. In the embodiments of the invention, a receiver 22 is corresponding to that part.

A term of "reproducing means" is referred to as the means for reproducing the contents of the services in accordance with the transport stream received or the converted stream played back. In the embodiments of the invention, a CPU36, a nonvolatile memory 52, a de-scrambler 58, an IC card 66, a memory 54, a TS decoder and an AV decoder 32 are corresponding to that part.

A term of "converting means" is referred to as the means for converting the transport stream into the conversion stream. In the embodiments of the invention, the means such as a TS decoder 50, a conversion stream generator 62 and CPU 58 (especially, in the Step S24 and S25) are corresponding.

A term of "stream for playback" is referred to as the stream applied some process to the transport stream for recording and is a concept of data streams including not only a stream recorded in the final stage but also a stream generated intermediately. In the embodiments of the invention, the streams include the selected streams such as output from the terminals 50a and 50c of the transport decoder 50. In addition, both streams for normal playback and special playback are the streams for playback.

A term of "recording means" is referred to as means for recording on a recording medium. In the embodiments of the invention, a record readout part 66 is corresponding to that part.

A term of "readout means" is referred to as means for reading from the recording medium. In the embodiments of the invention, a record readout part 66 is corresponding to that part.

A term of "special playback" is referred to as the playback carried out with the speed and direction different from the normal playback and is a concept including such as fast-forward, rewind and single frame step.

A term "having an interactivity" is referred to as the characteristic changing the image display and the audio outputs in accordance with the operations of the operator and is a concept including the interactivities not only in the case illustrated in FIGS. 13 through 16 but also in the electronic program guide.

A term of "control data for interactive operation" is referred to as the data for realizing the interactivity and is a concept including a control command and an image for performing operations. In the embodiments of the invention, the navigation data is corresponding to that part.

A term of "recording medium recorded a program" is referred to as the recording media recorded the programs such as ROMs, RAMs, flexible disks. CD-ROMs, memory cards and hard disks. It is also a concept including the communication media such as telephone circuits and carrier lines. The concept also includes the recording medium not only the hard disk connected to the CPU and in which the recorded program is directly executed, but also the CD-ROM recording the program being executed after an installation in the hard disk. In addition to the programs described herein, it includes not only directly executable programs but also programs such as source programs, compressed programs and encrypted programs.

In the present invention, the term "receiving means" represents means for receiving a transport stream and is not restricted to wireless transmissions but is a concept including reception of wired transmissions, a receiver 22 corresponds to the receiving means.

The term "reproducing means" represents means for reproducing contents of services in accordance with one of a transport stream being received and a converted stream In the embodiment, a CPU 36, a nonvolatile memory 52, a descrambler 58, an IC card 56, a memory 54, a TS decoder 26 and an AV decoder 32 correspond to the reproducing means.

The term "converting means" represents means for converting the transport stream to a converted transport stream. In the embodiment, a TS decoder 50, a converted stream generator 62 and a CPU (steps performed thereby, in particular, steps S24 and S25) correspond to the converting means, for instance.

The term "data stream for reproduction" represents a concept including a stream being processed in some ways to the transport stream for recording purposes and not restricted to a stream finally recorded but including a stream generated in intermediate phases. For example, in the embodiment, a selected stream outputted from terminals 50*a*, 50*c* of the transport decoder 50 is included in the data stream for reproduction. Both a data stream for normal playback and a data stream for special playback correspond to the data stream for reproduction.

The term "recording means" represents means for recording information on a recording medium. In the embodiment, a reader 66 corresponds to the recording means.

The term "special playback" represents a playback method different from normal playback in its speed and its directions.

The phrase "for realizing interactive operations or having interactive capabilities" represents capabilities by which displays on the screen and sounds being outputted are varied in response to inputs of the operator, not only the images depicted FIGS. 13 through 16 but including interactive capabilities in an electric program guidance and similar activities.

The term "data for realizing interactive operations" represents data for realizing interactive capabilities and that also represents a concept including a control command, an image for performing operations. In the embodiment, navigation data correspond to the data.

The term "program storage medium" represents a recording medium such as a ROM, RAM, a flexible disk, a CD-ROM, a memory card, hard disk and the like on which a program(s) is stored. Also, it is a concept including communication media such as telephone lines, carrier channels. It is a concept including not merely recording media such a as hard disk connected to a CPU whereby the program(s) recorded is directly executed, but also recording media such as CD-ROMs on which is recorded a program(s) that is executed after first installing it on the hard disk etc. Also, term "program(s)" as referred to herein represents not just a program(s) that is directly executable but also a program(s) in a source form, or a program(s) that has been subjected to compression processing or an encrypted program and the like. Further, "navigation data" in the embodiment include the concept of the term "program(s)".

Other objects and features of the present invention will be more apparent to those skilled in the art on consideration of the accompanying drawings and following specification wherein are disclosed several exemplary embodiments of the invention with the understanding that such variations, modifications and elimination of parts may be made therein as fall within the scope of the appended claims without departing from the spirit of the invention.

BRIEF DESCRIPTION OF THE DRAWINGS

FIG. 6 is a view showing the contents of control data NIT.

FIG. 9 is a view showing the contents of control data PMT1.

FIG. 10 is a view showing the contents of control data PAT.

FIG. 11 is a view showing the contents of navigation data NVT1.

FIG. 12 is a view showing the contents of navigation data NVT2.

FIG. 25 is a view showing the contents of a communication log.

FIG. 27 is a view showing the contents of a conversion PMT for normal playback.

FIG. 28 is a view showing the contents of a conversion PAT.

FIG. 39 is a view showing the contents of the control data PMT1.

FIG. 43 is a schematic view illustrating hardware structure of the recording/reproducing apparatus according to the fourth embodiment.

DETAILED DESCRIPTION OF THE PREFERRED EMBODIMENTS

Figure 1:
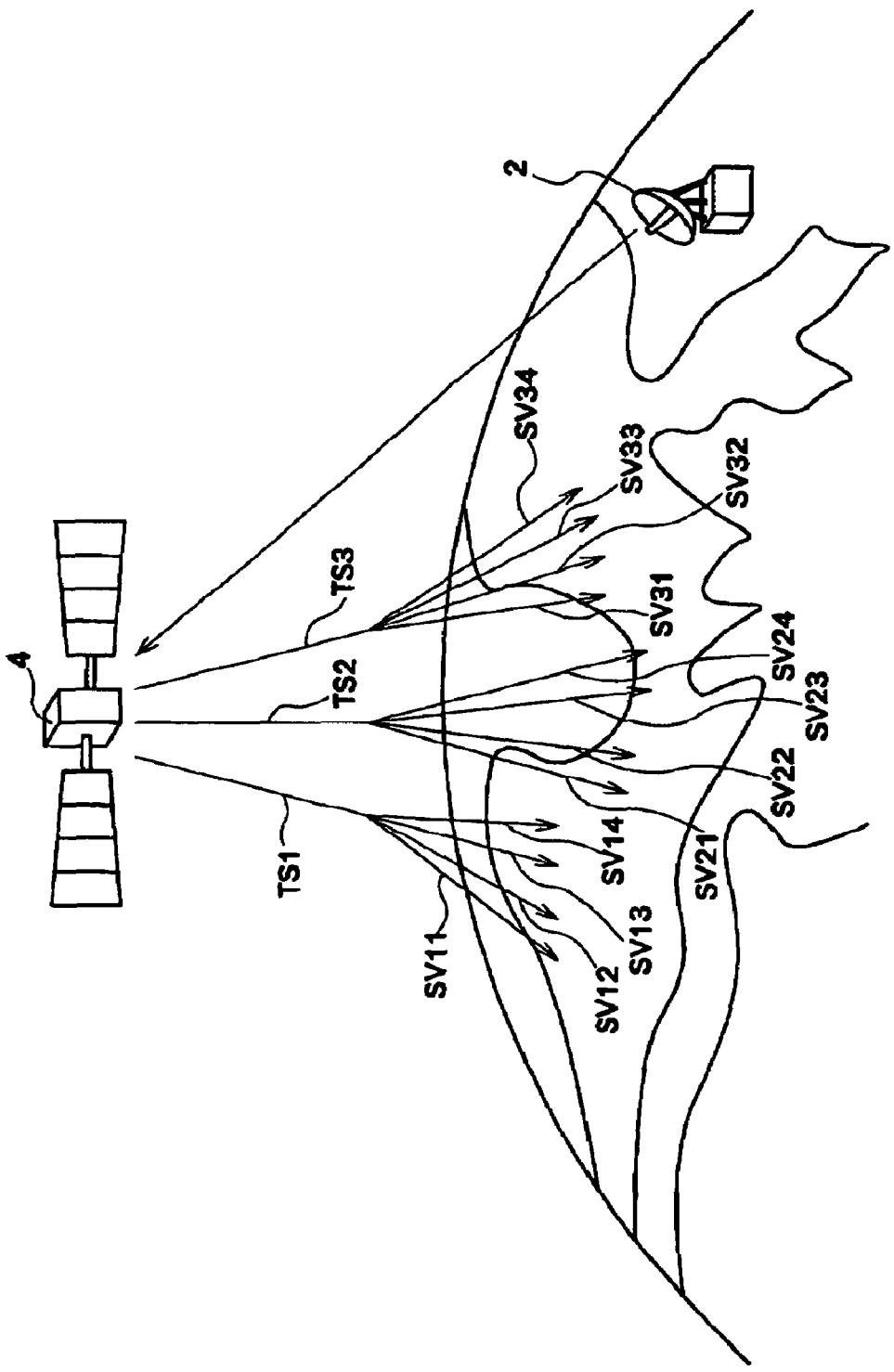
FIG. 1 is a conceptual view showing a state of sending radio waves in satellite broadcasting.

Contents
4. First embodiment
 4.1. Recording/reproducing apparatus
 4.2. Hardware structure of recording/reproducing apparatus and functions thereof
  4.2.1 Receive mode
  4.2.2 record mode
  4.2.3 Normal playback mode
  4.2.4 Special playback mode
 4.3. Other embodiments
  4.3.1 Displaying image for operations as it is
  4.3.2 Including image for operations in data stream for special playback
5. Second embodiment
 5.1. Structure and functions of transmitter
 5.2. Structure and functions of recording/reproducing apparatus
 5.3. Other embodiments
6. Third embodiment
7. Fourth embodiment
8. Fifth embodiment
 8.1 Other embodiments
9. Sixth embodiment
10. Seventh embodiment
 10.1. Structure and functions of transmitter 10.2. Structure and functions of recording/reproducing apparatus
 10.3. Other embodiments
11. Eighth embodiment
 11.1. Structure and functions of recording/reproducing apparatus
 11.2. Other embodiments
12. Others

4. First Embodiment

FIG. 9 shows the overall structure of a recording/reproducing apparatus 32 according to an embodiment of the present invention. The radio waves captured with an antenna 20 are demodulated as a single transport stream by a receiving means 34. In a receive mode, a transport stream from the receiving means 34 is supplied to reproducing means 40. The reproducing means 40 selects packets as to a desired service out of the transport stream and reproduces and outputs signals representing contents of services (for example, composite signals such as in NTSC) in accordance with the contents of the selected packets. A video/audio output means 46 receives the signals representing contents of services and outputs video/images.

In a record mode, the transport stream from the receiving means 34 is supplied to converting means 36. The converting means 36 converts the transport stream to a packetized data stream being multiplexed suitable for recording and generates a data stream for normal playback. The converting means 36 generates a data stream for normal playback by selecting packets as to a desired service out of the transport stream and, of these packets, selecting the packets that are needed for reproduction. A data stream for normal playback containing navigation data is generated when the desired service contains the navigation data.

Similarly, the converting means 36 also generates a data stream for special playback by selecting packets that are needed for special playback. The converting means 36 outputs the data stream for normal playback and the data stream for special playback as a data stream for reproduction. Recording means 38 records the data stream for reproduction on a recording medium 44. In this embodiment, navigation data is not contained in the data stream for special playback even when the desired service contains the navigation data.

In a normal playback mode, the data stream for normal playback is read out from the recording medium 44 with read out means 42. The data stream thus read out is supplied to the reproducing means 40. The reproducing means 40 reproduces and outputs signals representing contents of services (for example, composite signals such as in NTSC) in accordance with the data stream thus supplied. The video/audio output means 46 outputs video/images upon receipt of the signals representing contents of services.

Further, the reproducing means 40 changes the signals representing contents of services being outputted so as to carry out interactive operations based on inputs made through operations handling means 54 in accordance with the navigation data.

In a special playback mode, the data stream for normal playback is read out from the recording medium 44 with read out means 42. The data stream thus read out is supplied to the reproducing means 40. The reproducing means 40 reproduces and outputs signals representing contents of services (for example, composite signals such as in NTSC) in accordance with the data stream thus supplied. The video/audio output means 46 outputs video/images upon receipt of the signals representing contents of services.

No data processing for interactive operations is carried out in the special playback mode. In addition, the image for operation displayed just before the start of the special playback mode is disappeared with the initiation of the special playback mode.

Figure 19:
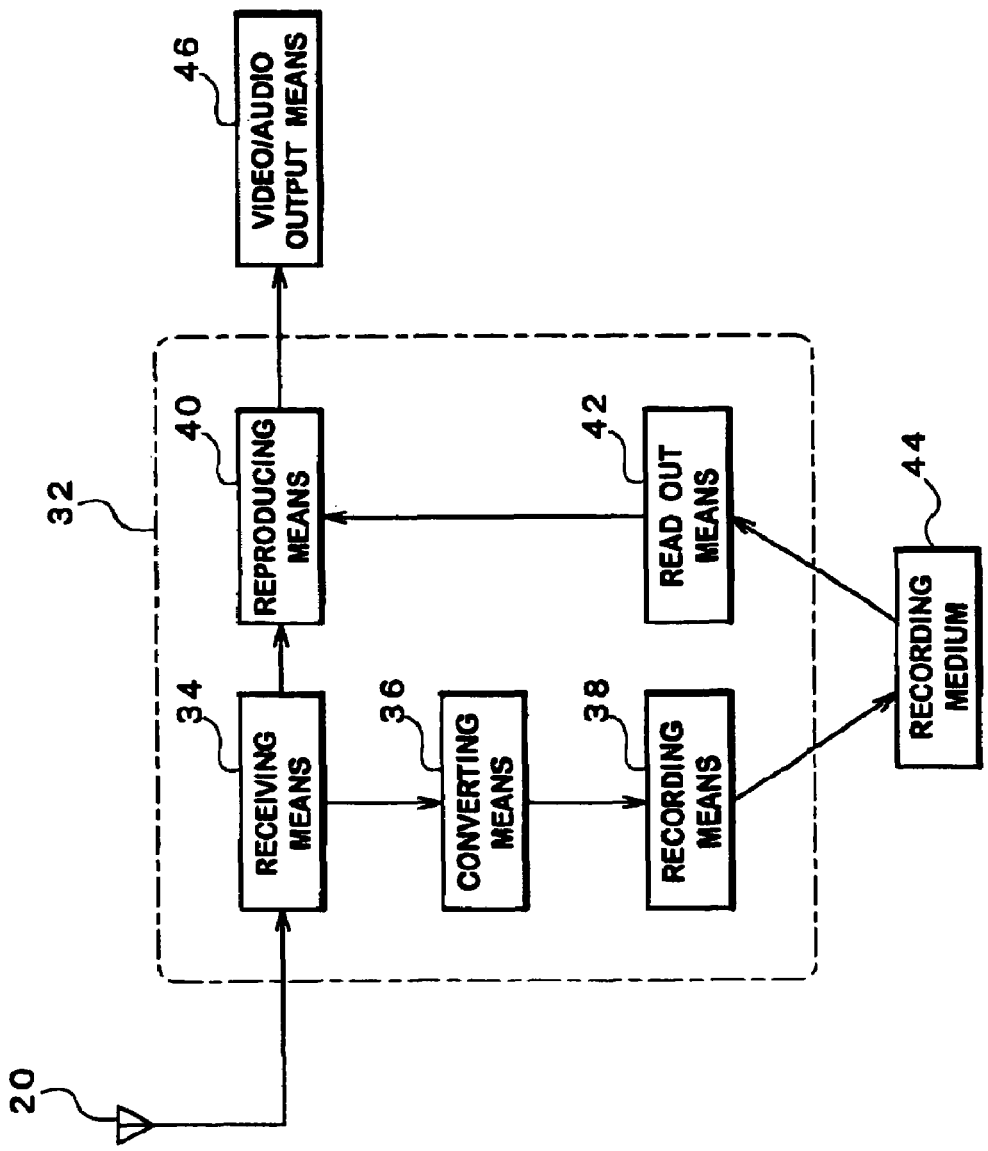
FIG. 19 is a schematic diagram illustrating the overall structure of a recording/reproducing apparatus according to the first embodiment.
Figure 20:
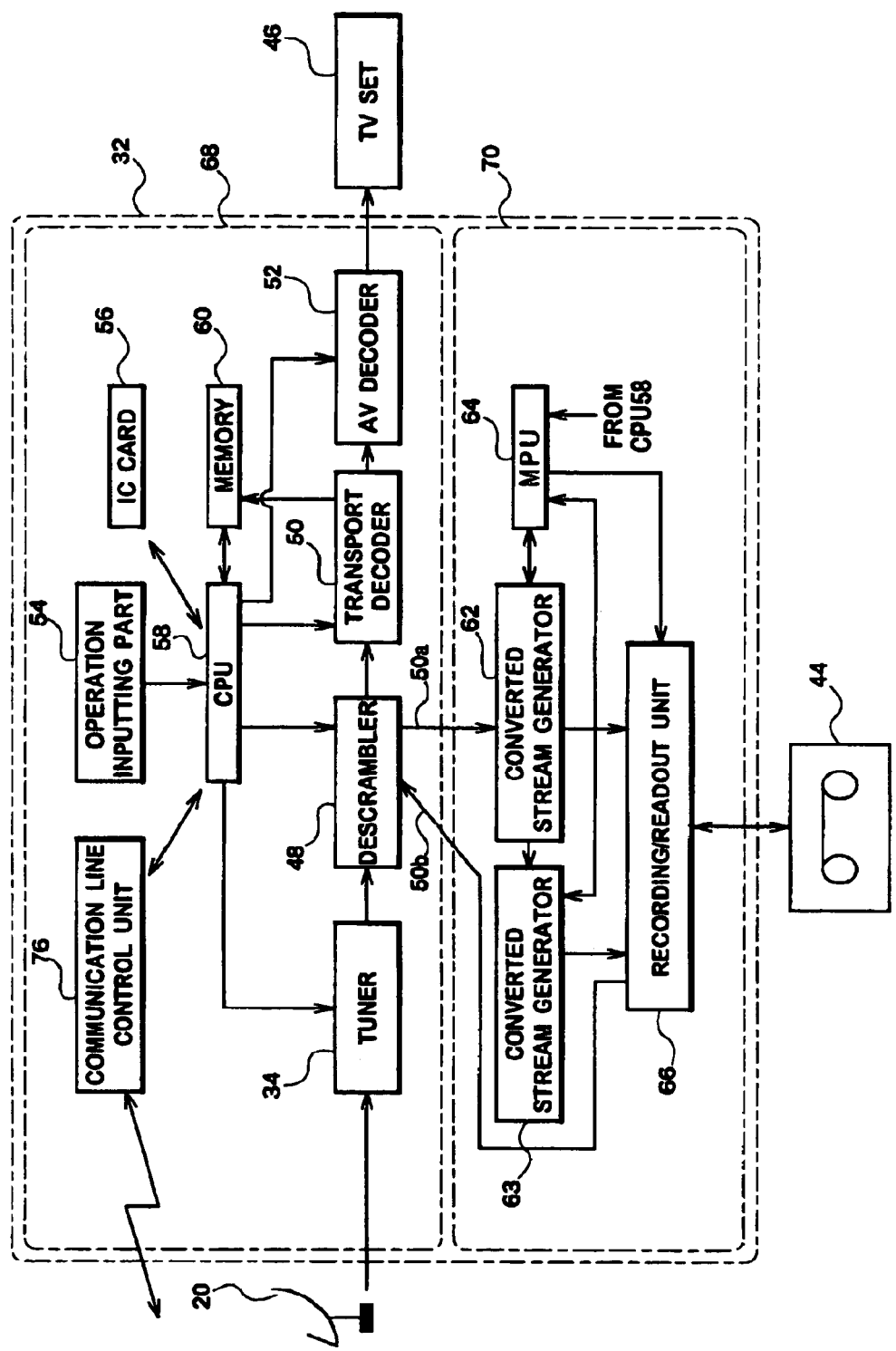
FIG. 20 is a schematic view illustrating hardware structure of the recording/reproducing apparatus according to the first embodiment.

4.2. Hardware Structure of Recording/Reproducing Apparatus and Functions Thereof FIG. 20 shows a block diagram of the recording/reproducing apparatus 32 depicted in FIG. 19 by using a CPU. The apparatus 32 comprises a receiving part 68, a recording/reproduction part 70. The CPU 58 controls other parts in accordance with a program stored in a memory 60.

The apparatus can be switched into one of a receive mode, a record mode, a normal playback mode, a special playback mode. Details of each of these modes will be described hereunder.

4.2.1 Receive Mode

Figure 8:
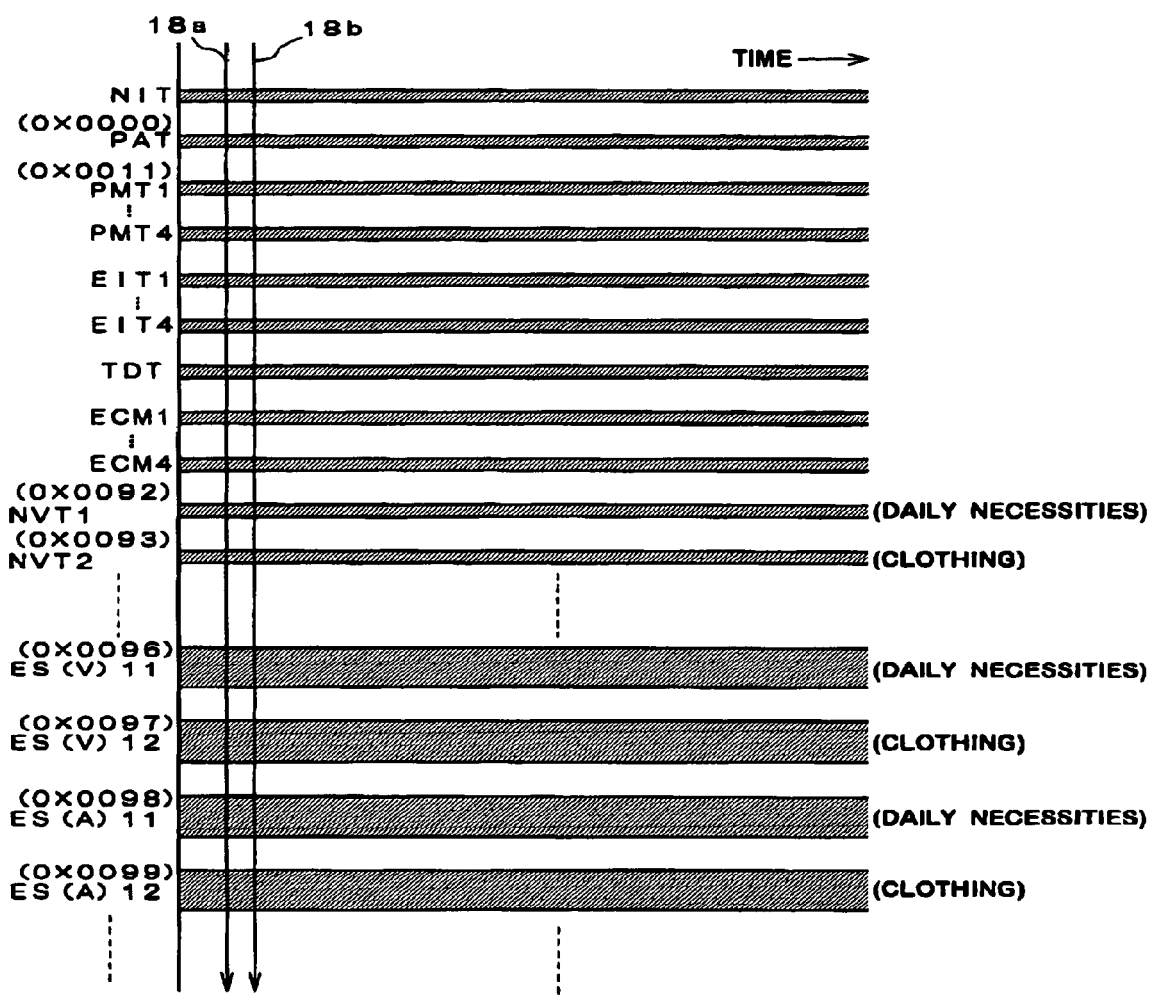
FIG. 8 is a view showing an arrangement of packetized data contained in a transport stream.
Figure 21:
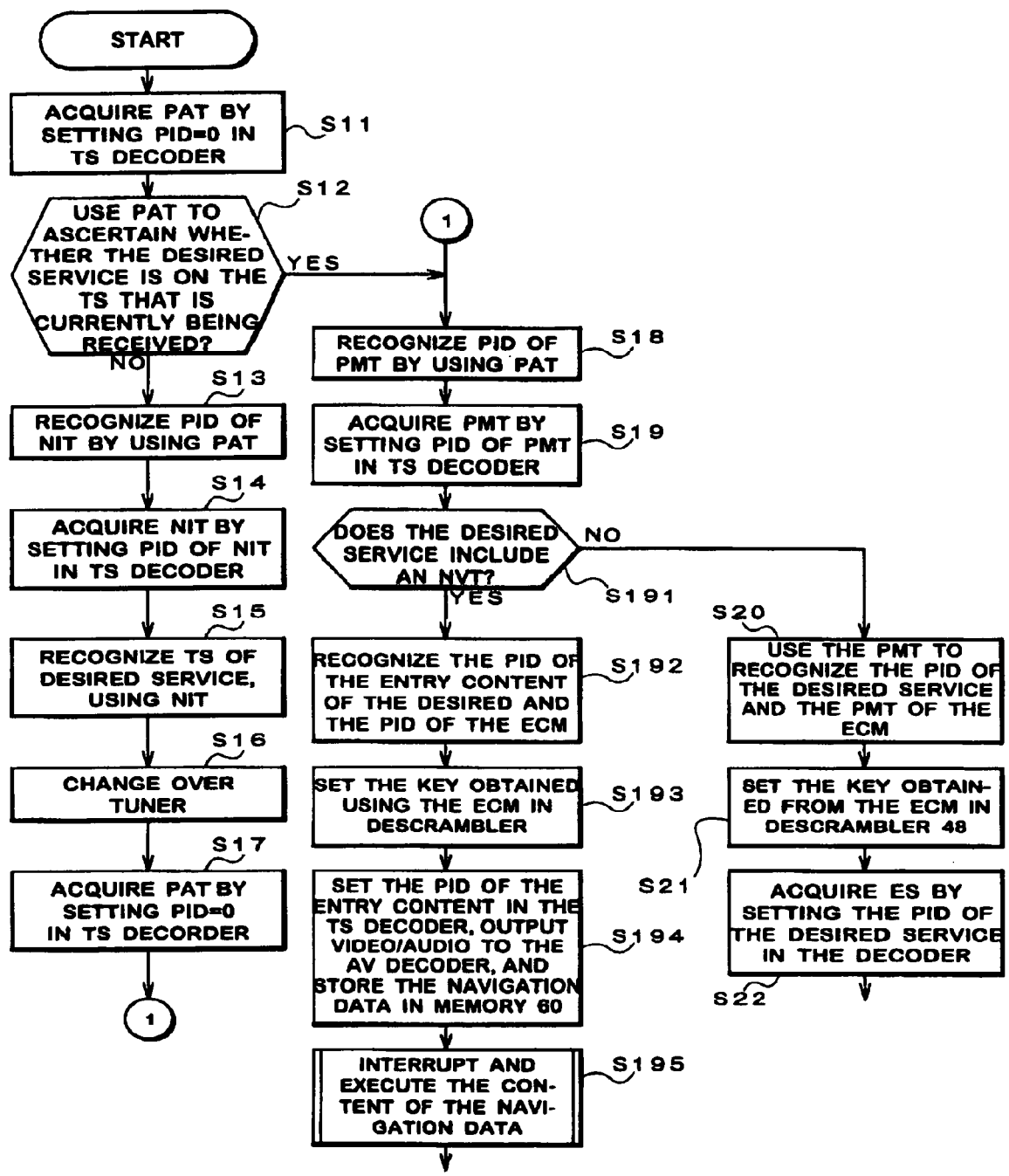
FIG. 21 is a flowchart of a program executed in a receive mode.

Here, assuming that a transport stream depicted in FIG. 8 is currently being sent. Further assumption is made that video data ES (V) 11, ES (V) 12, audio data ES (A) 11, ES (A) 12 are contained in a service SV11, and that the video data ES (V) 11 and the audio data ES (A) 11 represents contents of a tele-shopping offering daily necessities, and that that the video data ES (V) 12 and the audio data ES (A) 12 represents contents of a tele-shopping offering clothing. FIG. 21 is a flowchart of a program stored in the memory 60.

Operations of the CPU 58 upon receipt of a command for switching the service currently received to the service SV11 in the transport stream TS1 will he described under an assumption that the service SV 13 in the transport stream TS 1 is currently received. The command to the CPU 58 is provided through an operation panel or a remote controller. An operation inputting part 54 is a photo-sensing part for receiving the command from one of the operation panel and the remote controller.

Initially, the CPU 58 sets a packet ID of a PAT in a register (not shown) for separation of control data of a transport decoder (TS decoder) 50. The packet ID of the PAT is determined in fixed manner as "0X0000. The TS decoder 50 thereby records (step S11) the contents of the PAT, which is thus separated in the memory 60. The PAT contains a table of the services that are multiplexed on the transport stream TS1 that is currently being received (see FIG. 10). In this way, it is possible for the CPU 58 to realize that desired service SV11 is multiplexed on the transport TS1 that is currently being received. That is, the processing of the CPU 28 proceeds to step S18 from step S12.

In step S18, the packet ID of the PMT in the desired service SV11 is acquired using the PAT being obtained. In this case, "0x0001" is acquired (see FIG. 10). Next, the CPU 58 sets the packet ID "0x11" of the PMT in the W register of the TS decoder 50 that is used for separating the control data. In this way, control data PMT1 in the service SV11 can thereby be separated and its contents is extracted into the memory 60 (step S19).

Details of the control data PMT1 in the service SV11 is depicted in FIG. 9. The CPU 58 judges whether or not the service SV11 contains the navigation data NVTs (in other words, whether or not the service is capable of performing interactive operations) in accordance with the control data PMT1 (step S191). The contents of the service currently received are outputted when no NVTs are contained therein (steps S20, S21 and S22).

The CPU 58 recognizes packet IDs of video, audio and the navigation data these form entry-contents as well as that of ECMs for those data when the service contains the NVTs as depicted in FIG. 9 (step S192). Here, packet ID "0x0096" of the video data ES (V) 11, packet ID "0x0098" of the audio data ES (A) 11, packet ID "0x0092" of the navigation data NVT 1 and packet ID "0x0082" of ECM data for these data are recognized.

Next, the CPU 58 obtains ECM data by setting the packet ID "0x0082" of ECM data in the register of the TS decoder. Further, the ECM data thus obtained is supplied to the IC card 56 and a scramble key reproduced thereby is sent back. The scramble key thus obtained is set to the descrambler 48 (step S193). In this way, the packets of the video data ES (V) 11, ES (V) 12, the audio data ES (A) 11, ES (A) 12 and the navigation data NVT1, NVT2 are thereby put into descrambled condition.

Also, the CPU 58 sets the packet IDs "0x0096" and "0x0098" of the video data ES (V) 11 and the audio data ES (A) 11 in a register (no shown) of the TS decoder that is used for separation of ESs (step S194). As a result, the TS decoder outputs the video data ES (V) 11 and the audio data ES (A) 11 both being separated to an AV decoder 52.

Figure 13:
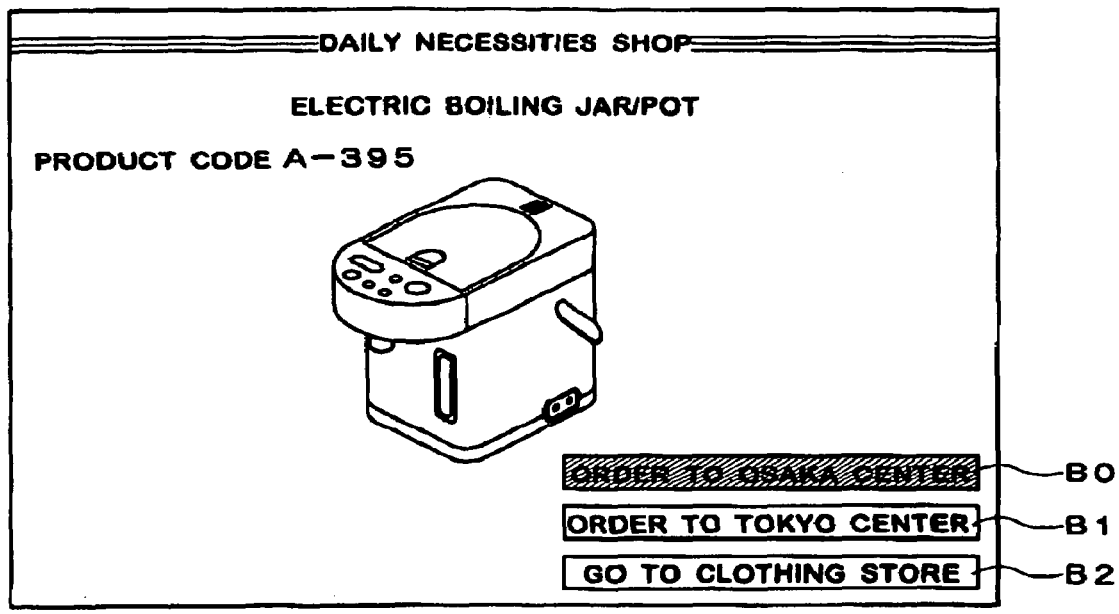
FIG. 13 is a view showing an image of tele-shopping displayed on a screen.

Upon receipt of the separated data, the AV decoder performs decompression (uncompress) of the compressed data and performs D/A (Digital to analog) conversion to generate a video composite signal. The signal thus generated is supplied to a TV set 46 and that is reproduced as video and audio thereby. Here, assuming that moving images for performing a tele-shopping offering daily necessities depicted in FIG. 13 are displayed on the screen. Buttons B0, B1 and B3 positioned at lower right of the screen are displayed in accordance with navigation described below, and no data for displaying such buttons is contained in the video data ES (V) 11 and the audio data ES (A) 11.

The CPU 58 sets the packet ID "0x0092" of the navigation data NVT1 in a register (no shown) of the TS decoder that is used for separation of control data in step S194. As a result, the navigation data NVT1 is stored in the memory 60 under the temporary basis. Assuming that the navigation data NVT1 depicted in FIG. 11 is stored therein.

Successively, the navigation data thus stored is interpreted and executed accordingly (step S195).

Figure 22:
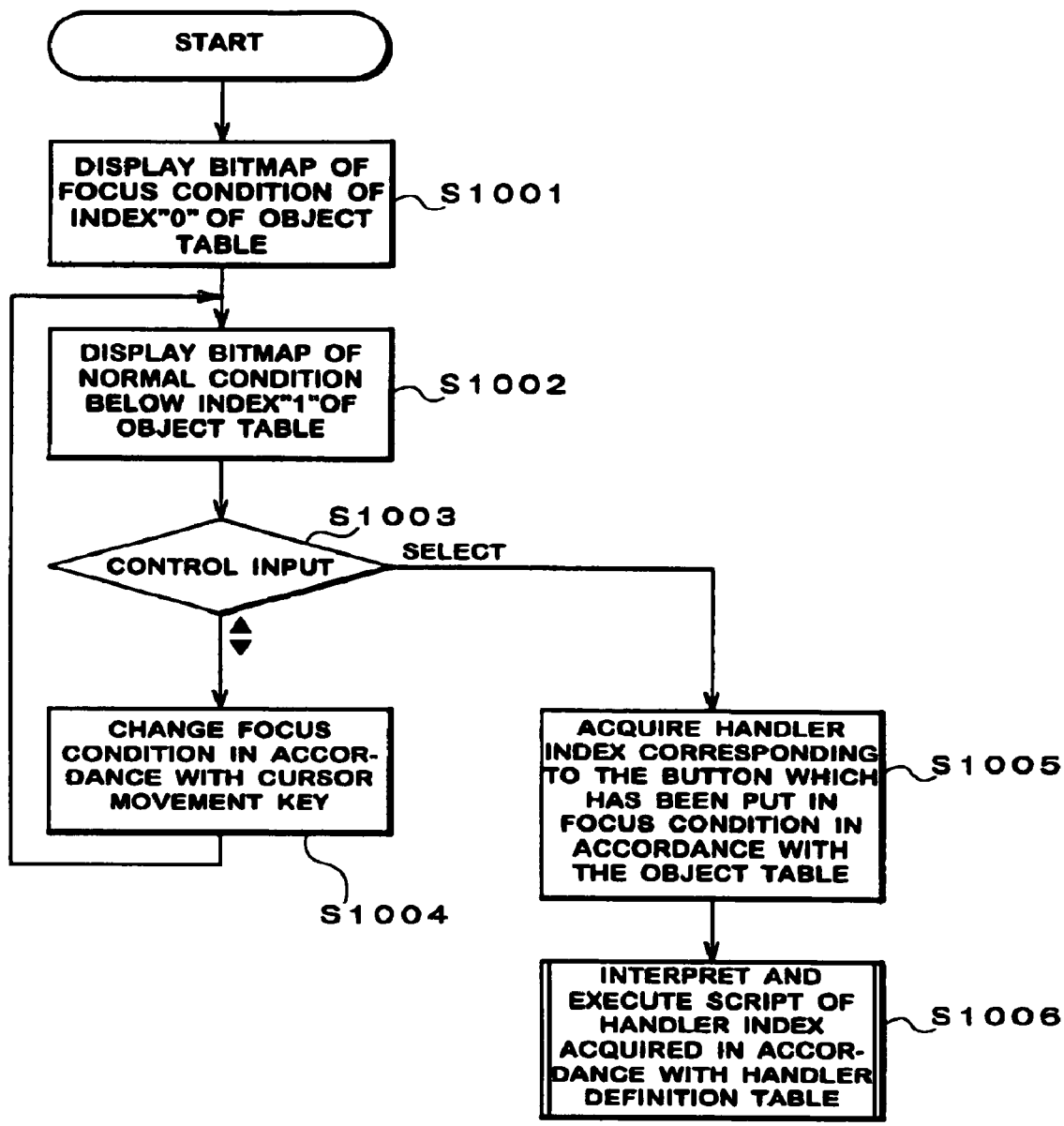
FIG. 22 is a flowchart of a program for interrupting and executing the navigation data.
Figure 23:
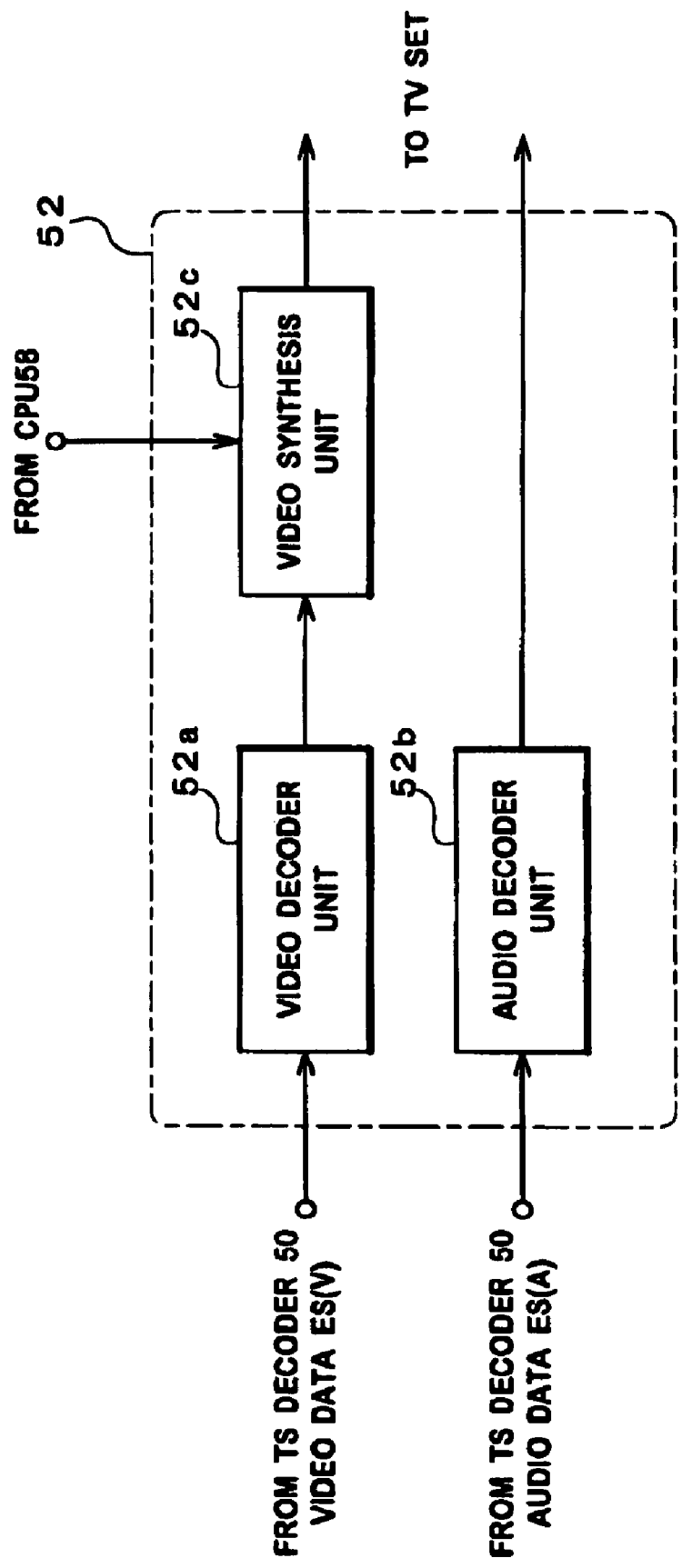
FIG. 23 is a detailed schematic view illustrating of an AV decoder 52.

FIG. 22 shows a flowchart of a program for interpreting and executing the navigation data, the program being stored in the memory 60.

At first, the CPU 58 reads out information having "0" in object index number from an object table of the navigation data NVT1 depicted in FIG. 11, and displays a button according to the information listed in the table (step S1001). In other words, bitmap data indicated in the bitmap table is displayed at a position of X co-ordinate "500" and Y co-ordinate "200". This is pre-set so as to display a bitmap of the focus condition in regard to the object of index number "0". Consequently, it is controlled so as to display the data having bitmap index number "1" (highlighted display: "place an order to Osaka center").

In practice, the CPU 58 supplies the data having bitmap index number "1" (highlighted display: "Place an order to Osaka center") to a video synthesize unit 52c of the AV decoder 52. In this way, the video synthesize unit 52c generates image data in which the highlighted display "place an order to Osaka center" is superimposed on the video data of ES (V) 11. Consequently, the button B0 is displayed on the screen of the TV set 46 as depicted in FIG. 13.

Similarly, the button B1 in FIG. 13 is displayed in accordance with the information of index "1" listed on the object table of the navigation data NVT1 depicted in FIG. 11. In this case, however, data of the bitmap index in the normal condition is displayed for object indexes other than object index "0". In other words, the display processing of "Place an order to Tokyo center", which is not highlighted, is performed (step S1002).

Furthermore, the display processing of the button B2 "Go to the clothing shop" (unhighlighted display) depicted in FIG. 13 is performed in accordance with the information of index "2" on the object table (step S1002).

By performing a plurality of processing described above, a display superimposing the buttons B0, B1 and B2 which correspond to the moving images for describing merchandise is obtained. As apparent from the screen, the display is effected in a condition with the button B0 "Place an order to Osaka Center" selected. In response to the display, the CPU 58 stores the information that objects index "0" is the currently selected object.

Next, if a key 82 of the remote controller 78 that moves the cursor downwardly is depressed, an operation inputting part 54 receives the command and notifies the command to the CPU 58. The CPU 58 identifies the input via the operation inputting part (step S1003) and proceeds the process to step S1004 if the input is the "key to move the cursor downwardly".

In step S1004, the number of the currently selected object is incremented in accordance with the object table in the navigation data NVT1 so that the object index "1" is put into the selected condition. In other words, the bitmap shown in the focus condition column is displayed in respect of the object index "1", while displaying the bitmap indicating the normal condition for the other object indexes "0" and "2".

Figure 14:
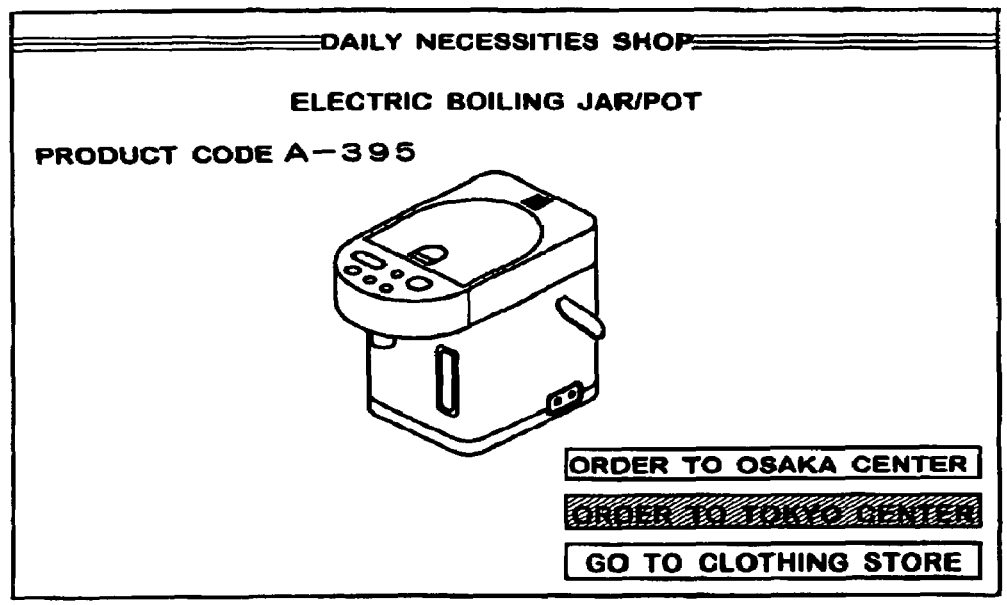
FIG. 14 is another view showing an image of tele-shopping displayed on the screen.

In this way, the screen of the TV set 46 is changes as depicted in FIG. 14. That is, the button B1 "Place an order to Tokyo center" is put in the selected condition.

Figure 15:
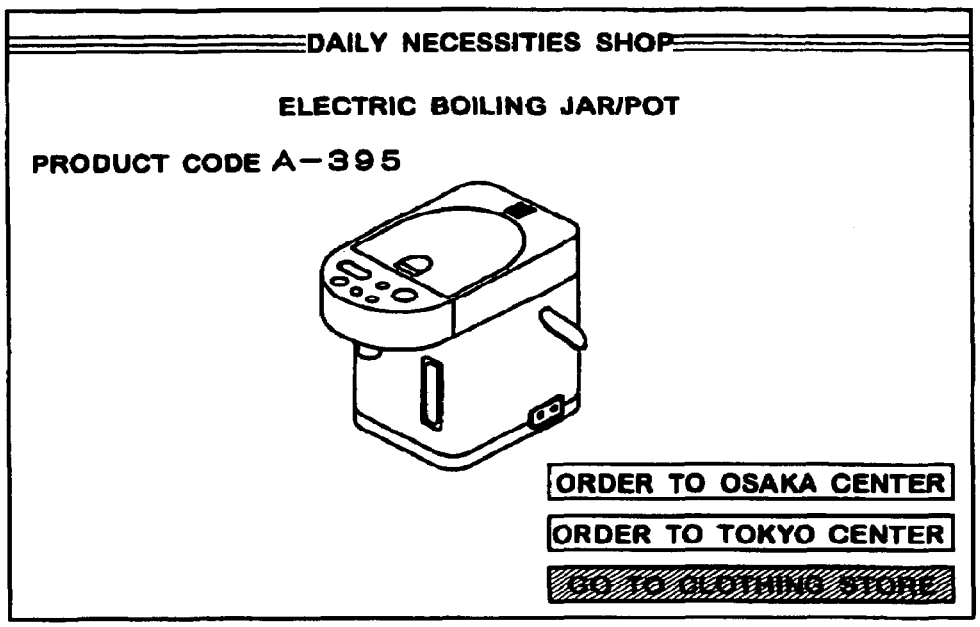
FIG. 15 is another view showing an image of tele-shopping displayed on the screen.

Furthermore, the screen display is put into a condition in which the button B2 "Go to the clothing shop" is selected when the operator depresses the key that moves the cursor downwardly as depicted in FIG. 15. Also, the screen display returns to the condition depicted in FIG. 14 from the condition depicted in FIG. 15 when a key 80 that moves the cursor upwardly is depressed.

Although, only operation of the keys 80 and 82 for moving the cursor is illustrated in the above embodiment, control of keys 86 and 88 for moving the cursor to the left and right directions can be performed as well if the object indexes are arranged two-dimensional manner.

The CPU 58 proceeds the process to step S1005 from step S1003 when the selection button 78 is depressed under the condition depicted in FIG. 15. At step S1005, the CPU 58 acquires a handler index that is given to the handler column of the object index which is currently in the selected condition by referring the navigation data NVT1. Here, it acquires the handler index "2" of the handler column because object index "2" is selected.

Furthermore, the CPU 58 acquires the script corresponding to the handler "2" and executes accordingly (step S1006). Here, it acquires a command "Go to contents (index 1)". The command "Go to contents ( )" is a command to change over the contents having thew index number within the brackets ( ) displayed in the hyper link table. Consequently, changeover to the contents (tele-shopping for clothing) of hyper link index "1" displayed in the hyper link table is performed.

The video, audio and navigation data each forming link target, packet IDs "0x0097", "0x0099" and "0x0093" of these data are respectively assigned to the hyper link index "1" of the hyper link table. The CPU 58 sets the packet IDs "0x0097" and "0x0099" in the register of the TS decoder that are used for ES separation and sets the packet ID "0x0093" in the register thereof for control data separation.

In this way, the TS decoder 50 outputs video data ES (V) 12 and audio data (A) 12 to the AV decoder. As a consequence, the TV set 46 displays the video of tele-shopping for clothing depicted in FIG. 16 and outputs the audio thereof.

Also, the navigation data NVT2 depicted in FIG. 12 is separated with the TS decoder 50 and stored in the memory 60 in place of the navigation data NVT1. The processing depicted in FIG. 22 is performed in regard to the navigation data NVT 2, with the result that buttons B10, B11 and B12 are displayed as depicted in FIG. 16.

Figure 16:
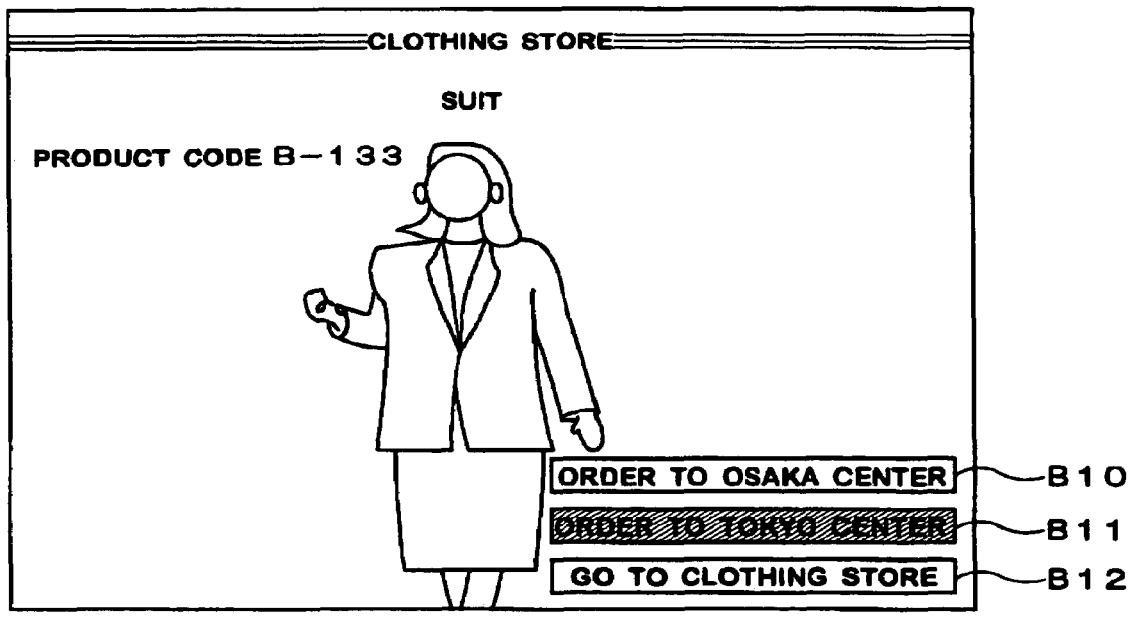
FIG. 16 is another view showing an image of tele-shopping displayed on the screen.
Figure 17:
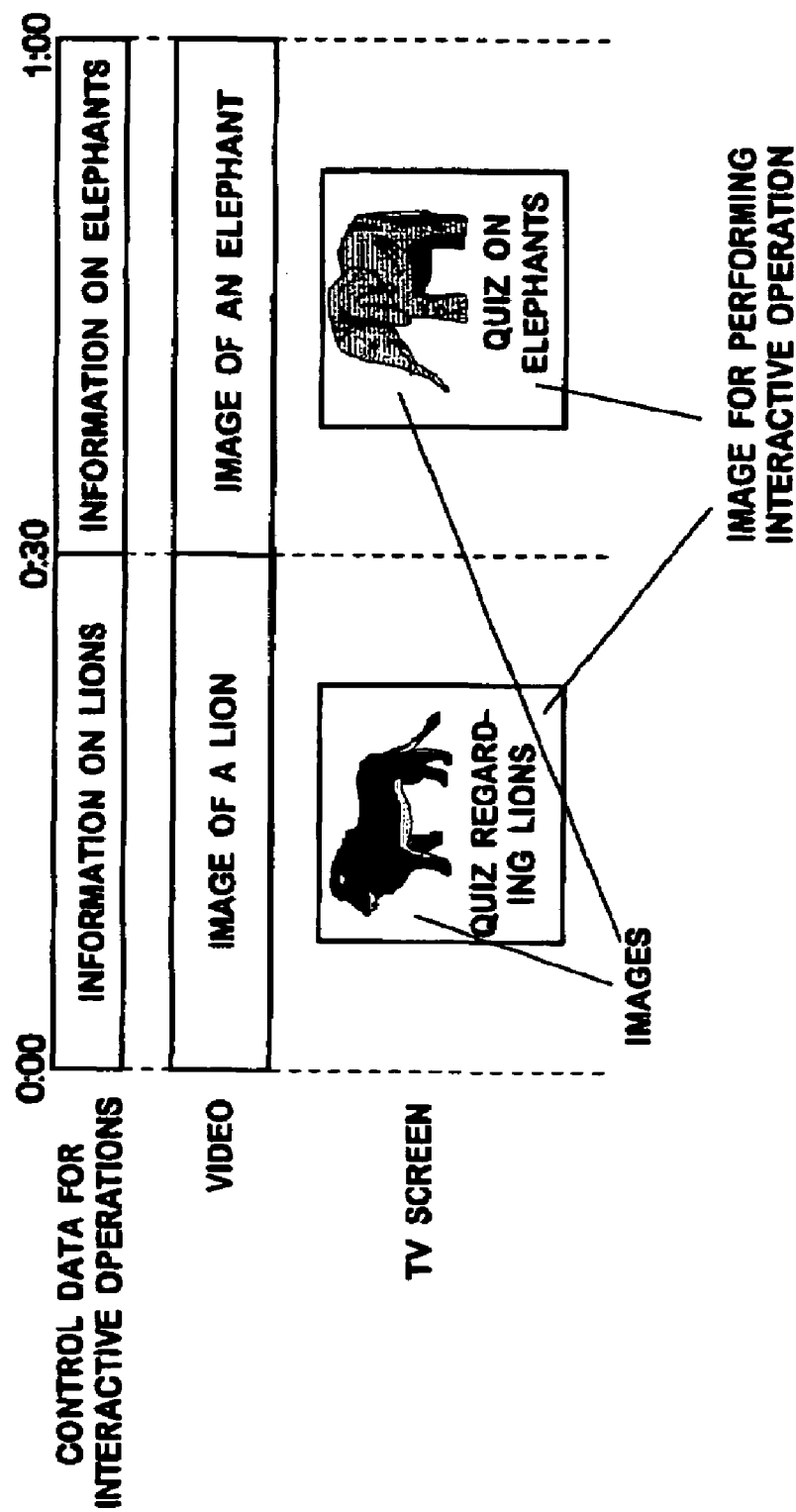
FIG. 17 is a view illustrating an example of a service in which displayed images are changed by passage of time.
Figure 18:
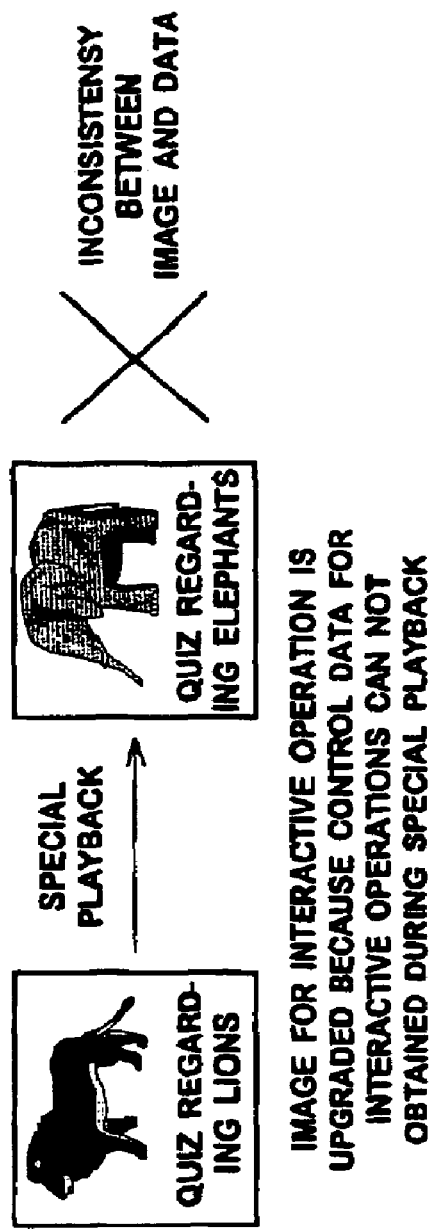
FIG. 18 is a view illustrating discrepancies occur between an image generated by special playback and an image for performing operations.
Figure 24:
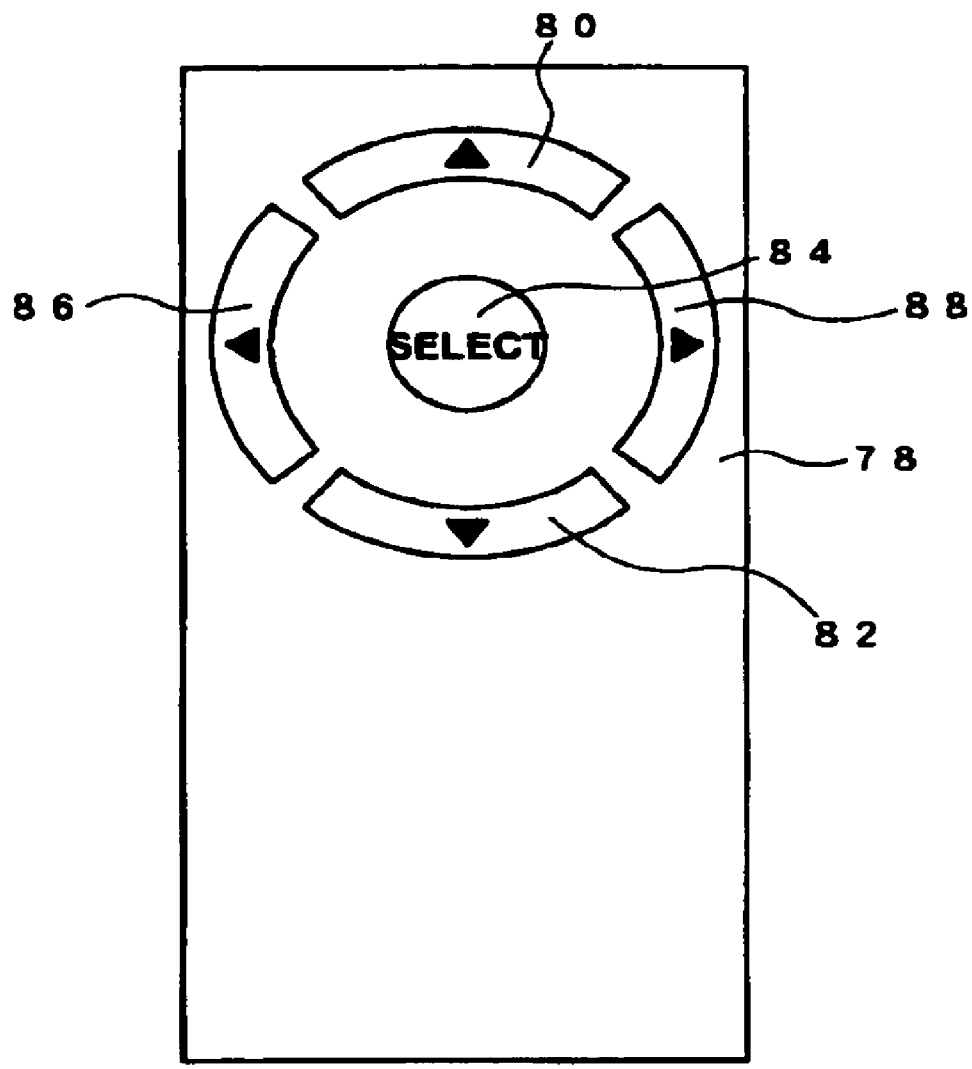
FIG. 24 is a view showing the external appearance of a remote controller.

An order placement for a merchandise displayed on the screen can be made when the operator presses the selection button 84 (see FIG. 24) under the condition with the button B10 "Place an order to Osaka center" being selected depicted in FIG. 16. The processing for the operation will be described below.

The CPU 58 proceeds the process to step S1005 from step S1003 when the selection button 84 is depressed. At step S1005, the CPU 58 acquires a handler index that is given to the handler column of the object index which is currently in the selected condition by referring the object table of the navigation data NVT1. Here, it acquires the handler index "0" of the handler column because object index "0" is selected.

Next, the CPU 58 executes the script corresponding to the handler index "0" in a handler definition table. In other words, it executes "send_string (index 1, index2)". "send_string (A,B) is a command for make a phone call the phone number of index "A" of a string able and to transmit the string of index "B". Consequently, the CPU 58 acquires a phone number "06-636-XXXX" corresponding to string index "0" in the string table and makes a phone call to the number "06-6368-XXXX" by controlling a communication line control unit 76 depicted in FIG. 10. The phone number is the number of the Osaka handling center for this tele-shopping. The CPU 58 sends data indicative of "product code: B-133" corresponding to the string index "2" in the string table when the line is connected. At time that time, the CPU 58 acquires ID(s) for specifying the purchaser from the IC card or the memory 60 and sends the ID(s) as well.

The CPU 58 records whether or not the above communications successfully done in the form of an online log in the memory 60. An example of such record is depicted in FIG. 25. An indication "O" is recorded if the communications successfully done, another indication "X" is written if not. The CPU 58 records the time at which communications took place by acquiring control data TDT contained in the transport stream and/or its own calendar or clock or the like.

It is possible to realize whether or not an order placement from the purchaser has successfully been performed by displaying the log.

Processing in the receive mode is executed as described above. Although, not described in the above, the merchandise that are described in video are designed to be changed with time in this embodiment. Consequently, it is designed to transmit navigation data of different contents corresponding thereto (for example, with different product code at index "2" of the string table).

4.2.2 Record Mode

Figure 26:
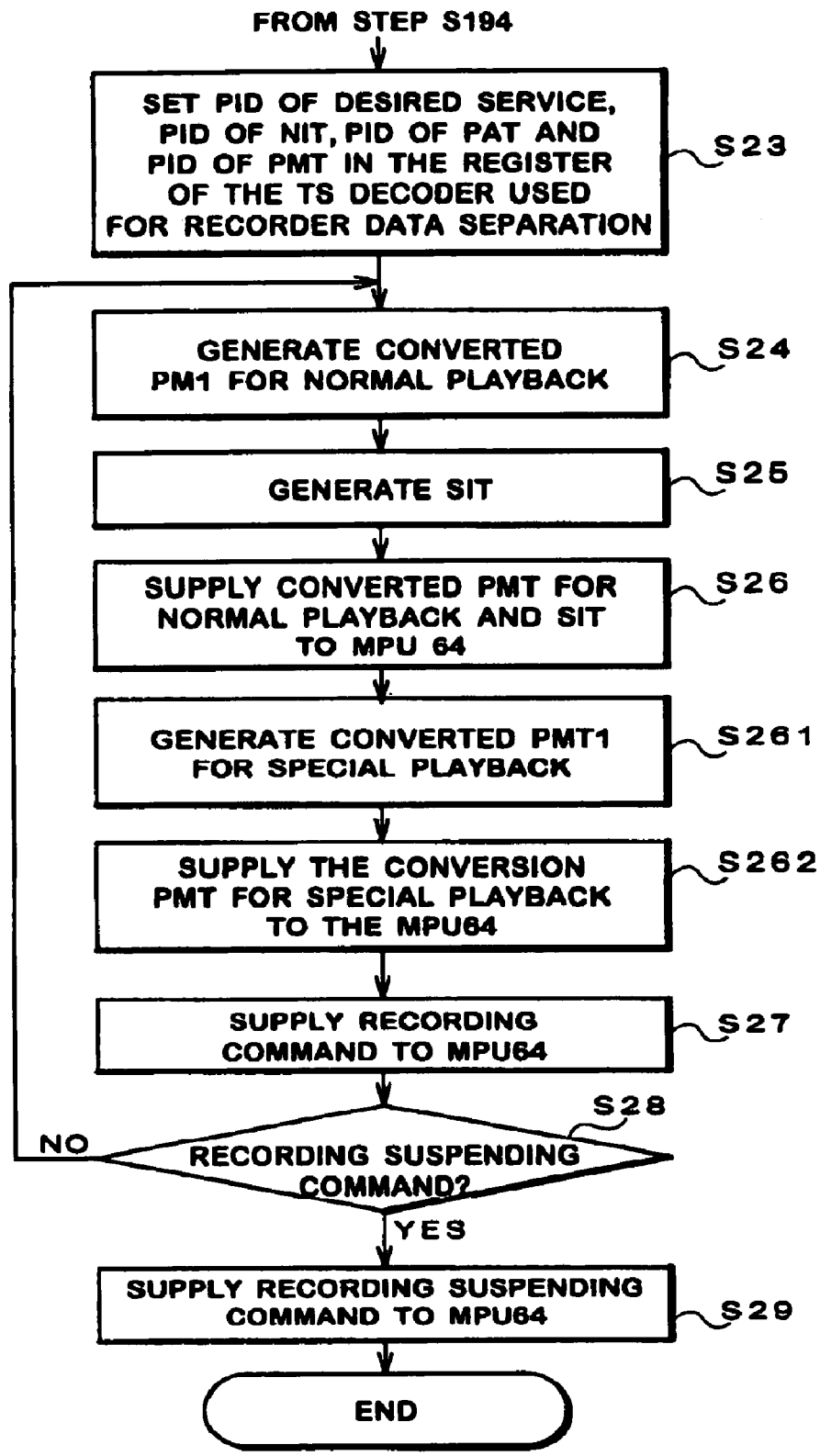
FIG. 26 is a flowchart of a program executed in a record mode.

FIG. 26 shows a program for record mode which is recorded in the memory 60, in the form of a flowchart. Steps S11 through S22 and steps S192 through S195 are the same as in the case of the receive mode. FIG. 26 shows processing in the case where a service is recorded that contains navigation data i.e. that recording processing that is performed in parallel with step S195. In FIG. 26, processing proceeds utilizing the information (packet ID) that was acquired in the receive mode. However, it is necessary to acquire the PID of the desired service and that of control data or the like by processing identical with that of the receive mode when the record mode is executed independently from the received mode.

Figure 7:
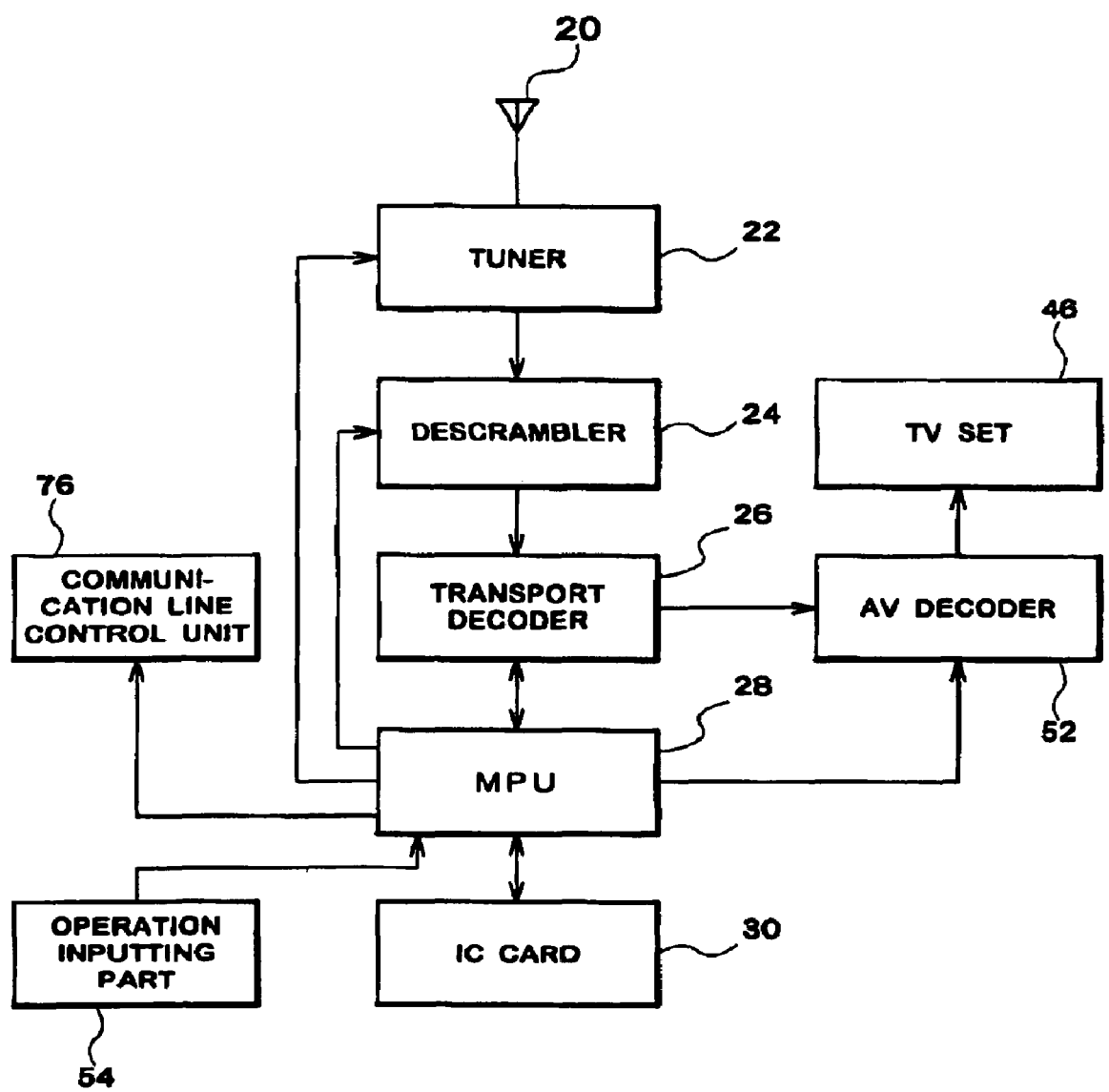
FIG. 7 is a schematic view illustrating the layout of a receiver.

At step S23, the CPU 58 sets the packet IDs of the ES, that of the navigation data NVT, that of the NIT, that of the PAT and that of the PMT in the service that is desired to be recorded in the register (not shown) of the TS decoder 50 which is used for separation of recorded data. In the case of recording the service SV11, the respective packet IDs depicted in FIGS. 25, 26, and 7 are set. For the video data, audio data and navigation data, the packet IDs for both a tele-shopping for daily necessities and that for clothing are set.

In this way, the TS decoder 50 outputs the video and audio data ES (V) 11, ES (V) 12, ES (A) 11, ES (A) 12, the PAT, PMT1 and NIT directly in the packetized condition to the a converted stream generator 62.

The CPU 58 generates a converted PMT1 for normal playback (step S24) by acquiring the converted PMT1 that is recorded in the memory 60 and selecting, of the information that is given there, only relating to the desired service SV11. For example, the packet ID of the ECM out of the information contained in the converted PMT1 is not needed during reproduction so that the packet ID is eliminated. As a result, the converted PMT1 eliminating unrelated information for recording/reproduction of the desired service SV11 is obtained out of the information contained in the PMT1. FIG. 27 shows the converted PMT for normal playback that is thus obtained.

Next, the CPU 58 generates control data SIT describing information of the services and events (programs) contained in the converted stream being recorded (step S25).

The CPU 58 supplies the PMT1 and the control data SIT thus generated to an MPU 64. The MPU 64 supplies these data to the converted stream generator 62 which generates a converted stream.

The converted stream generator 62 receives the PAT from the TS decoder 50 and thereby generates a converted PAT containing only information related to the desired service SV11, and replaces the PAT by this converted PAT. At that time, the packet ID of the NIT contained in the PAT is converted to the packet ID of the SIT. The converted PAT is shown in FIG. 28. Also, the PMT from the TS decoder 50 is replaced with the converted PMT received from the MPU 64. Furthermore, the NIT from the TS decoder 50 is substituted by the SIT received from the MPU 64.

Figure 29:
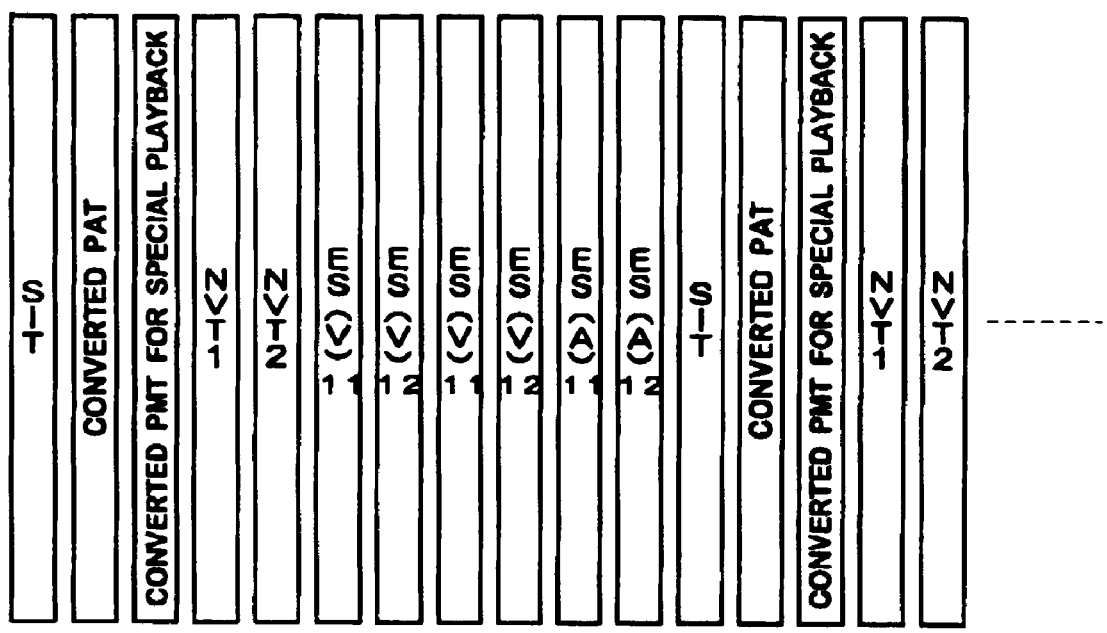
FIG. 29 is a view showing a data stream for normal playback in diagrammatic form.

In this way, a converted stream is obtained in which are packet-multiplexed the desired service ES, navigation data NVT, SIT, converted PAT and converted PMT. FIG. 29 shows the stream for the normal playback thus obtained in diagrammatic form.

Next, the process for generating a data stream for special playback will be described. The CPU 58 generates a converted PMT1 for special playback (step S261) by acquiring the converted PMT1 that is recorded in the memory 60 and further selecting, of the information that is given there, only relating to the desired service SV11. For example, packet IDs of audio that of navigation data and the like contained in the PMT1 are eliminated in this embodiment.

Figures 30, 31:
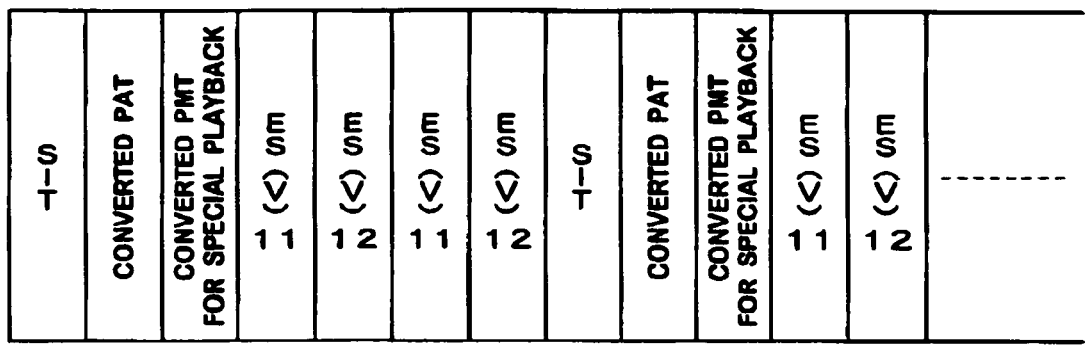
FIG. 30 is a view showing the contents of a conversion PMT for special playback.
FIG. 31 is a view showing a data stream for special playback in diagrammatic form.

As a result, the converted PMT1 eliminating unrelated information for recording/reproduction of the desired service SV11 is obtained out of the information contained in the PMT1. FIG. 30 shows a converted PMT for special playback that is thus obtained.

No packet ID of the navigation data is recorded in the conversion PMT for special playback because no interactive control is carried out during the special playback. Similarly, only a packet ID of audio is recorded since no audio is reproduced during the special playback.

The CPU 58 supplies the conversion PMT for special playback thus generated as described above to the MPU 64 (step S262). The MPU 64 supplies the PMT to a converted stream generator 63 for special playback which generates a converted stream for special playback.

The converted stream generator 63 receives a conversion PMT for normal playback. The generator 63 extracts only packets representing video (0x0096, 0x0097) out of the packets contained in the conversion PMT for normal playback and selects data so called "I picture" (data capable of reproducing images in a complete form under independent manner) out of the video packets. The generator 63 further selects packets out of the I picture so as to enable the special playback such as cue and review by adjusting the number of the packets for the playback speed thereof.

The generator 63 eliminates unnecessary packets for carrying out special playback (audio data, most of the video data, navigation data and the like) contained in the data stream for normal playback. In addition, the generator 63 replaces the PMT for normal playback with the PMT for special playback.

In this way, a converted stream for special playback is obtained in which ES of video for special playback, SIT, converted PAT and converted PMT are packet-multiplexed. FIG. 31 shows the stream for special playback thus obtained in diagrammatic form.

Next, the CPU 58 supplies a command for recording to the MPU 64 (step S27). Upon receipt of the command, the MPU 64 records the data stream for normal playback and the data stream for special playback on a magnetic tape 44 by controlling a recording/readout part 66.

Figure 32:
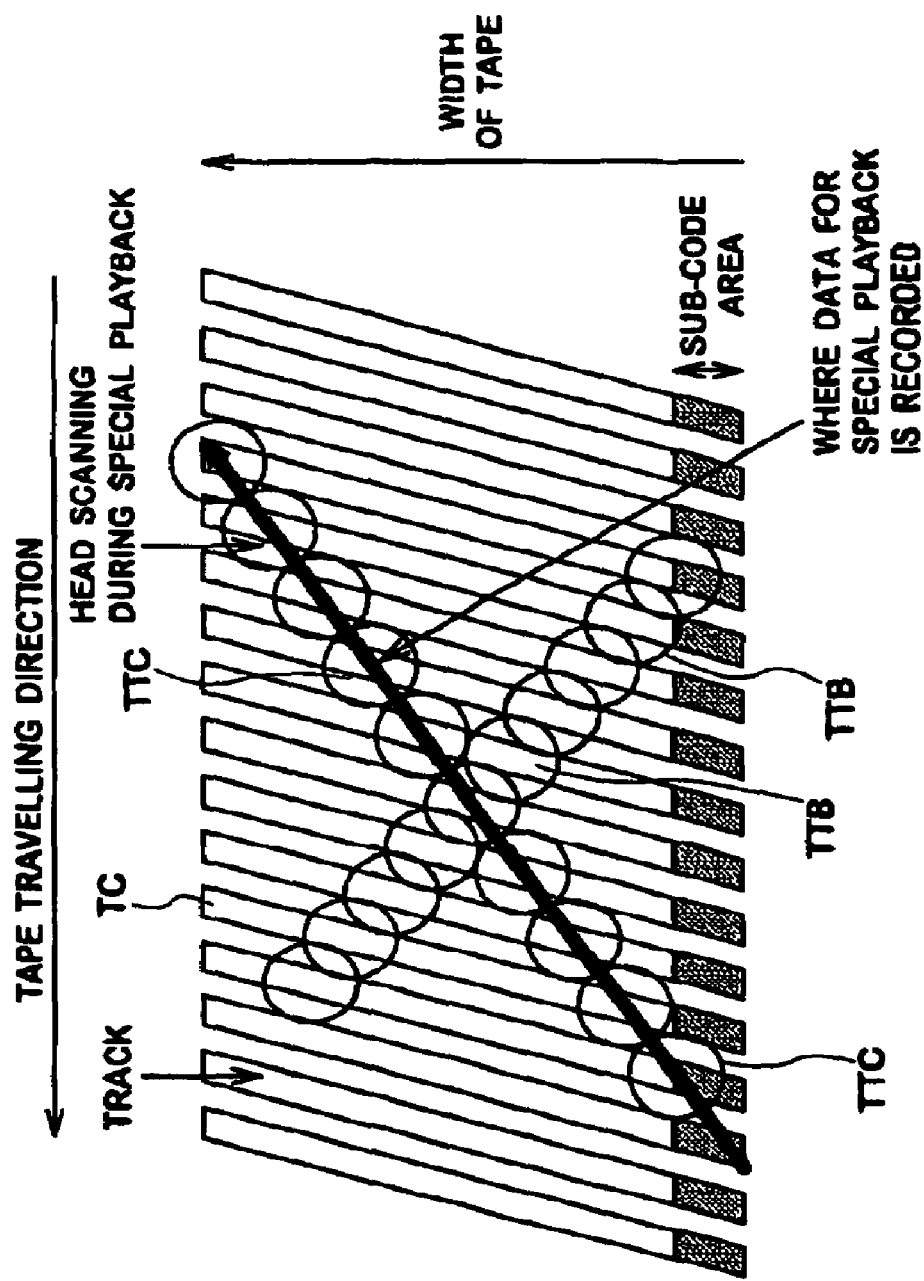
FIG. 32 is a view illustrating a state of a data stream for reproduction being recorded

FIG. 32 is a view illustrating a state of a data stream for reproduction being recorded. The recording/readout part 66 records the stream for normal playback on a track TC. The recording/readout part 66 is controlled for sequentially recording the stream for special playback on a region TTC extending so as to across a plurality of the track TC. The stream recorded on the region TTC is a stream for cue mode. Similarly, a stream for review mode is recorded on a region TTB.

When a command for suspending playback is provided from the operation inputting part 54, the CPU 58 supplies the command to the MPU 64 (steps S28 and S29). Upon receipt of the command, the MPU 64 suspends recording performed by the recording/readout part 66.

Control data and navigation data contained in the stream for special playback being recorded on the magnetic tape 44 are repeatedly packetized and multiplexed even the contents of which are identical with these data being unprocessed. As a consequence, reproduction of the magnetic tape can be performed even starting at a mid-way thereof.

Figure 33:
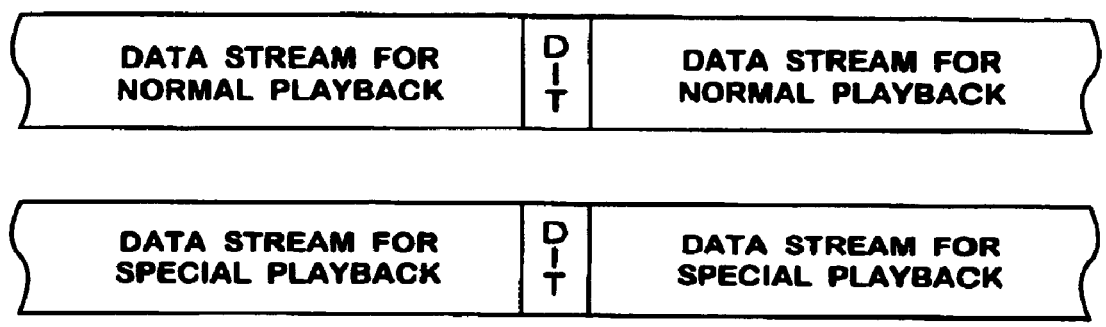
FIG. 33 is a view illustrating a state of control data DIT being recorded.

If another service is selected during the recording of the service currently received, the service selected latter is recorded after the selection In that case, the generator 62 and the generator 63 generate control data DIT (Discontinuity Information Table) indicative of the boundary for discontinuity of information as a result of detecting discontinuity of the service (information) by themselves or in accordance with a command from the CPU 58. The control data DIT thus generated is allocated at the head of the service latter selected and is packet-multiplexed as depicted in FIG. 33. Similarly, DIT is allocated at the head of when totally new recording is started. DIT is also allocated when different program is recorded even in the same service.

All of the video, audio, navigation data contained in the service SV11 are recorded in the stream for normal playback regardless of the change in display of the received data (change depicted if FIGS. 29 through 32) performed in accordance with the navigation data NVT1 and NVT2.

Although, the generator 62 and the generator 63 are provided in the recording/reproducing part 70 in this embodiment, these generators can be provided in the receiving part 68. By doing that, the recording/reproducing part 70 may simply record a conversion stream outputted from the receiving part 68 as it is.

4.2.3 Normal Playback Mode

Figure 34:
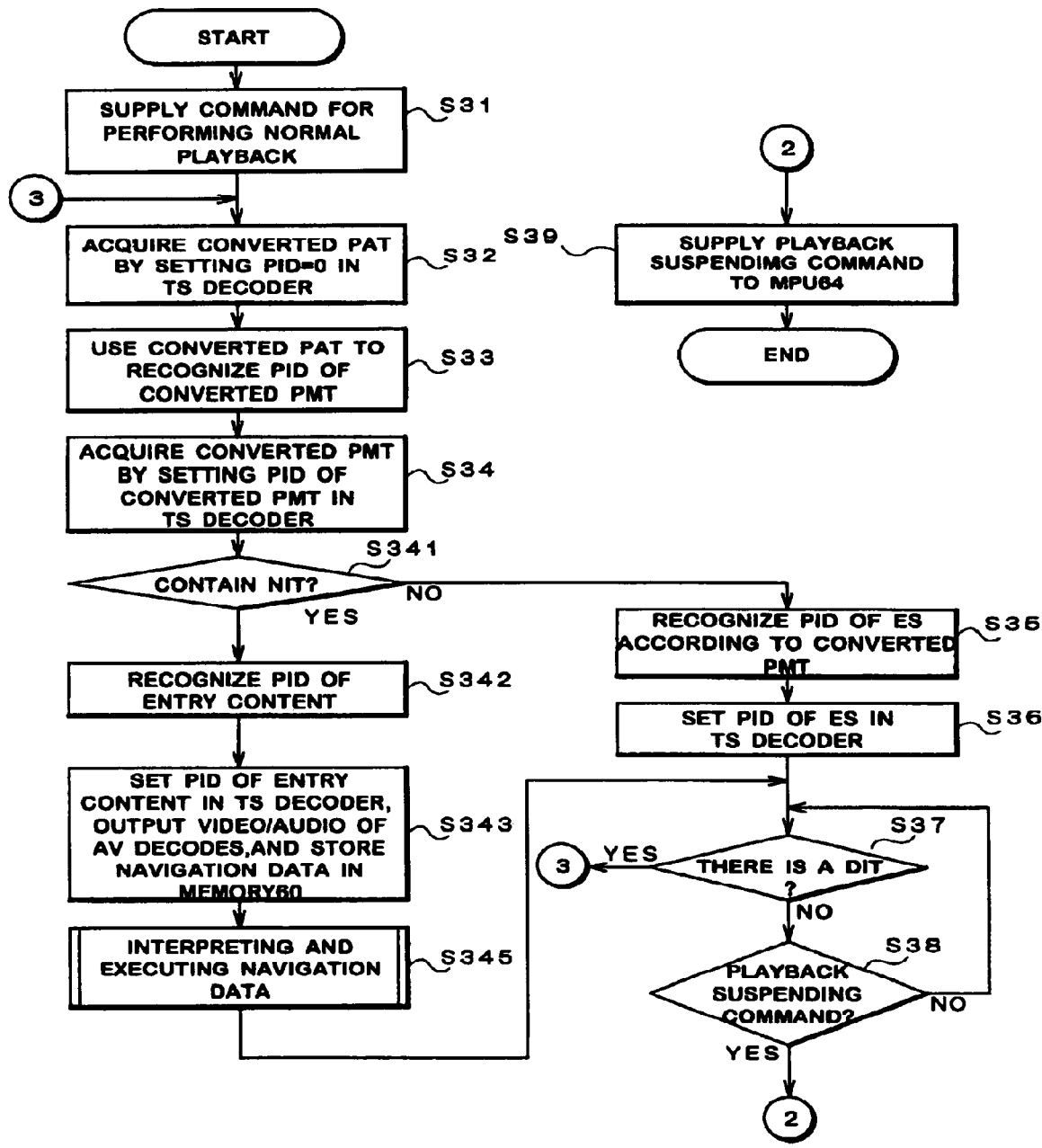
FIG. 34 is a flowchart of a program for executing a normal playback mode.

FIG. 34 shows a program for a normal playback mode which is recorded in the memory 60, in the form of a flowchart. When a command for performing normal playback is provided, the apparatus is turned into the normal playback mode. Description in below is made under an assumption that data recorded during the record mode described above are reproduced.

Initially, the CPU 58 supplies a command for performing normal playback to the MPU 64. Upon receipt of the command, the MPU 64 controls the recording/readout part 66 so as to read out a stream for normal playback from the magnetic tape. The stream thus read out is provided to the TS decoder 50.

Subsequently, the CPU 58 sets a packet ID "0x0000" of a conversion PAT in a register for separation of control data of TS decoder 50, and the converted PAT in the converted stream is thereby separated and stored in the memory 60 (step S32). The packet ID of the converted PMT is recognized from the description of thereof given in this converted PAT (step S33).

Further, the packet ID "0x0001" of the converted PMT is set in the register for separation of control data of the TS decoder 50, and the converted PMT is thereby separated from the converted stream and stored in the memory 60 (step S34). The description of the converted PMT is used to judge whether or not the navigation data NVT is contained in the service that is to be reproduced (step S341).

Processing proceeds to step S342 if the navigation data NVT is contained therein. In step S342, the description of the converted PMT is used to recognize the packet ID of the entry-contents. The packet ID s "0x0096", "0x0098" and "0x0092" of the video data ES (V) 11, audio data ES (A) 11 and thew navigation data NVT1 are then recognized (step S342).

Next, the CPU 58 sets the packet ID s of the video data ES (V) 11 and audio data ES (A) 11 in the register for ES separation of the TS decoder 50, and sets the packet ID of the navigation data NVT 1 in the register for control data separation.

In this way, the TS decoder 50 separates the video data ES (V) 11 and the audio data ES (A) 11 from the converted stream. The separated video data ES (V) 11 and the separated audio data ES (A) 11 are then outputted to the AV decoder 52 (step S343).

Upon receipt of the separated data, the AV decoder 52 performs decompression (uncompress) of the compressed data and performs D/A (Digital to analog) conversion to generate a video composite signal. The signal thus generated is supplied to the TV set 46 and that is reproduced as video and audio thereby. In this way, video depicted in FIG. 13 can be obtained.

Also, the TS decoder 50 separates the navigation data NVT 1 from the converted stream and the navigation data NVT 1 is stored in the memory 60 under the temporary basis (step S343). The navigation data NVT1 is then interpreted and executed accordingly (step S345). This partial processing is the same as that performed in the flowchart shown in FIG. 22. Consequently, the buttons B0, B1 and B2 are displayed on the screen, with the selected condition as depicted in FIG. 13.

Subsequently, the selected button is altered as depicted in FIGS. 13, 14 and 15 when the buttons 80 and 82 that move the cursor. Also, as shown in FIG. 16, the contents is altered to the contents of the tele-shopping for clothing when the selection button 84 is depressed under the condition depicted in FIG. 15. Further, a phone call is made to the Osaka center when the selection button 84 is depressed in the condition where the button B10 depicted in FIG. 16 is selected, and an order placement for a merchandise is carried out. An online log storing the success or incomplete communication is also stored in the memory 60 as depicted in FIG. 25.

It should be noted that the distinction between communications made at the receive mode and that made at the playback mode is recorded in the "mode" column.

A described above, the contents can be interactively altered under the control performed by the operator even in the playback mode, just as in the receive mode.

If, the CPU 58 discovers the presence of a DIT in the converted stream during the playback, the process returns to step S32, and performs the following processing of the converted PAT (step S37). This is because the DIT indicates a point of discontinuity of the recorded data. The process also stops the display of the image (the button B0 and the like) for control purposes that was displayed in accordance with the navigation data and ensures that interactive processing based on the currently stored navigation data is not performed.

When a command for suspending playback is provided from the operation inputting part 54, the CPU 58 supplies the command to the MPU 64 (steps S38 and S39). Upon receipt of the command, the MPU 64 suspends readout of the stream for normal playback from the magnetic tape 44 performed by the recording/readout part 66 as a result of control there of.

4.2.4 Special Playback Mode

Figure 35:
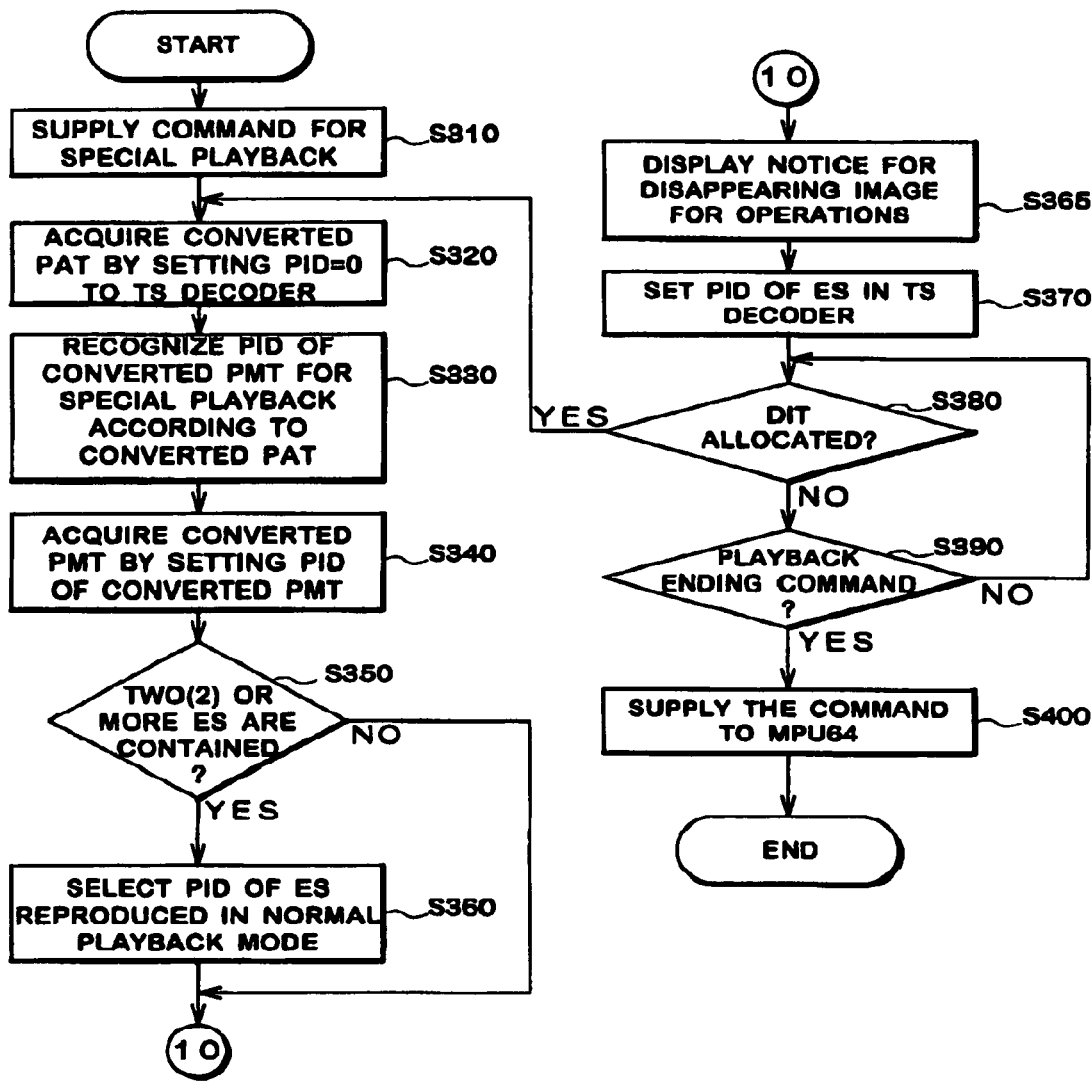
FIG. 35 is a flowchart of a program for executing a special playback mode.

FIG. 35 shows a program for executing a special playback mode which is recorded in the memory 60, in the form of a flowchart. When a command for performing normal playback is provided, the apparatus is turned into the normal playback mode. Description in below is made under an assumption that data recorded during the record mode described above are reproduced.

The CPU 58 supplies the command performing normal playback to the MPU 64. Upon receipt of the command, the MPU 64 controls the recording/readout part 66 so as to read out a stream for special playback from the magnetic tape 44. The stream thus read out is provided to the TS decoder 50.

Subsequently, the CPU 58 sets the packet ID "0x0000" of a conversion PAT in the register for separation of control data of TS decoder 50, and the converted PAT in the converted stream is thereby separated and stored in the memory 60 (step S340). The packet ID "0x0011" of the converted PMT for special playback is recognized in accordance with description of the converted PAT (step S330).

Further, the packet ID "0x0011" of the converted PMT is set in the register for separation of control data of the TS decoder 50, and the converted PMT is thereby separated from the converted stream and stored in the memory 60 (step S340). The description of the converted PMT is used to judge whether or not two (2) or more contents (ES) that to be reproduced in special playback are contained in accordance with the description of the converted PMT (step S350). Here, the process proceeds to step S360 because there are two (2) of ESs in the PMT as depicted in FIG. 30.

In step 360, the contents being reproduced under normal playback mode at right before the current special playback mode is selected. For example, if the ES (V) 12 (clothing store) was reproduced under normal playback mode, the ES (V) 12 (clothing store) is selected.

Any contents may be selected if no contents were reproduced under normal playback mode at the right before the current playback.

Also, if just one content is contained in the PMT, the content is selected.

Subsequently, the CPU 58 sets the packet ID of the video data ES (V) 12 in the register for ES separation of the TS decoder 50. As a result, the TS decoder 50 separates the video data ES (V) 12 from the converted stream. The separated video data ES (V) 12 is then outputted to the AV decoder 52 (step S370).

Upon receipt of the separated data, the AV decoder 52 performs decompression (uncompress) of the compressed data and performs D/A (Digital to analog) conversion to generate a video composite signal. The signal thus generated is supplied to the TV set 46 and that is reproduced as video and audio thereby as video for special playback (cue, review).

As described above, neither of interactive operations nor display of the image for performing operation are carried out in this embodiment. This leads that the image displayed during normal playback mode disappears at the time the apparatus is in special playback mode without any given notice. In this embodiment, however, a command for displaying a notice of disappearance of the image is outputted to the AV decoder 52 for displaying the notice. For example, a notice "No image for performing operation is displayed in cue mode" is displayed on the screen.

When a command for suspending playback is provided from the operation inputting part 54, the CPU 58 supplies the command to the MPU 64 (steps S390 and S400). Upon receipt of the command, the MPU 64 suspends readout of the stream for special playback from the magnetic tape 44 performed by the recording/readout part 66 as a result of control there of.

In this embodiment, the same packets IDs are used for contents corresponding to one another in both normal playback and special playback. In this way, linearity of contents in the case of changing playback mode from normal playback mode to special playback mode even when not two (2) or more contents are contained.

4.3. Other Embodiments

4.3.1 Displaying Image for Operations as it is

In the above-described embodiment, the image for interactive operation is disappeared with the initiation of the special playback mode. However, the image for performing operations in normal playback mode may be displayed continuously even in special playback mode by storing the image in the video synthesize unit 52c of the AV decoder 52.

If continuous display is performed as described above, there might be a possibility of causing inconsistencies between images displayed according to special playback and the image for performing operations. The following countermeasure should be taken in order to avoid the inconsistencies.

A version upgrade flag (version upgrade information) is included in the data stream for special playback at when upgrade of the navigation data is detected in the record mode. For example, the flag is written in the conversion PAT and the conversion PMT.

In the special playback mode, the image for performing operations in the normal playback is displayed as it is, and display of the image is suspended if upgrade of the navigation data is detected as a result of observing the presence of the flag in the conversion PAT and the conversion PMT. In this way, the inconsistencies between images displayed according to special playback and the image for performing operations can be avoided.

Upgrade of the navigation data may also be detected by recognizing history of the version on the navigation data being recorded instead of the version upgrade flag.

4.3.2 Including Image for Operations in Data Stream for Special Playback

Figures 36, 37:
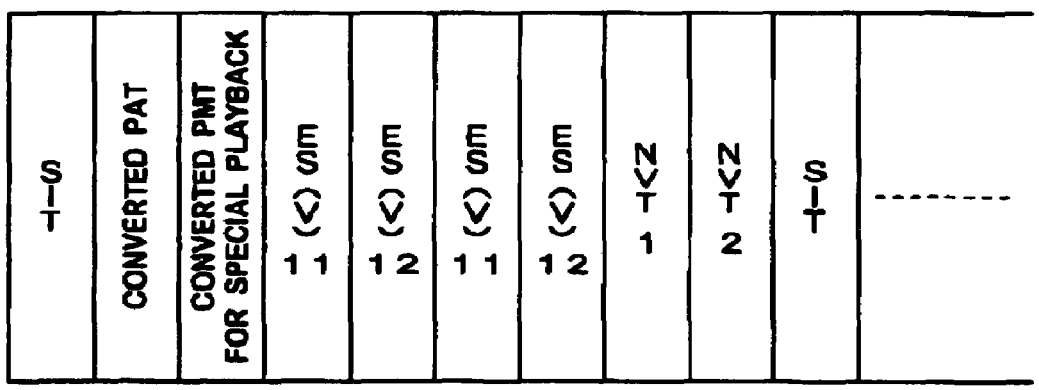
FIG. 36 is a view showing the contents of a conversion PMT for special playback.
FIG. 37 is a view showing a data stream for special playback in diagrammatic form.

In the embodiment described above, none of the image for performing operations is contained in the stream for special playback. However, data NV1 and NV2 indicative of the image for performing operations may be included in the stream for special playback as depicted in FIGS. 36 and 37. As depicted in FIG. 36, packet IDs of the image for performing operations are designed to be the same to that of the navigation data defining the image. This is to the same as the reason for using the same packet IDs for contents corresponding to one another in both normal playback and special playback in the special playback mode.

In the special playback mode, an image for performing operations corresponding to video currently displayed is displayed in accordance with the stream for special playback. In this way, the inconsistencies between images displayed according to special playback and the image for performing operations can be avoided.

During the service without any pictures such as satellite digital audio broadcast, no Images are displayed on the screen when the image for operations is disappeared. Under the circumstances so called blackout, the viewers feels insecure from a probability that the apparatus might be out of order. It is advantageous to display the image for performing operations even in the case.

In this embodiment, no input for operation is handled during the special playback mode. In order to clarify this, a warning notice such as "No interactive operations can be performed during the playback is in cue" may be displayed on the screen.

5. Second Embodiment

5.1. Structure and Functions of Transmitter

Figure 2:
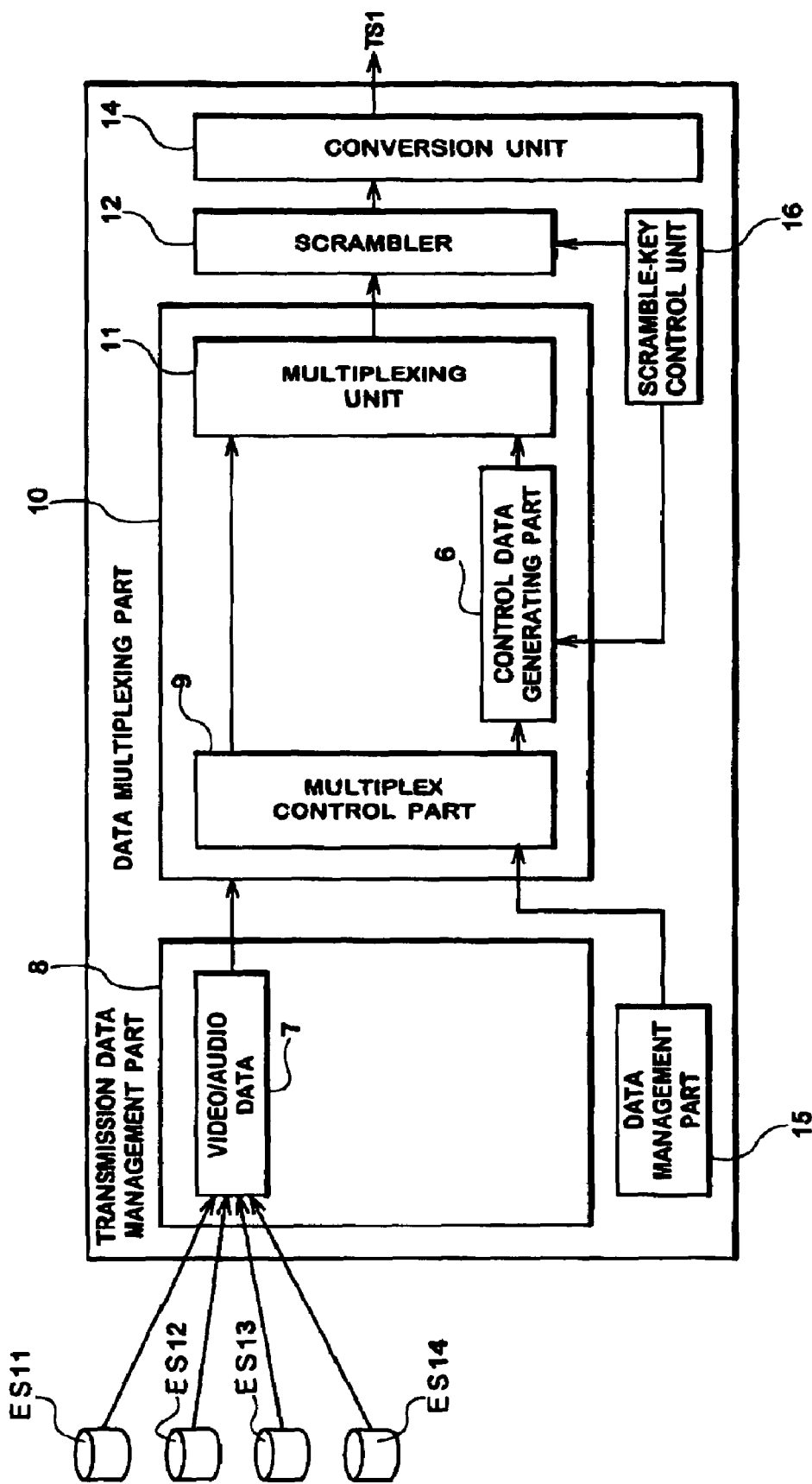
FIG. 2 is a schematic view illustrating the layout of a transmitter.
Figure 3:
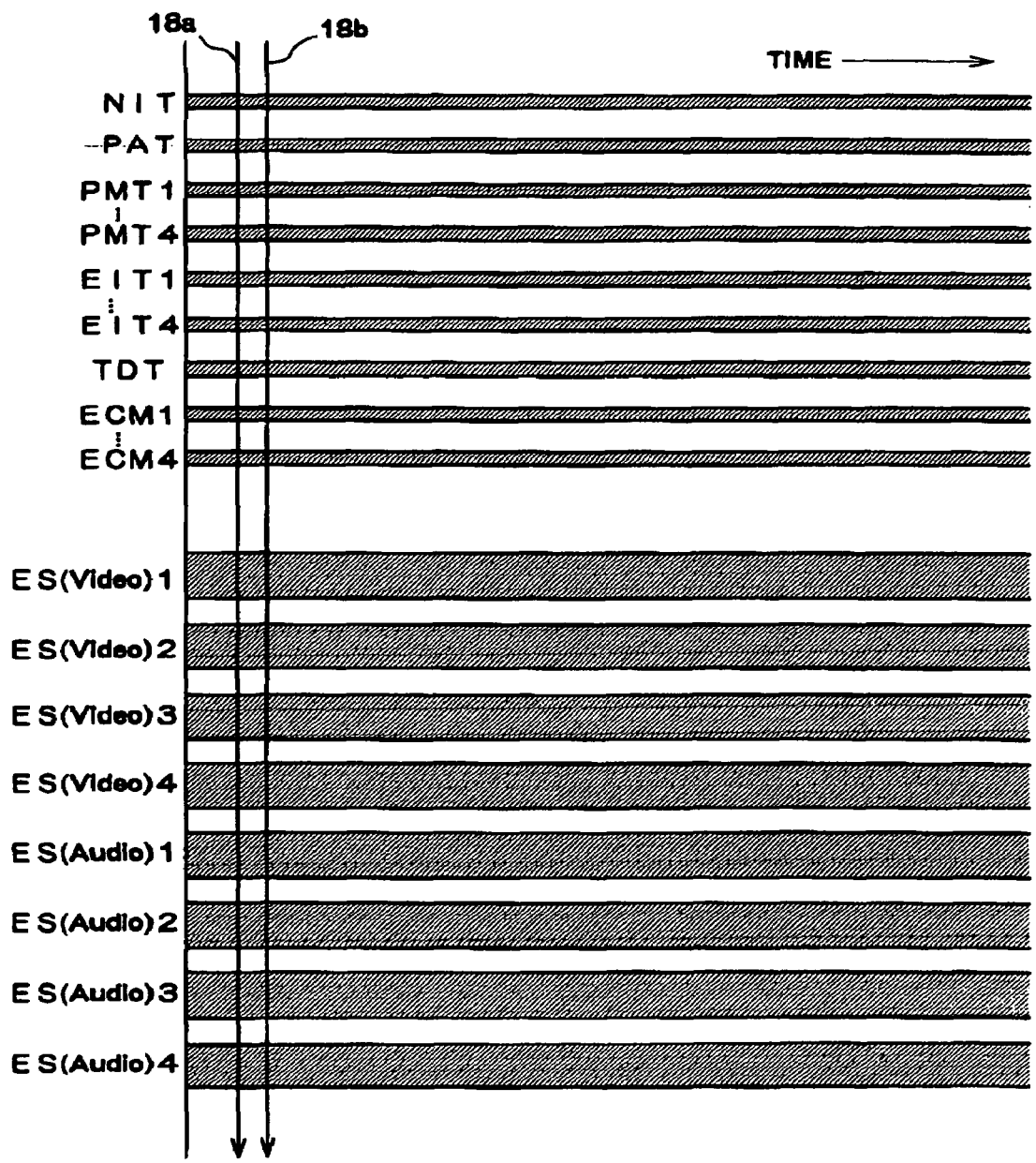
FIG. 3 is a view showing the layout of the packetized data.
Figure 4:
FIG. 4 shows a data structure of packetized data.
Figure 5:
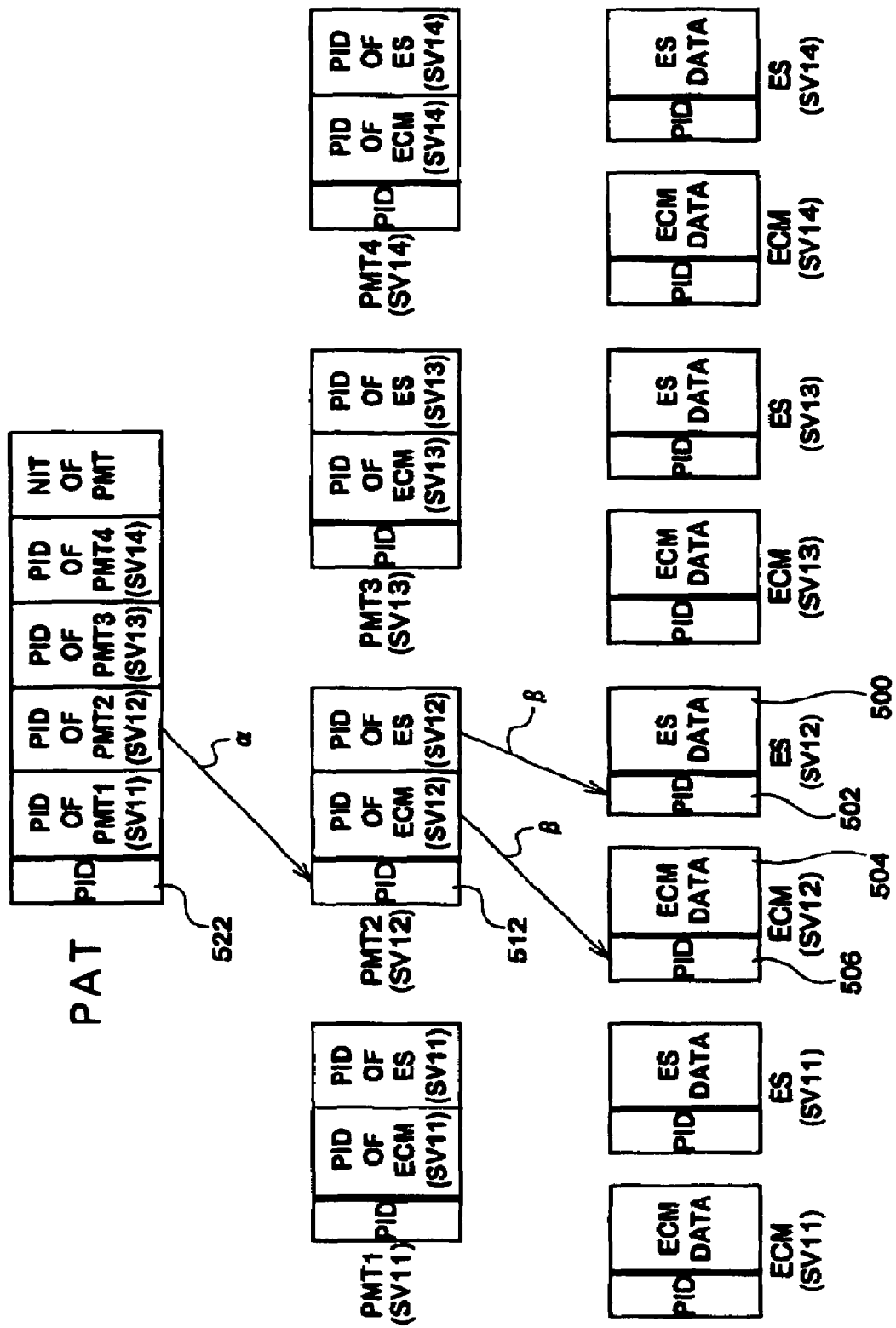
FIG. 5 is a view illustrating relationships among packetized data.

The layout of a transmitter according to the second embodiment of the present invention is the same as that of shown in FIG. 2. However, it differs in that the video/audio data management part 7 generates data for the special playback in respect to each of the services. The data for the special playback is converted into a special stream and is contained in the transport stream with a data multiplexing part 10.

Figure 38:
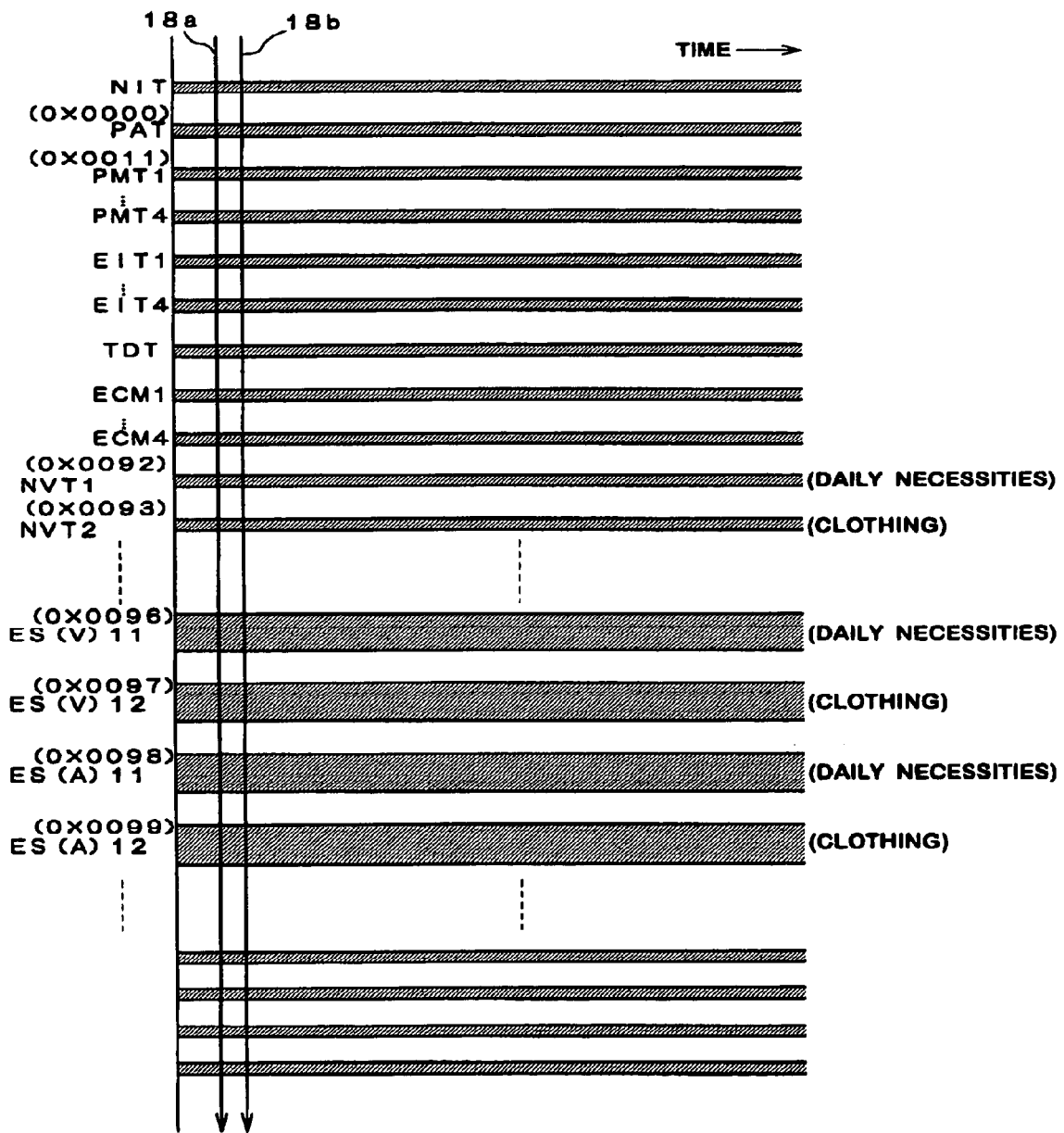
FIG. 38 is a view showing an arrangement of a transport stream containing a special stream.

FIG. 38 shows the transport stream thus generated. FIG. 39 is a view showing the contents of the control data PMT1. Special playback ES (V) 11 and ES (V) 12 represent streams for special playback respectively generated in accordance with ES (V) 11 and ES (V) 12. In this embodiment, the streams are formed in the form further selecting packets from the picture. Also, the data NV1 and the NV2 are images for performing operations respectively contained in the navigation data NVT1 and NVT2.

5.2. Structure and Functions of Recording/Reproducing Apparatus

Figure 40:
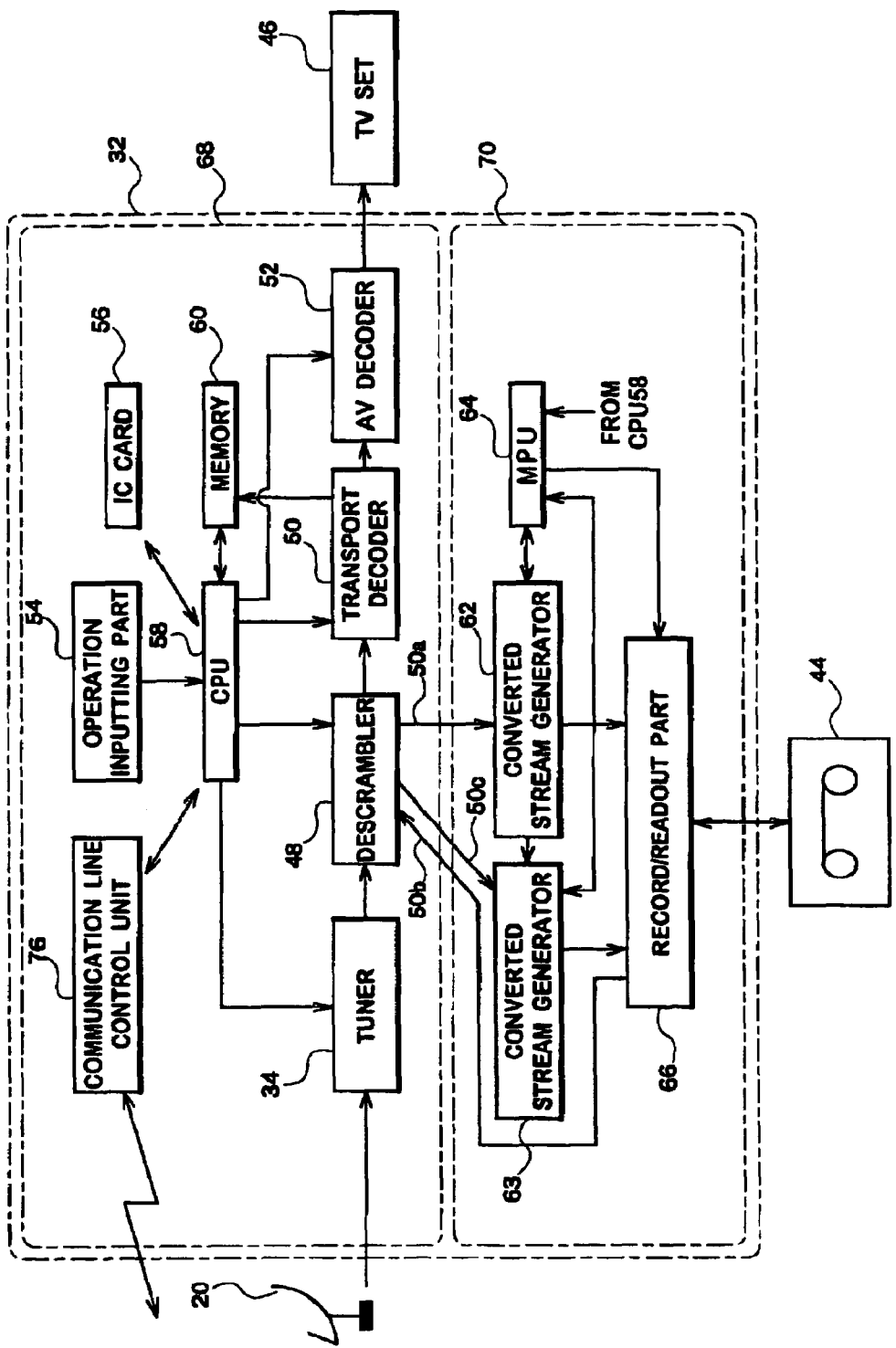
FIG. 40 is a schematic view illustrating hardware structure of the recording/reproducing apparatus according to the second embodiment.

FIG. 40 is a schematic view illustrating hardware structure of the recording/reproducing apparatus according to the second embodiment. In this embodiment, the apparatus is designed so as to fetch the special stream from the terminal 50c of the transport decoder 50. The generator 63 generates the stream for special playback upon receipt of the special stream.

The load for the generator 63 can be decreased relative to that in the first embodiment because the special steam contains video further selected for the special playback. As a consequence, processing of the special stream can be carried out quickly. The special stream to be recorded is the same as that depicted in FIG. 37. It is, therefore, the image for performing operations is displayed even in the special playback.

5.3. Other Embodiments

Although, the image for operations is contained in the special stream in the above embodiments, the image may not be contained therein. In that case, the image is not contained in the stream for special playback generated with the recording/reproducing apparatus.

Also, it is possible to design the apparatus to select whether or not containing the image for operations into the special stream.

Furthermore, it is possible for the apparatus to generate the image for operations and makes the image to contain into the special stream while making the image not to contain into the special stream.

6. Third Embodiment

Figures 41, 42:
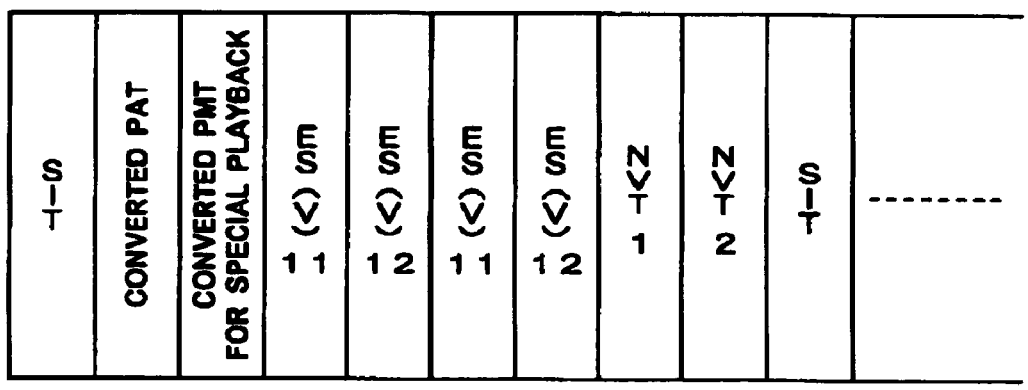
FIG. 41 is a view showing the contents of a conversion PMT for special playback.
FIG. 42 is a view showing a data stream for special playback in diagrammatic form.

Hardware structure of the recording/reproducing apparatus according to the present invention is the same as that of shown in FIG. 20. In this embodiment, the stream for special playback is generated so as to contain the navigation data NVT1 and NVT2 as depicted in FIGS. 41 and 42. In other words, the generator 63 carries out the following processing; thinning video streams, discarding audio streams, and remaining navigation data.

In this way, interactive operation corresponding to the inputs through the operation inputting part 54 can be realized even in the special playback mode.

The navigation data to be recorded in the stream for special playback may be the same as that to be recorded in the stream for normal playback. However, partial recording of the navigation data may also be carried out if the width of the memory area for special playback is in small.

In this embodiment, control with interactive manner can be carried out even in the special playback mode because control commands in the navigation data are recorded in the stream for special playback.

7. Fourth Embodiment

FIG. 43 is a schematic view illustrating hardware structure of the recording/reproducing apparatus according to the fourth embodiment. In this embodiment, only the stream for normal playback is recorded on the tape 44 and none of the stream for special playback is generated nor recorded thereon.

In the normal playback mode, a series of processing is carried out for the normal playback; reading out the stream for normal stream recorded on the tape, providing the stream to the TS decoder 50 under the as-is condition. In the special playback mode, the stream for normal playback thus read out is supplied to the generator 63 through switching of switches 63a, 63b. The generator 63 generates streams required-for performing special playback and provides the resultant streams to the TS decoder 50.

As described above, the streams required for performing the special playback are generated during the playback in this embodiment. Consequently, the recording volume of the medium can be effectively used while performing the special playback because only the stream for normal playback is recorded on the recording medium.

Also, the special playback can be carried out even with a recording medium which records only the streams for normal playback.

Furthermore, several alternatives such as whether or not containing the image for operations into the special stream, whether or not performing interactive control in the special playback and whether or not displaying the image for performing operations, similar to that of the first through the third embodiment may be prepared.

8. Fifth Embodiment

The layout of the transmitter is the same as that of shown in FIG. 2. However, it differs in that the video/audio data management part 7 generates data for the special playback in respect to each of the services. The data for the special playback is converted into a special stream and is contained in the transport stream with the data multiplexing part 10 similar to the second embodiment.

Although, the transmitter described in the second embodiment not contains control data in the navigation data into the transport stream, the transmitter according to this embodiment does contain the control data therein.

The hardware structure of the recording/reproducing apparatus according to the fifth embodiment is similar to that depicted in FIG. 40. In this embodiment, the apparatus is designed 80 as to fetch the special stream from the terminal 50c of the transport decoder 50. The generator 63 generates the stream for special playback upon receipt of the special stream.

The stream for special playback to be recorded is the same as that depicted in FIG. 42. Consequently, the image for operations is displayed even in the special playback.

8.1 Other Embodiments

In all the embodiments described above, navigation data (control data) to be contained in the special stream may be the same navigation data to be contained in the normal stream. However, only a part of the navigation data may be contained in the special stream.

Also, it is possible to design the apparatus to select whether or not containing the control data into the stream for special playback generated by the apparatus while containing the navigation data (control data) into the special stream.

9. Sixth Embodiment

Figure 44A:
FIGS. 44A through 44C are views illustrating data of a normal playback mode interposing that of a special playback mode therebetween.
Figure 44B:
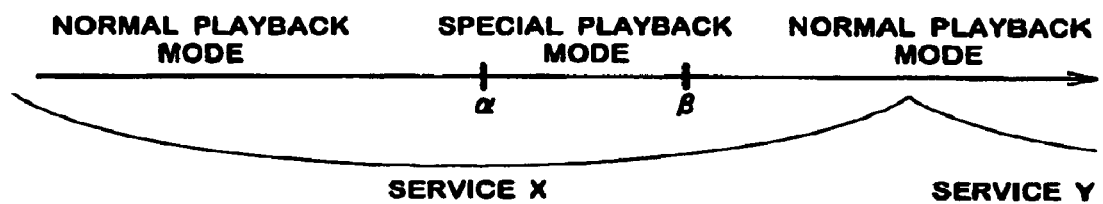
Figure 44C:
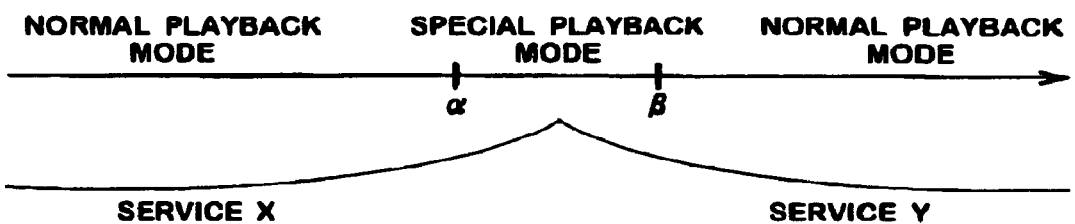
Figure 45:
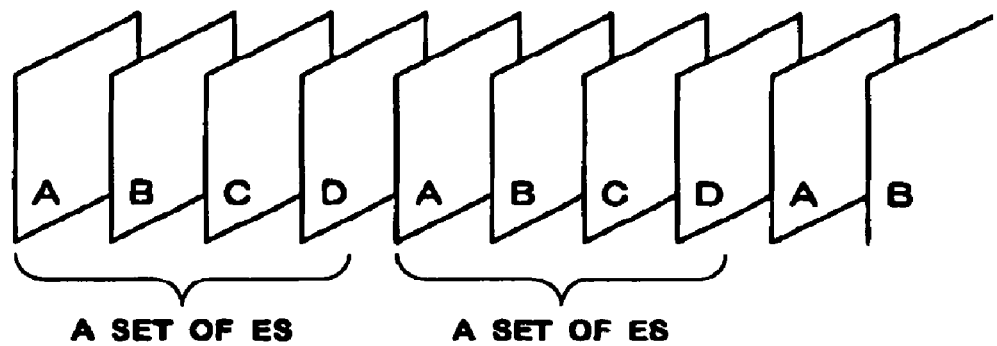
FIG. 45 is a view illustrating an arrangement of Video/Audio data ES for still images

Various controls for navigation and display of the image for operations in the special playback have been discussed in the embodiment described above. There are some other problems to be soled when the normal playback is performed before and after execution of the special playback as depicted in FIGS. 44A to 44C. That is, there is a probability causing inconsistencies in the control of the apparatus if the navigation data obtained at a starting point "a" of special playback (the ending point of the previous normal playback) is used at the ending point "b" of the special playback (the staring point of the latter normal playback).

In order to solve the problem, a service ID at the point α is (see stored, and matching between the service ID at the point α and a service ID at the point β is carried out. The navigation data obtained at the point α is used at the point β If both are matched (see FIG. 44B). If they are not matched, a new navigation data is obtained at the point β because the service has been changed to another during the special playback (see FIG. 44).

Although, decision is made depending upon the service IDs in the embodiment described in above, the decision may be made under version of the navigation data itself and the like.

10. Seventh Embodiment

10.1. Structure and Functions of Transmitter

The layout of a transmitter according to the seventh embodiment of the present invention is the same as that of shown in FIG. 2. However, it differs in that the video/audio data management part 7 makes each of the service so as to contain a version upgrade flag (version upgrade information) whether or not allowing the special playback therein. The flag may be written in the PMT.

A type of broadcasting in which a plurality of still images are repeatedly transmitted, and controlling which of the images is displayed according to the navigation data, and performing the display in an interactive manner in response to inputs made by the operator, is available. With the broadcasting, a quiz program in which asking questions to the operator(s) and make him/her to select the answer, and another questions is displayed only the case if the answer to the question is correct, can be realized.

In such a program, it is not desirable for the operator to display the still images in a random manner. In other words, images should be displayed after carrying out predetermined processes are undesirably displayed without carrying out the predetermined processes during the special playback.

Such undesirable display can be banned as to the service (or the event) if a flag for banning the special playback.

10.2. Structure and Functions of Recording/Reproducing Apparatus

Figure 46:
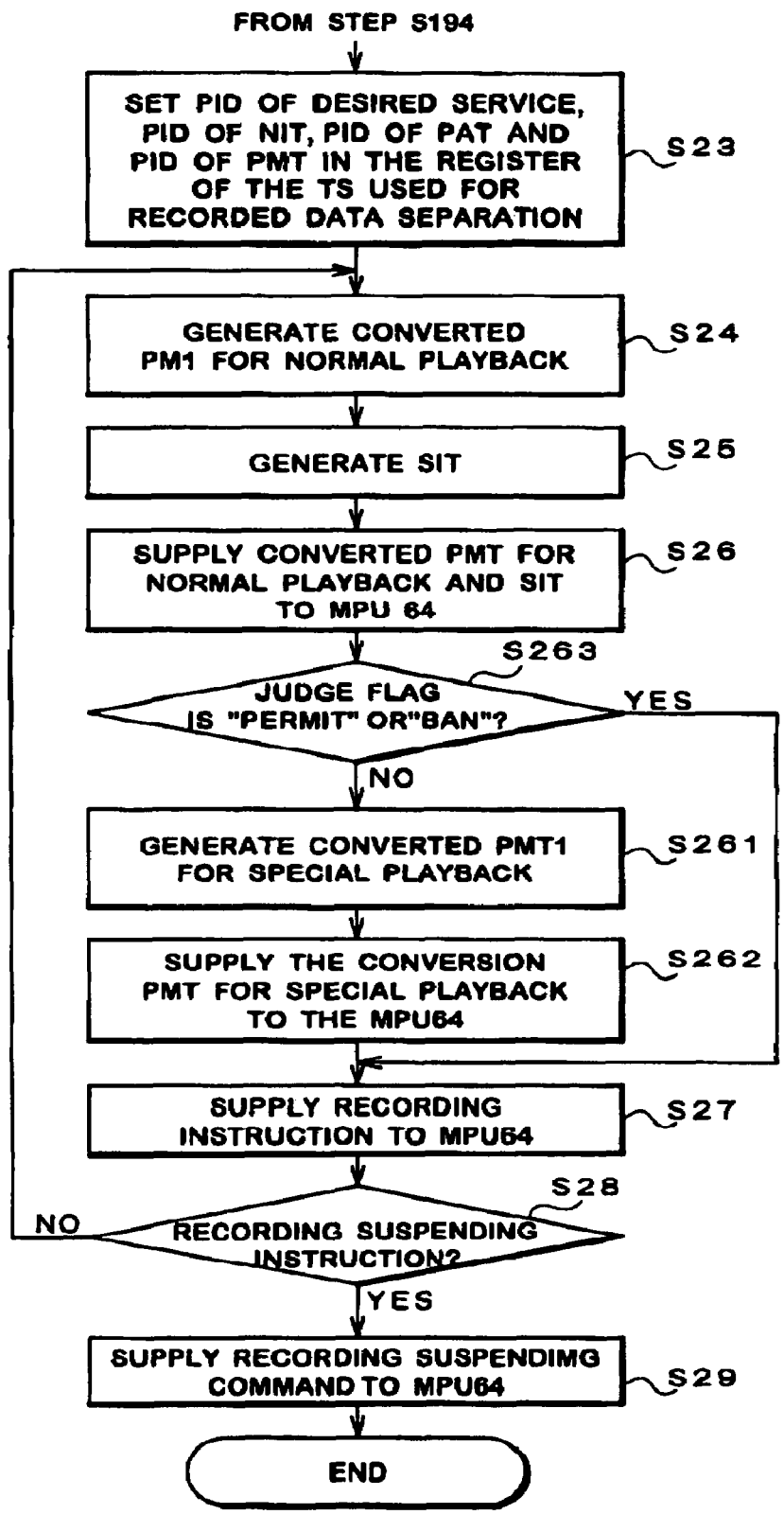
FIG. 46 is a flowchart of a program executed in the record mode.

Hardware structure of the recording/reproducing apparatus according to the seventh embodiment is the same as that shown in FIG. 20. FIG. 46 is a flowchart of a program executed in the record mode. In step S 263, the CPU 58 judges whether or not a flag(s) for special playback written in the PMT is in "permit" or "ban". If the flag is in "permit", a data stream for special playback is generated and the stream is recorded on the recording medium. In the contrary, data stream for special playback is not recorded on the recording medium when the flag is in "ban". As a consequence, only the stream for normal playback is recorded on the tape 44 when the flag is in "ban". The flag is recorded under the as-is condition into a converted PMT of the stream for normal playback.

Figure 47:
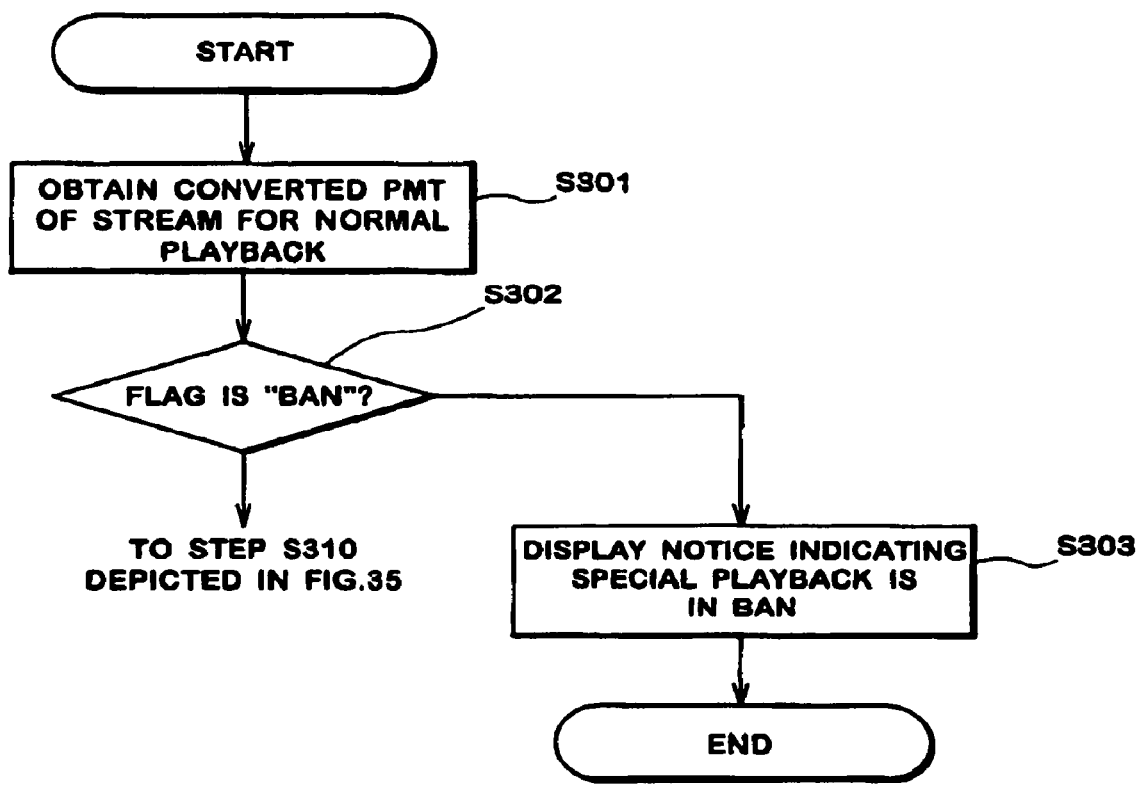
FIG. 47 is a flowchart of a program executed in the special playback mode.

FIG. 47 is a flowchart of a program executed in the special playback mode. When the special playback is selected, the converted PMT of the stream for normal playback is obtained at step S301. Subsequently, the CPU 58 judges whether or not the flag(s) for special playback written in the PMT is in "permit" or "ban" (step S302). If the flag is in "permit", the process proceeds to step S310 in which processing for special playback is performed. In the contrary, a display indicative that the special playback is banned and end the process if the flag is in "ban".

10.3. Other Embodiments

Although, the flag for special playback is written to all the services and the events, the flag may be written based on a predetermined period within the event for describing detailed information.

Though, none of the stream for special playback is recorded on the tape when the flag is in "ban" in the above embodiment, the stream may be recorded on the tape even when the flag is in "ban" unless the special playback is performed in the playback mode.

In addition, in the case of recording only the stream for normal playback and then generates a stream for special playback, the special playback may not be performed when the flag is in "ban".

11. Eighth Embodiment

11.1. Structure and Functions of Recording/Reproducing Apparatus

Hardware structure of the recording/reproducing apparatus according to the eighth embodiment is the same as that shown in FIGS. 20, 40 and 43. Consequently, one of these structures may be applied to the apparatus in this embodiment.

Figure 48:
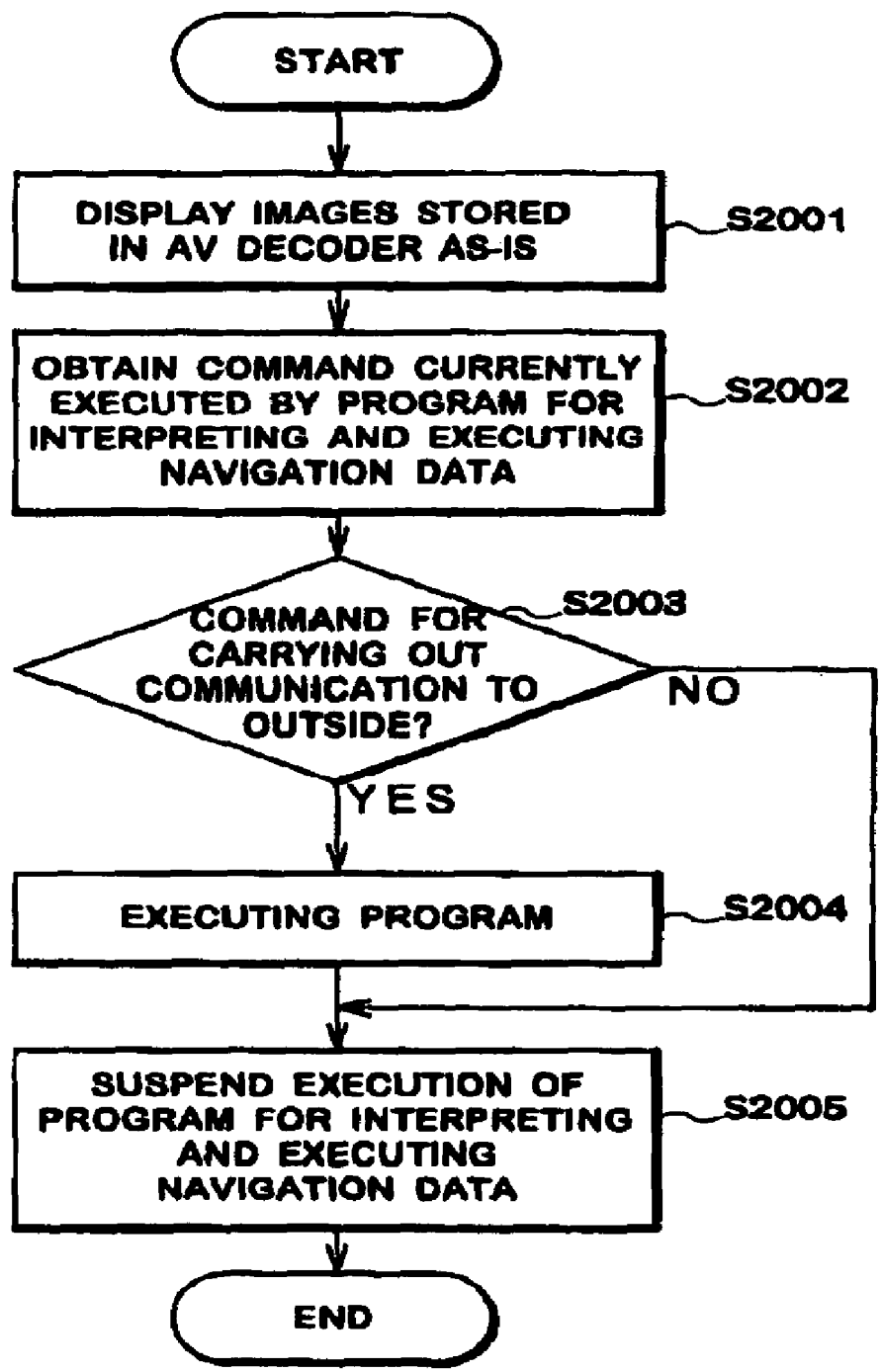
FIG. 48 is a flowchart of a program executed in a pause mode.

FIG. 48 is a flowchart of a program executed in a pause mode. The CPU 58 controls the AV decoder 52 to maintain the contents currently displaying as it is (step S2001). If the image for operation is displayed on the contents, the display of the image is maintained as well.

Subsequently, the program interpreting and executing the navigation data depicted in FIG. 22 obtains a command currently being executed (step S2002). The CPU 58 then judges whether or not the command (for example, the command of "send_string" in FIG. 11) is a command for carrying out communications to the outside (step S2003). If the command is not for carrying out the communication, the CPU 58 suspends the execution of the program (step S2005). The CPU 58 also suspends the execution of the program (step S2005), after executing the program if the judgement at step S2003 is YES (step S2004).

In this embodiment, only commands for carrying out communications to the outside except for that causing any inconveniences are executed during the suspension period. It is preferred that execution of the command should be hold even passing for five (5) seconds during the suspension period.

When the mode turned into the normal mode as a result of releasing the suspension, execution of the command in the navigation data is restarted.

11.2. Other Embodiments

Although, the apparatus is designed so as to remain the image for operations even in the pause mode in the embodiment described in above, the image may be disappeared.

Alternatively, the apparatus is designed so as to execute the communication commands even in the pause mode in the embodiment described in above. It is possible to design the apparatus to suspend the execution of all the commands.

12. Others

In all of the above embodiments, some or all the functions implemented using the CPU could be implemented by means of hardware. Also, in all of the above embodiments, some or all of the functions implemented using hardware could be implemented by using the CPU.

Also, while, in the above embodiments, an example was described in which magnetic tape capable of being recorded to sequentially was employed as the recording medium for recording the converted stream, it would be possible to employ a recording medium such as a magnetic disk, magneto optic disk, hard disk, flexible disk, DVD or CD-R.

All the above embodiments can be interchangeably applied one another.

Throughout the above-embodiments, the present invention is applied to digital satellite broadcasting, however, the present invention may also be applied to other type of broadcasting methods such as digital terrestrial broadcasting, wire broadcasting. In addition, the present invention may be applied to a technique for recording and reproducing digital contents in data stream not even in broadcasting.

While the embodiments of the present invention, as disclosed herein, constitute preferred forms, it is to be understood that each term was used as illustrative and not restrictive, and can be changed within the scope of the claims without departing from the scope and spirit of the invention.

What is claimed is:

1. A recording/reproducing apparatus for receiving digital broadcasting, comprising:
   a receiver that receives a transport stream containing control data for realizing interactive operations;
   a converter that generates a data stream for reproduction containing the control data in accordance with packets as to a desired service selected from the transport stream being received;
   a recorder that records the data stream from the converter on a recording medium;
   a readout device that reads out the data stream recorded on the medium;
   an operation handing device that handles operations made by an operator; and
   a reproducer that reproduces signals representing contents of services by one of receiving a transport stream from the receiver when the apparatus is in a playback mode and receiving a transport stream from the readout device when the apparatus is in a receive mode, wherein the reproducer outputs the reproduced signals;
   wherein the playback mode includes a normal playback mode and a special playback mode;
   and wherein the reproducer carries out an interactive operation in which the reproducer outputs an image for performing operations in accordance with control data contained in the transport stream being received and changes the signal representing contents of the services being outputted in accordance with an input of the operator when the apparatus is in the receive mode and the normal playback mode;
   and wherein the reproducer does not carry out the interactive operation when the apparatus is in the special playback mode.

2. The apparatus of claim 1, wherein the converter generates a data stream for reproduction containing a data stream for the normal playback and a data stream for the special playback;
   and wherein the reproducer reproduces signals representing contents of services reproduced under the normal playback mode in accordance with the data stream for the normal playback when the apparatus is in the normal playback mode;
   and wherein the reproducer reproduces signals representing contents of services reproduced under the special playback mode in accordance with the data stream for the special playback when the apparatus is in the special playback mode.

3. The apparatus of claim 2, wherein the converter generates a data stream for special playback not containing the control image for performing operations and a control command, the image and the command being used for performing interactive operations;
   and wherein the reproducer does not display the image for performing operations when the apparatus is in the special playback mode.

4. The apparatus of claim 3, wherein the reproducer outputs a signal for notifying a suspension to the operator when a display of the image is suspended thereby.

5. The apparatus of claim 2, wherein the converter generates a data stream for special playback containing the image for performing operations and does not contain a control command, the image and the control command being used for performing interactive operations;
   and wherein the reproducer displays the image for performing operations when the apparatus is in the special playback mode.

6. The apparatus of claim 2, wherein the converter further includes data for detecting whether or not a version of control data for performing the interactive operations is upgraded into the data stream for special playback;
   and wherein the reproducer suspends display of the image for performing operations when an upgrade of the control data is detected according to the detecting data during the special playback mode.

7. The apparatus of claim 2, wherein the converter generates a data stream for special playback which contains the image for performing operations and does not contain a control command, the image and the control command being used for performing interactive operations;
   and wherein the reproducer switches displaying the image for performing operations in accordance with an input of the operator when the apparatus is in the special playback mode.

8. The apparatus of claim 1, wherein the converter generates a data stream for reproduction containing a data stream for the normal playback and does not contain a data stream for the special playback;

wherein the reproducer reproduces signals representing contents of services reproduced under the normal playback mode in accordance with the data stream for the normal playback when the apparatus is in the normal playback mode;

and wherein the reproducer reproduces signals representing contents of services reproduced under the special playback mode in accordance with the data stream for the special playback when the apparatus is in the special playback mode.

9. The apparatus of claim 8, wherein the reproducer generates a service contents signal for special playback that does not contain an image and a control command when the apparatus is in a special playback mode, the image and the control command being used for performing interactive operations;

and wherein the reproducer does not display the image for performing the interactive operations.

10. The apparatus of claim 9, wherein the reproducer outputs a signal for notifying a suspension to the operator when a display of the image is suspended thereby.

11. The apparatus of claim 8, wherein the reproducer generates a service contents signal for special playback containing an image for interactive operations and does not contain a control command for interactive operations when the apparatus is in the special playback mode;

and wherein the reproducer displays the image.

12. The apparatus of claim 8, wherein the reproducer detects whether control data for performing interactive operations is upgraded in the data stream for special playback;

and wherein the reproducer suspends display of the image for performing the interactive operations when an upgrade of the control data is detected.

13. The apparatus of claim 1, wherein the reproducer does not use control data for interactive operations obtained at a beginning of a special playback mode in a normal playback mode after carrying out the special playback mode if a service identifier at the beginning of the special playback mode and a service identifier at the end of the special playback mode do not coincide with each other when playback modes are switched in a sequence of the normal playback mode, the special playback mode and the normal playback mode.

14. The apparatus of claim 1, wherein the reproducer does not use control data for interactive operations obtained at the beginning of a special playback mode in a normal playback mode after carrying out the special playback mode if a version of the control data at a beginning of the special playback mode and a version of the control data at an end of the special playback mode do not coincide with each other when playback modes are switched in a sequence of the normal playback mode, the special playback mode and the normal playback mode.

15. A computer readable program storage medium that describes operations of a CPU for realizing the apparatus of claim 1, which comprises:
 a converting circuit that selects packets as to a desired service from the transport stream being received and outputs the packets as a stream for reproduction;
 a recording part that records the stream from the converting circuit on a recording medium;
 a readout part that reads out the stream for reproduction recorded on the recording medium; and
 a decoder that fetches a signal representing contents of the services;
wherein, the CPU controls operations of the decoder.

16. A digital video recording apparatus for recording a desired service by receiving a transport stream, comprising:
 a converter that generates a data stream for reproduction containing control data for realizing interactive operations by selecting packets as to a desired service selected from the transport stream being received; and
 a recorder that records the stream from the converter on a recording medium;
wherein the converter generates a data stream for on containing a data stream for normal playback and a data stream for layback, wherein the data stream for special playback does not contain a control command used for performing interactive operations.

17. A digital video reproduction apparatus for reproducing services by reading out a stream for reproduction recorded on a recording medium, comprising:
 a readout device that reads out the stream for reproduction recorded on the recording medium;
 an operation handing device that handles operations made by an operator; and
 a reproducer that reproduces a signal representing contents of the services by receiving the stream for reproduction from the readout device, wherein the reproducer outputs the reproduced signal;
wherein the reproducer outputs an image for performing operations in accordance with control data for performing interactive operations contained in the stream for reproduction, and performs interactive operations so as to change a signal representing contents of the services responding to an input of the operator when the apparatus is in a normal playback mode;

and wherein the reproducer does not perform the interactive operations when the apparatus is in a special playback mode.

18. The apparatus of claim 17, wherein the reproducer does not display the image for performing operations when the apparatus is in the special playback mode.

19. The apparatus of claim 18, wherein the reproducer outputs a signal for notifying a suspension to the operator when a display of the image is suspended thereby.

20. The apparatus of claim 17, wherein the reproducer displays the image for performing when the apparatus is in the special playback mode.

21. The apparatus of claim 20, wherein the reproducer suspends display of the image for performing operations when an upgrade of the control data is detected during the special playback mode.

22. The apparatus of claim 17, wherein the operator enables to choose whether to display the image for performing operations when the apparatus is in the special playback mode.

23. A recording/reproducing apparatus for receiving digital broadcasting, comprising:
 a receiver that receives a transport stream control data for realizing interactive operations;
 a converter that converts a data stream for reproduction containing the control data in accordance with packets as to a desired service selected from the transport stream being received;
 a recorder that reads the stream from the converter on a recording medium;
 a device that reads out the stream recorded on the medium;
 an operation handing device that handles operations made by an operator; and
 a reproducer that reproduces signals representing contents of services by one of receiving a transport stream from the reproducer when the apparatus is in a playback mode and receiving a transport stream from the readout device when the apparatus is in a receive mode, wherein the reproducer outputs the reproduced signals;

wherein the playback mode includes a normal playback mode and a special playback mode;

and wherein the reproducer carries out an interactive operation in which the reproducer outputs an image for performing operations in accordance with control data contained in the transport stream that is being received and changes the signal representing contents of the services being outputted in accordance with an input of the operator when the apparatus is in the receive mode, the normal playback mode and the special playback mode.

24. The apparatus of claim 23, wherein the converter generates a data stream for reproduction containing a data stream for the normal playback and a data stream for the special playback;

and wherein the reproducer reproduces signals representing contents of services reproduced under the normal playback mode in accordance with the data stream for the normal playback when the apparatus is in the normal playback mode;

and wherein the reproducer reproduces signals representing contents of services reproduced under the special playback mode in accordance with the data stream for the special playback when the apparatus is in the special playback mode.

25. The apparatus of claim 24, wherein the converter makes control data for realizing interactive operations equivalent to the data stream for the normal playback so as to include into the data stream for the special playback;

and wherein the reproducer carries out an interactive operation equivalent to that carried out in the normal playback mode.

26. The apparatus of claim 24, wherein the converter generates the data stream for the special playback by omitting a part of the control data;

and wherein the reproducer carries out an interactive operation different from that carried out in the normal playback mode when the apparatus is in the special playback mode.

27. A digital video recording apparatus for outputting data for recording a desired service by receiving a transport stream, comprising:

a converter that generates a data stream for reproduction containing control data for realizing interactive operations by selecting packets as to a desired service selected from the transport stream being received; and a recorder that records the stream from the converter on a recording medium;

wherein the converter generates a data stream for reproduction containing a data stream for normal playback and a data stream for special playback, and wherein the control data is contained in both the data stream for normal playback and the data stream for special playback.

28. A digital video reproduction apparatus for reproducing services by reading out a stream for reproduction recorded on a recording medium, comprising:

a readout device that reads out the stream for reproduction recorded on the recording medium;

an operation handing device that handles operations made by an operator; and a reproducer that reproduces a signal representing contents of the services by receiving the stream for reproduction from the readout device, wherein the reproducer outputs the reproduced signals;

wherein the reproducer outputs an image for performing operations in accordance with control data for performing interactive operations contained in the stream for reproduction, and performs interactive operations so as to change a signal representing contents of the services responding to an input of the operator when the apparatus is in a normal playback mode and a special playback mode.

29. The apparatus of claim 28, wherein the reproducer carries out an interactive operation equivalent to that performed in the normal playback mode when the apparatus is in the special playback mode.

30. The apparatus of claim 28, wherein the reproducer carries out different interactive operations between the normal playback mode and the special playback mode.

31. A recording/reproducing apparatus for receiving digital broadcasting, comprising:

a receiver that receives a transport stream in which information whether to allow special playback for at least a part of each service is assigned;

a converter that generates a data stream for normal playback and a data stream for special playback as a data stream for reproduction containing the control data in accordance with packets as to a desired service selected from the transport stream being received;

a recorder that records the data stream for reproduction from the converter on a recording medium;

a readout device that reads out the stream recorded on the medium; and a reproducer that reproduces signals representing contents of services by one of receiving a transport stream from the receiver when the apparatus is in a receive mode, receiving the data stream from the readout device when the apparatus is in a normal playback mode and receiving the data stream for special playback from the readout device when the apparatus is in a special playback mode, wherein the reproducer outputs the reproduced signals;

and wherein the converter carries out one of not generating the data stream for special playback and banning to record the data stream for special playback on the recording medium when the information bans to carry out special playback.

32. A digital video recording apparatus for recording a desired service by receiving a transport stream, comprising:

a converter that generates a data stream for reproduction containing a data stream for normal playback and a data stream for special playback by selecting packets as to a desired service selected from the transport stream being received; and a recorder that records the stream from the converter on a recording medium;

wherein the transport stream contains information whether to allow special playback;

and wherein the converter carries out one of not generating the data stream for special playback and banning to record the data stream for special playback on the recording medium when the information contained in the transport stream bans to carry out special playback.

33. A recording/reproducing apparatus for receiving digital broadcasting, comprising:

a receiver that receives a transport stream in which information whether to allow a special playback for at least a part of each service is assigned;

a converter that generates a data stream for a normal playback and a data stream for the special playback as a data stream for reproduction containing control data in accordance with packets as to a desired service selected from the transport stream being received;

a recorder that records the data stream for reproduction from the converter on a recording medium;

a readout device that reads out the stream recorded on the medium; and a reproducer that reproduces signals representing contents of services by one of receiving a transport stream from the receiver when the apparatus is in a receive mode, receiving the data stream from the readout device when the apparatus is in a normal playback mode, and receiving the data stream for special playback from the readout device when the apparatus is in a special playback mode, wherein the reproducer outputs the reproduced signals;

wherein the converter makes the data stream for special playback so as to contain information whether to allow special playback therein;

and wherein the reproducer does not carry out the special playback of a part of the service where the information is indicative of not allowing special playback even when the apparatus is in the special playback mode.

34. A digital video recording apparatus for recording a desired service by receiving a transport stream, comprising:

a converter that generates a data stream for reproduction containing a data stream for normal playback and a data stream for special playback by selecting packets as to a desired service selected from the transport stream being received; and a recorder that records the stream from the converter on a recording medium;

wherein the converter makes the data stream for the special playback so as to contain information whether to allow the special playback therein.

35. A digital video reproduction apparatus for reproducing services by reading out a stream for reproduction recorded on a recording mediums, comprising:

a readout device that reads out the stream for reproduction containing a data stream for normal playback and a data stream for special playback recorded on the recording medium; and a reproducer that reproduces a signal representing contents of the services by receiving the stream for reproduction from the readout device, wherein the reproducer outputs the reproduced signals;

wherein the transport stream contains information whether to allow the special playback;

and wherein the reproducer does not carry out the special playback when the information is indicative of not allowing the special playbacks, even when the apparatus is in the special playback mode.

36. A recording/reproducing apparatus for receiving digital broadcasting, comprising:

a receiver that receives a transport stream in which information whether to allow a special playback for at least a part of each service is assigned;

a converter that generates a data stream for reproduction in accordance with packets as to a desired service selected from the transport stream being received;

a recorder that records the data stream for reproduction from the converter on a recording medium;

a readout device that reads out the stream recorded on the medium; and a reproducer that reproduces signals representing contents of services by one of receiving a transport stream from the receiver when the apparatus is in a receive mode, receiving the data stream from the readout device when the apparatus is in a normal playback mode, and receiving the data stream for special playback from the readout device when the apparatus is in a special playback mode, wherein the reproducer outputs the reproduced signals;

wherein the converter makes the data stream for reproduction so as to contain information whether to allow the special playback therein;

and wherein the reproducer does not carry out the special playback of a part of the service where the information is indicative of not allowing the special playback when the apparatus is in the special playback mode.

37. A digital video recording apparatus for recording a desired service by receiving a transport streams, comprising:

a converter that generates a data stream for reproduction by selecting packets as to a desired service selected from the transport stream being received; and a recorder that records the stream from the converter on a recording medium;

wherein the converter makes the data stream for reproduction so as to contain information whether to allow a special playback therein.

38. A digital video reproduction apparatus for reproducing services by reading out a stream for reproduction recorded on a recording medium, comprising:

a readout device that reads out the stream for reproduction recorded on the recording medium; and a reproducer that reproduces a signal representing contents of the services by receiving the stream for reproduction from the readout device, wherein the reproducer outputs the reproduced signals;

wherein the transport stream contains information whether to allow a special playback;

and wherein the reproducer does not carry out the special playback when the information is indicative of not allowing the special playbacks, even when the apparatus is in the special playback mode.

39. A recording/reproducing apparatus for receiving digital broadcasting, comprising:

a receiver that receives a transport stream containing control data for realizing interactive operations;

a converter that generates a data stream for reproduction containing the control data in accordance with packets as to a desired service selected from the transport stream being received;

a recorder that records the stream from the converter on a recording medium;

a readout device that reads out the stream recorded on the medium;

an operation handing device that handles operations made by an operator; and a reproducer that reproduces signals representing contents of services by one of receiving a transport stream from the receiver when the apparatus is in a playback mode and receiving a transport stream from the readout device when the apparatus is in a receive mode, wherein the reproducer outputs the reproduced signals;

wherein the playback mode includes a normal playback mode and a pause mode;

and wherein the reproducer carries out an interactive operation in which the reproducer outputs an image for performing operations in accordance with control data contained in the transport stream that is received and changes the signal representing contents of the services being outputted in accordance with an input of the operator when the apparatus is in the receive mode and the normal playback mode;

and wherein the reproducer stops carrying out the interactive operation when the apparatus is in the pause mode.

40. The apparatus of claim 39, wherein the reproducer suspends display of the image when the apparatus is in the pause mode.

41. The apparatus of claim 39, wherein the reproducer keeps displaying the image when the apparatus is in the pause mode.

42. The apparatus of claim 39, wherein the reproducer restarts the interactive operations when the pause mode is released.

43. A digital video reproduction apparatus for reproducing services by reading out a stream for reproduction recorded on a recording medium, comprising:

a readout device that reads out the stream for reproduction recorded on the recording medium; and a reproducer that reproduces a signal representing contents of the services by receiving the stream for reproduction from the readout device, wherein the reproducer outputs the reproduced signals;

wherein the reproducer outputs an image for performing operations in accordance with control data for performing interactive operations contained in the stream for reproduction, and performs interactive operations so as to change a signal representing contents of the services responding to an input of the operator when the apparatus is in a normal playback mode;

and wherein the reproducer suspends the interactive operations when the apparatus is in a pause mode.

44. A recording/reproducing apparatus for receiving digital broadcasting, comprising:

a receiver that receives a transport stream containing control data for realizing interactive operations;

a converter that generates a data stream for reproduction containing the control data in accordance with packets as to a desired service selected from the transport stream being received;

a recorder that records the stream from the converter on a recording medium;

a readout device that reads out the stream recorded on the medium;

an operation handing device for handling operations made by an operator; and a reproducer that reproduces signals representing contents of services by one of receiving a transport stream from the receiver when the apparatus is in a playback mode and receiving a transport stream from the readout device when the apparatus is in a receive mode, wherein the reproducer outputs the reproduced signals;

wherein the playback mode includes a normal playback mode and a pause mode;

and wherein the reproducer carries out an interactive operation in which the reproducer outputs an image for performing operations in accordance with control data contained in the transport stream that is received and changes the signal representing contents of the services being outputted in accordance with an input of the operator when the apparatus is in the receive mode and the normal playback mode;

and wherein the reproducer carries out the interactive operation even when the apparatus is in the pause mode.

45. The apparatus of claim 44, wherein the reproducer carries out the interactive operation upon receipt of the input even when the apparatus is in the pause mode.

46. The apparatus of claim 44, wherein the reproducer completes the operations under the control data being carried out at a beginning of the pause mode and does not accept further input when the apparatus is in the pause mode.

47. The apparatus of claim 44, wherein the reproducer does not carry out the operation under the control data depending on a time when the apparatus is in the pause mode.

48. The apparatus of claim 44, wherein the reproducer carries out processing for external communications.

49. A digital video reproduction apparatus for reproducing services by reading out a stream for reproduction recorded on a recording medium, comprising:

a readout device that reads out the stream for reproduction recorded on the recording medium;

an operation handing device that handles operations made by an operator; and a reproducer that reproduces a signal representing contents of the services by receiving the stream for reproduction from the readout device, wherein the reproducer outputs the reproduced signals;

wherein the reproducer outputs an image for performing operations in accordance with control data for performing interactive operations contained in the stream for reproduction, and performs interactive operations so as to change a signal representing contents of the services responding to an input of the operator when the apparatus is in a normal playback mode;

and wherein the reproducer carries out the interactive operation even when the apparatus is in the pause mode.

* * * * *

UNITED STATES PATENT AND TRADEMARK OFFICE
CERTIFICATE OF CORRECTION

PATENT NO. : 7,000,246 B1  
APPLICATION NO. : 09/593368  
DATED : February 14, 2006  
INVENTOR(S) : Naoya Takao Page 1 of 1

It is certified that error appears in the above-identified patent and that said Letters Patent is hereby corrected as shown below:

At column 34, line 9 (claim 16, line 9) of the printed patent, "on" should be --reproduction--.

At column 34, line 11 (claim 16, line 11) of the printed patent, "layback" should be --playback--.

At column 34, line 42 (claim 20, line 2) of the printed patent, after "performing" insert --operations--.

At column 34, line 54 (claim 23, line 3) of the printed patent, after "stream" insert --containing--.

At column 37, line 40 (claim 35, line 3) of the printed patent, after "mediums" should be --medium--.

At column 37, line 54 (claim 35, line 16) of the printed patent, after "playbacks" should be --playback--.

At column 38, line 18 (claim 37, line 2) of the printed patent, after "streams" should be --stream--.

At column 38, line 40 (claim 38, line 14) of the printed patent, after "playbacks" should be --playback--.

Signed and Sealed this

Fourteenth Day of November, 2006

JON W. DUDAS  
*Director of the United States Patent and Trademark Office*